United States Patent
Hung et al.

(10) Patent No.: US 10,855,477 B2
(45) Date of Patent: Dec. 1, 2020

(54) NON-VOLATILE MEMORY WITH PHYSICAL UNCLONABLE FUNCTION AND RANDOM NUMBER GENERATOR

(71) Applicant: MACRONIX INTERNATIONAL CO., LTD., Hsinchu (TW)

(72) Inventors: Chun-Hsiung Hung, Hsinchu (TW); Kuen-Long Chang, Taipei (TW); Ken-Hui Chen, Hsinchu (TW); Shih-Chang Huang, Penghu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 170 days.

(21) Appl. No.: 15/857,341

(22) Filed: Dec. 28, 2017

(65) Prior Publication Data

US 2018/0123808 A1    May 3, 2018

Related U.S. Application Data

(63) Continuation-in-part of application No. 15/601,582, filed on May 22, 2017, now Pat. No. 10,715,340.
(Continued)

(51) Int. Cl.
*G06F 11/30* (2006.01)
*H04L 9/32* (2006.01)
(Continued)

(52) U.S. Cl.
CPC .............. *H04L 9/3278* (2013.01); *G09C 1/00* (2013.01); *H04L 9/0866* (2013.01); *H04L 9/0869* (2013.01)

(58) Field of Classification Search
CPC .. H04L 9/0866; H04L 9/0869; H04L 2209/12
(Continued)

(56) References Cited

U.S. PATENT DOCUMENTS 5,442,704 A    8/1995   Holtey
6,947,556 B1   9/2005   Matyas, Jr. et al.
(Continued)

FOREIGN PATENT DOCUMENTS

CN    103583013 B    4/2016
CN    105493191 A    4/2016
(Continued)

OTHER PUBLICATIONS

U.S. Appl. No. 15/984,685, filed May 21, 2018, 106 pages.
(Continued)

*Primary Examiner* — Samson B Lemma
(74) *Attorney, Agent, or Firm* — Haynes Beffel & Wolfeld LLP

(57) ABSTRACT

A device which can be implemented on a single packaged integrated circuit or a multichip includes a plurality of non-volatile memory cells, and logic to use a physical unclonable function to produce an initial key and to store the initial key in a set of non-volatile memory cells in the plurality of non-volatile memory cells. The device can include logic to use a random number generator to generate a random number, and logic to combine the initial key and the random number to produce an enhanced key. The physical unclonable function can use entropy derived from non-volatile memory cells in the plurality of non-volatile memory cells to produce the initial key. Logic is described to disable changes to data in the set of non-volatile memory cells, and thereby freeze the key after it is stored in the set.

19 Claims, 26 Drawing Sheets

Related U.S. Application Data

(60) Provisional application No. 62/528,460, filed on Jul. 4, 2017, provisional application No. 62/509,204, filed on May 22, 2017, provisional application No. 62/435,337, filed on Dec. 16, 2016, provisional application No. 62/435,092, filed on Dec. 16, 2016, provisional application No. 62/431,835, filed on Dec. 9, 2016, provisional application No. 62/430,196, filed on Dec. 5, 2016, provisional application No. 62/423,753, filed on Nov. 17, 2016, provisional application No. 62/370,736, filed on Aug. 4, 2016.

(51) Int. Cl.
*H04L 9/08* (2006.01)
*G09C 1/00* (2006.01)

(58) Field of Classification Search
USPC .......................................................... 713/193
See application file for complete search history.

(56) References Cited

U.S. PATENT DOCUMENTS

| | | | |
|---|---|---|---|
| 7,356,659 B2 | 4/2008 | Kobayashi et al. | |
| 8,145,855 B2 | 3/2012 | Wan et al. | |
| 8,391,070 B2 | 3/2013 | Bathul et al. | |
| 8,448,256 B2 | 5/2013 | Borchert et al. | |
| 8,694,856 B2 | 4/2014 | Tuyls et al. | |
| 8,711,626 B2 | 4/2014 | Lee | |
| 8,819,409 B2 | 8/2014 | Kuipers et al. | |
| 8,971,527 B2 | 3/2015 | BrightSky et al. | |
| 8,995,169 B1 | 3/2015 | Bandyopadhyay et al. | |
| 9,001,554 B2 | 4/2015 | Hashim et al. | |
| 9,071,446 B2 | 6/2015 | Kreft | |
| 9,082,514 B1 | 7/2015 | Trimberger | |
| 9,093,128 B2 | 7/2015 | Otterstedt et al. | |
| 9,158,906 B2 * | 10/2015 | Guajardo Merchan | G06F 21/32 |
| 9,171,144 B2 | 10/2015 | Lewis et al. | |
| 9,218,477 B2 | 12/2015 | Lewis et al. | |
| 9,245,925 B1 | 1/2016 | Lee et al. | |
| 9,298,946 B2 | 3/2016 | Zhu et al. | |
| 9,324,436 B2 | 4/2016 | Kim et al. | |
| 9,343,135 B2 * | 5/2016 | Zhu | G09C 1/00 |
| 9,368,207 B2 | 6/2016 | Bandyopadhyay et al. | |
| 9,391,772 B2 | 7/2016 | Suzuki | |
| 9,396,357 B2 | 7/2016 | Van Der Leest et al. | |
| 9,448,874 B2 | 9/2016 | Kim et al. | |
| 9,455,022 B2 | 9/2016 | Yabuuchi et al. | |
| 9,455,403 B1 | 9/2016 | Lai et al. | |
| 9,461,826 B2 | 10/2016 | Kreft | |
| 9,485,094 B1 | 11/2016 | Parvarandeh et al. | |
| 9,536,581 B2 | 1/2017 | Katoh et al. | |
| 9,548,113 B2 | 1/2017 | Yoshimoto et al. | |
| 9,558,358 B2 | 1/2017 | Aissi et al. | |
| 9,588,908 B2 | 3/2017 | Cambou | |
| 9,646,178 B2 | 5/2017 | Kan | |
| 9,653,161 B2 | 5/2017 | Yoshimoto et al. | |
| 9,686,248 B2 | 6/2017 | Dover | |
| 9,787,480 B2 | 10/2017 | Guo et al. | |
| 9,811,689 B1 | 11/2017 | Tseng et al. | |
| 9,870,829 B2 | 1/2018 | Park et al. | |
| 9,966,467 B2 | 5/2018 | Watanabe | |
| 9,985,791 B2 | 5/2018 | Cambou | |
| 10,097,348 B2 | 10/2018 | Kara-Ivanov et al. | |
| 10,311,930 B1 | 6/2019 | Kim et al. | |
| 10,469,271 B2 | 11/2019 | Hung et al. | |
| 10,680,809 B2 | 6/2020 | Chang et al. | |
| 2002/0024453 A1 * | 2/2002 | Maeda | G06F 11/006 341/50 |
| 2006/0221686 A1 | 10/2006 | Devadas et al. | |
| 2007/0044139 A1 * | 2/2007 | Tuyls | G07C 9/00158 726/2 |
| 2008/0260152 A1 * | 10/2008 | Skoric | H04L 9/3234 380/258 |
| 2008/0279373 A1 | 11/2008 | Erhart et al. | |
| 2009/0165086 A1 | 6/2009 | Trichina et al. | |
| 2009/0249014 A1 | 10/2009 | Obereiner et al. | |
| 2012/0131340 A1 | 5/2012 | Teuwen et al. | |
| 2012/0179952 A1 | 7/2012 | Tuyls et al. | |
| 2013/0051552 A1 | 2/2013 | Handschuh et al. | |
| 2013/0138710 A1 | 5/2013 | Yamamoto et al. | |
| 2014/0091832 A1 * | 4/2014 | Gotze | H03K 19/003 326/8 |
| 2014/0126306 A1 * | 5/2014 | Otterstedt | G11C 7/06 365/189.07 |
| 2014/0137266 A1 | 5/2014 | Chang | |
| 2014/0140513 A1 | 5/2014 | BrightSky et al. | |
| 2014/0185795 A1 | 7/2014 | Gotze et al. | |
| 2014/0189365 A1 | 7/2014 | Cox et al. | |
| 2014/0189890 A1 | 7/2014 | Koeberl et al. | |
| 2014/0225639 A1 | 8/2014 | Guo et al. | |
| 2015/0012737 A1 | 1/2015 | Newell | |
| 2015/0055417 A1 | 2/2015 | Kim et al. | |
| 2015/0058928 A1 | 2/2015 | Guo et al. | |
| 2015/0070979 A1 | 3/2015 | Zhu et al. | |
| 2015/0071432 A1 | 3/2015 | Zhu et al. | |
| 2015/0074157 A1 | 3/2015 | Yu et al. | |
| 2015/0074433 A1 | 3/2015 | Zhu et al. | |
| 2015/0091747 A1 | 4/2015 | Watanabe | |
| 2015/0092939 A1 | 4/2015 | Gotze et al. | |
| 2015/0143130 A1 | 5/2015 | Ducharme et al. | |
| 2015/0154421 A1 | 6/2015 | Feng et al. | |
| 2015/0169247 A1 | 6/2015 | Wang et al. | |
| 2015/0234751 A1 | 8/2015 | Van Der Sluis et al. | |
| 2015/0242158 A1 | 8/2015 | Hung et al. | |
| 2015/0278551 A1 | 10/2015 | Iyer et al. | |
| 2015/0286914 A1 | 10/2015 | Kulikovska et al. | |
| 2015/0317257 A1 | 11/2015 | Seol et al. | |
| 2016/0028544 A1 | 1/2016 | Hyde et al. | |
| 2016/0093393 A1 | 3/2016 | Park et al. | |
| 2016/0103625 A1 | 4/2016 | Fujimoto et al. | |
| 2016/0148664 A1 | 5/2016 | Katoh et al. | |
| 2016/0148679 A1 | 5/2016 | Yoshimoto et al. | |
| 2016/0148680 A1 | 5/2016 | Yoshimoto et al. | |
| 2016/0156476 A1 | 6/2016 | Lee et al. | |
| 2016/0218146 A1 | 7/2016 | Lee et al. | |
| 2016/0284413 A1 | 9/2016 | Chang | |
| 2016/0323096 A1 | 11/2016 | Kara-Ivanov et al. | |
| 2016/0328578 A1 | 11/2016 | Plusquellic et al. | |
| 2016/0364583 A1 | 12/2016 | Benoit et al. | |
| 2017/0046129 A1 | 2/2017 | Cambou | |
| 2017/0048072 A1 | 2/2017 | Cambou | |
| 2017/0053708 A1 | 2/2017 | Wong et al. | |
| 2017/0126414 A1 | 5/2017 | Goel et al. | |
| 2017/0279606 A1 | 9/2017 | Kara-Ivanov et al. | |
| 2018/0039581 A1 | 2/2018 | Hung et al. | |
| 2018/0039784 A1 | 2/2018 | Hung et al. | |
| 2018/0040356 A1 | 2/2018 | Hung et al. | |
| 2018/0091293 A1 | 3/2018 | Suresh et al. | |
| 2018/0176012 A1 | 6/2018 | Hung et al. | |
| 2018/0183613 A1 | 6/2018 | Dafali et al. | |
| 2018/0191512 A1 | 7/2018 | Tomishima | |
| 2018/0278418 A1 | 9/2018 | Chang et al. | |
| 2020/0186339 A1 | 6/2020 | Hung et al. | |

FOREIGN PATENT DOCUMENTS

| | | |
|---|---|---|
| CN | 105518786 A | 4/2016 |
| CN | 105518787 A | 4/2016 |
| CN | 105632543 A | 6/2016 |
| CN | 104518780 B | 12/2017 |
| CN | 105528560 B | 9/2018 |
| CN | 105474167 B | 11/2018 |
| EP | 2911086 A1 | 8/2015 |
| TW | 200913627 A | 3/2009 |
| TW | 201015554 A | 4/2010 |
| TW | 201419029 A | 5/2014 |
| TW | 201500963 A | 1/2015 |
| TW | 201512893 A | 4/2015 |
| WO | 2009002599 A2 | 12/2008 |
| WO | 2010035202 A1 | 4/2010 |

(56) References Cited

FOREIGN PATENT DOCUMENTS

| WO | 2014076151 | A1 | 5/2014 |
|---|---|---|---|
| WO | 2015035033 | A1 | 3/2015 |
| WO | 2015105687 | A1 | 7/2015 |
| WO | 2015-134037 | A1 | 9/2015 |

OTHER PUBLICATIONS

Federal Information Processing Standards Publication 197, Announcing the Advanced Encryption Standard (AES), Nov. 26, 2001, 51 pages.
Texas Instruments Data Sheet bq26100 SHA-1/HMAC Based Security and Authentication IC with SDQ Interface, Jun. 2006, revised Aug. 205; 29 pages.
Tiri et al. "A Digital Design Flow for Secure Integration Circuits," IEEE Trans. on Computer-Aided Design of Integrated Circuits and Systems, vol. 25, No. 7, Jul. 2006, 12 pages.
U.S. Office Action from U.S. Appl. No. 15/601,251 dated Sep. 5, 2018, 18 pages.
U.S. Office Action from U.S. Appl. No. 15/601,515 dated Nov. 2, 2018, 10 pages.
U.S. Appl. No. 15/601,515 Non-Final Action dated May 17, 2018, 10 pages.
Fischer, "A Closer Look at Security in Random Number Generators Design," Int'l Workshop on Constructive Side-Channel Analysis and Secure Design COSADE, May 3-4, 2012, pp. 167-182.
Haahr, "Introduction to Randomness and Random Numbers," random.org, https://www.random.org/randomness/, downloaded on Jul. 26, 2017, 4 pages.
Herder et al. "Physical Unclonable Functions and Applications: A Tutorial," Proceedings of the IEEE l vol. 102, No. 8, Aug. 2014, pp. 1126-1141.
Ruhrmair, et al. "PUFs at a Glance," Proceedings of the conference on Design, Automation & Test in Europe Article No. 347, Dresden, Germany—Mar. 24-28, 2014, 6 pages.
Yoshimoto, et al., "A ReRAM-based physically unclonable function with bit error rate < 0.5% after 10 years at 125° C. for 40nm embedded application," 2016 IEEE Symposium on VLSI Technology, Honolulu, HI, Jun. 14-16, 2016, pp. 1-2.
EP Extended Search Report dated Aug. 8, 2018 from related Application EP18151137.9—1218, 8 pages.
EP Extended EP Search Report from 18155514.5 dated Aug. 8, 2018, 8 pages.
U.S. Office Action from U.S. Appl. No. 15/601,251 dated Mar. 12, 2019, 21 pages.
U.S. Office Action from U.S. Appl. No. 15/601,515 dated Feb. 8, 2019, 13 pages.
EP OA dated Oct. 2, 2019 from related Application EP18151137.9—4 pages.
EP OA dated May 18, 2020 from related Application EP18151137.9—5 pages.
Federal Information Processing Standards Publication 140-2 (Supercedes FIPS Pub 140-1, Jan. 11, 1994), "Security Requirements for Cryptographic Modules,", Dec. 3, 2002, 69 pages.
NIST Special Publication 800-38D, Dworkin, "Recommendation for Block Cipher Modes of Operation: Galois/Counter Mode (GCM) and GMAC," Nov. 2007, 39 pages.
NIST Special Publication 800-90A, Barker et al., "Recommendation for Random Number Generation Uing Deterministic Random Bit Generators," Jan. 2012, 136 pages.
U.S. Office Action from U.S. Appl. No. 15/864,445 dated Feb. 6, 2020, 24 pages.
Xu et al, "Reliable Physical Unclonable Functions Using Data Retention Voltage of SRAM Cells," IEEE Trans. on Computer-Aided Design of ICs and Systems, vol. 34, No. 6, Jun. 2015, 903-914.

* cited by examiner

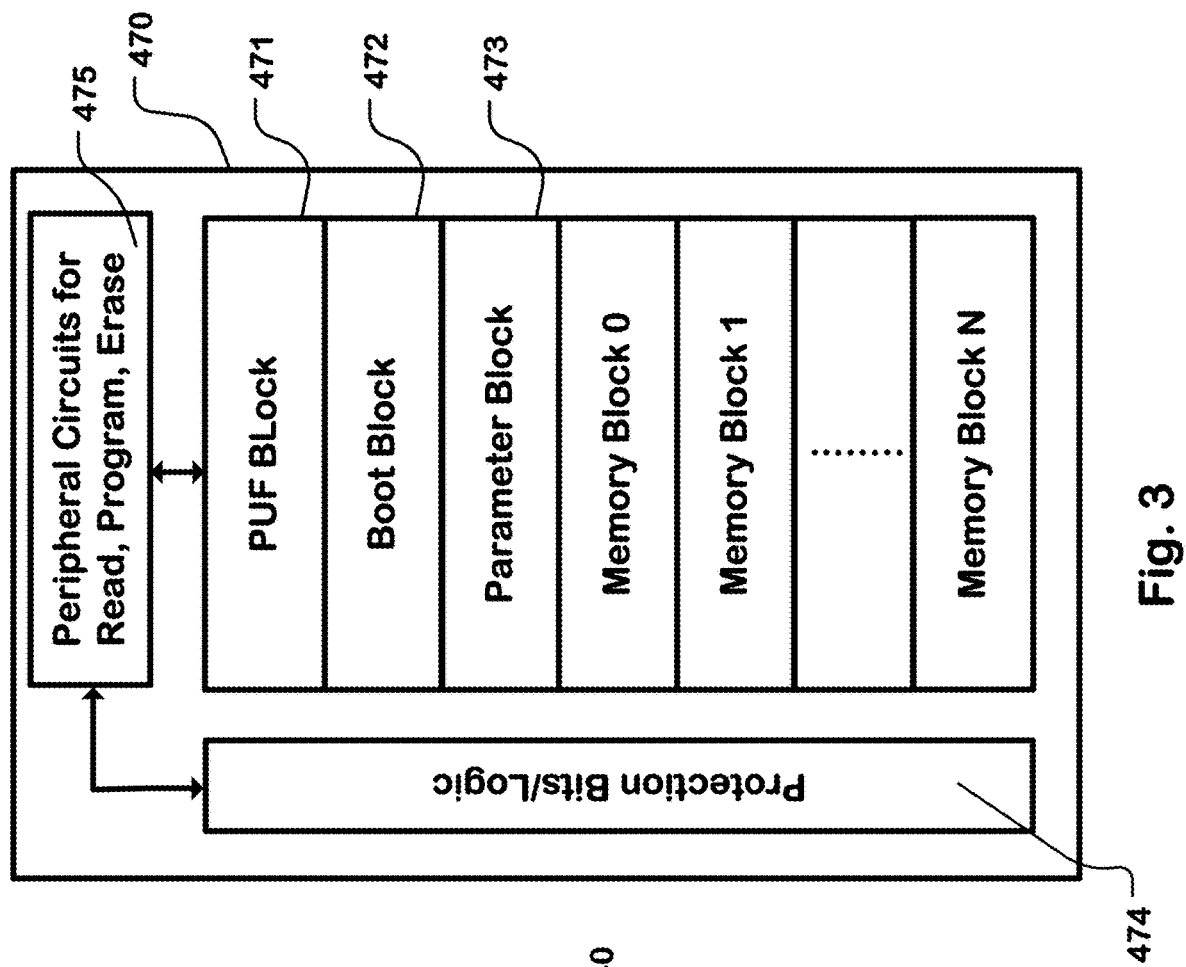
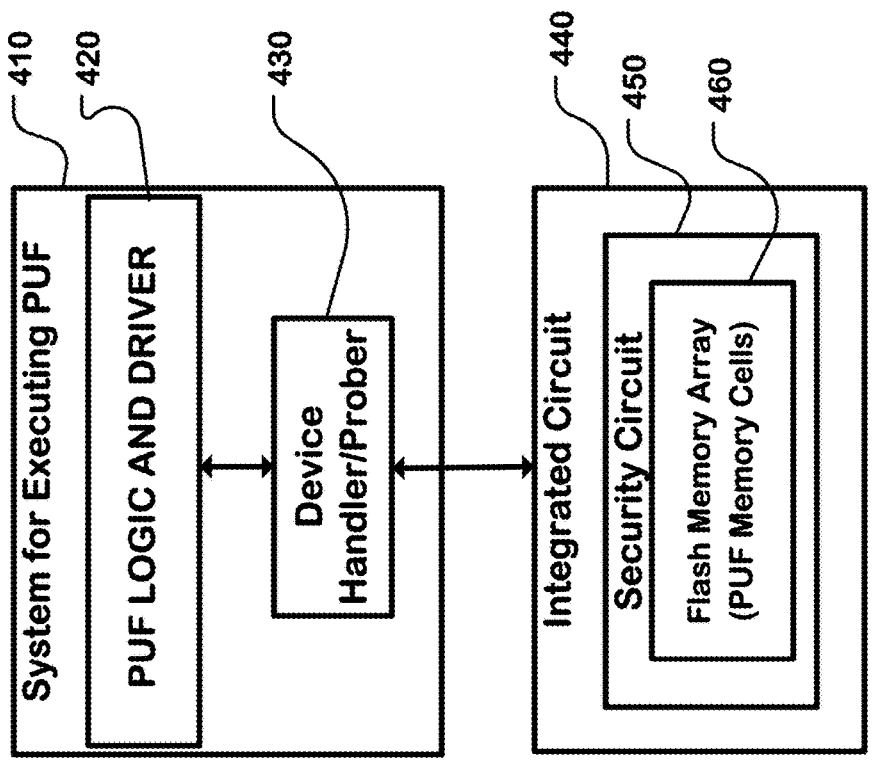

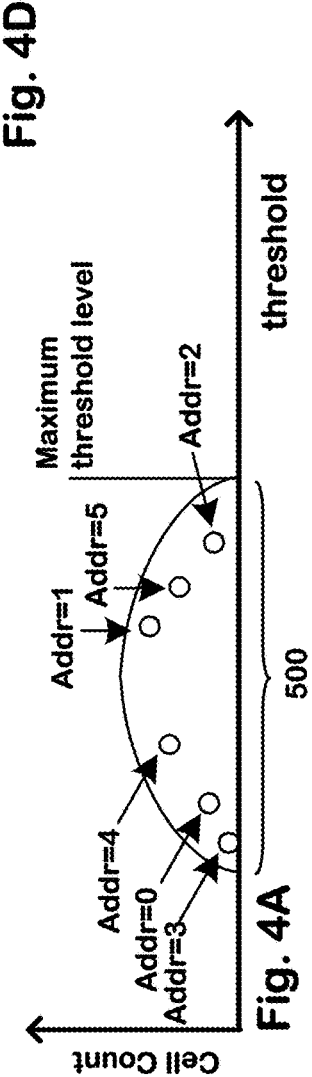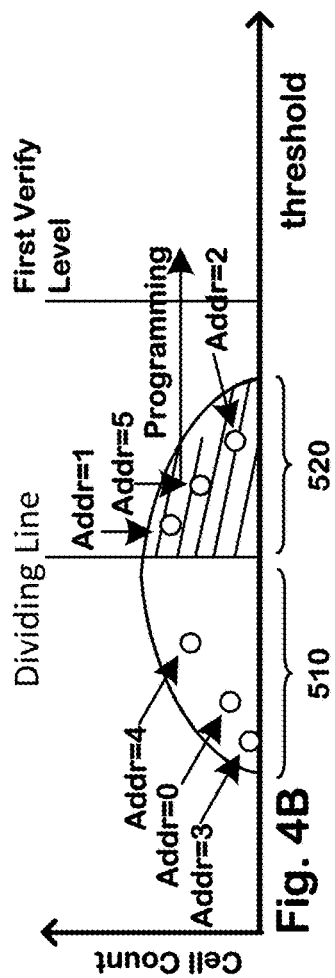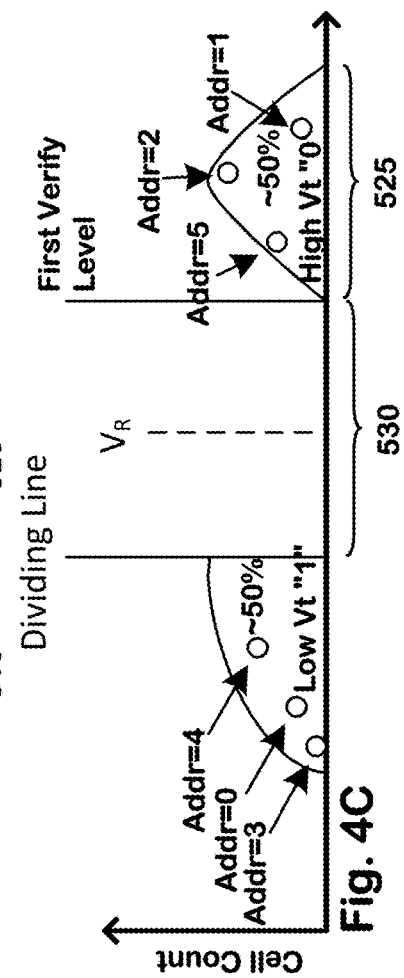

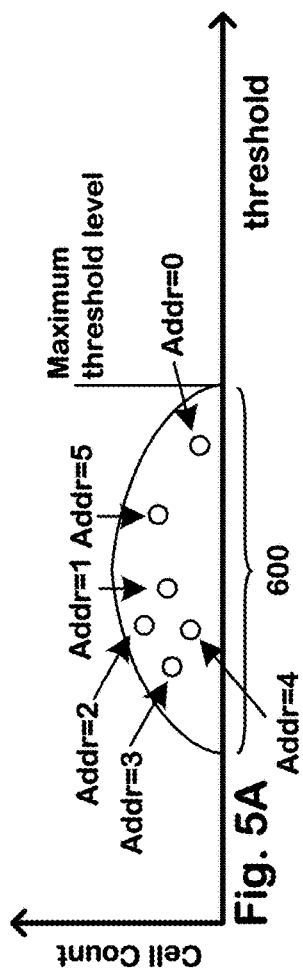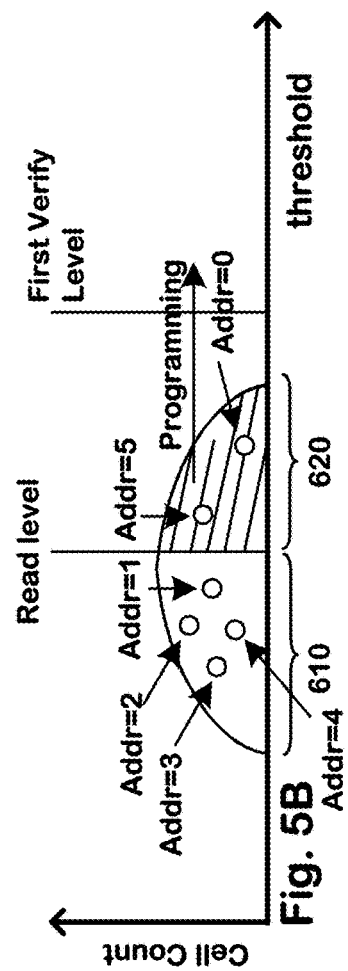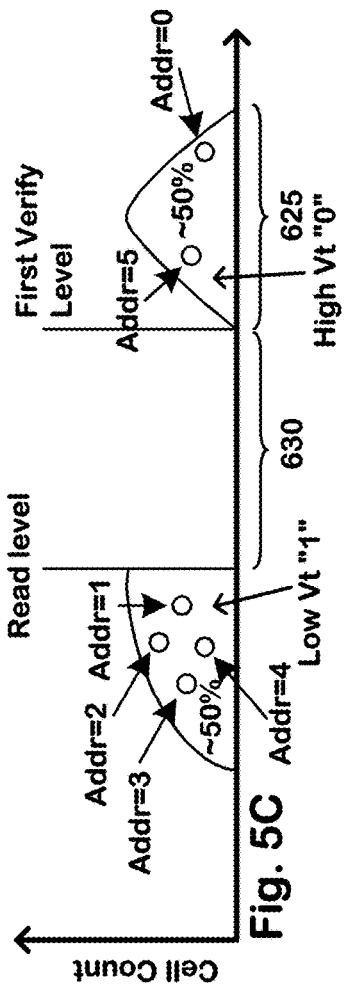

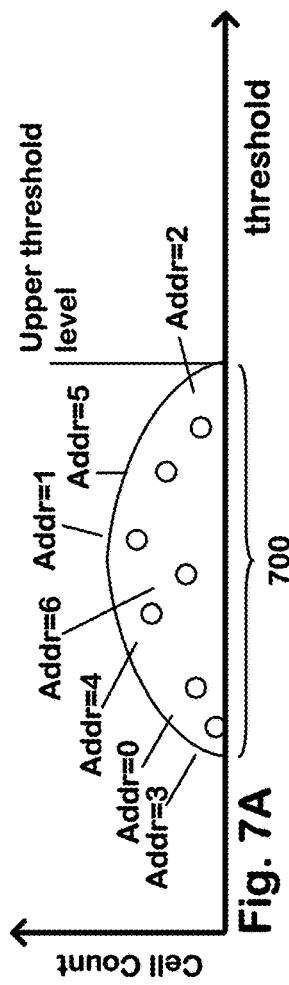
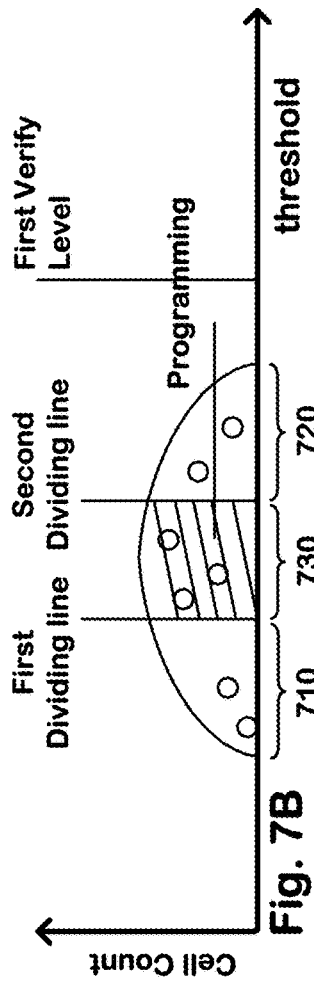
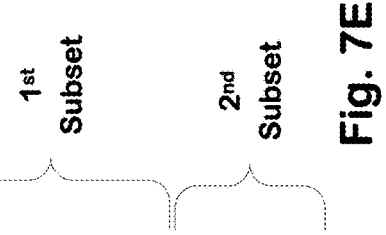
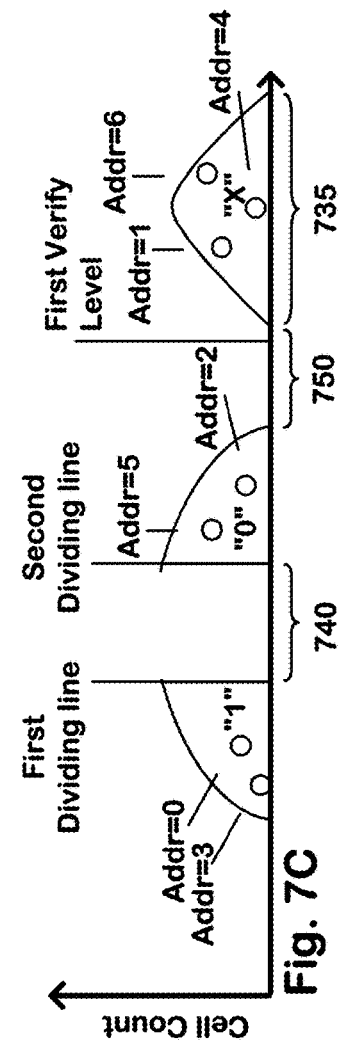

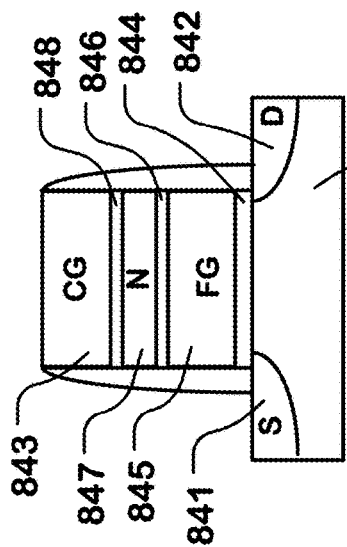
Fig. 10D
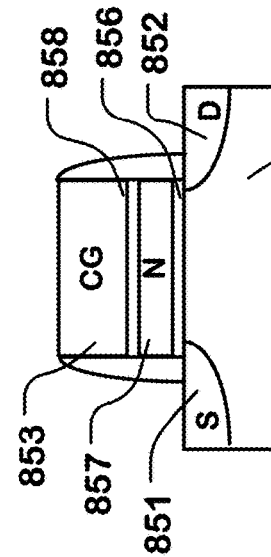
Fig. 10E
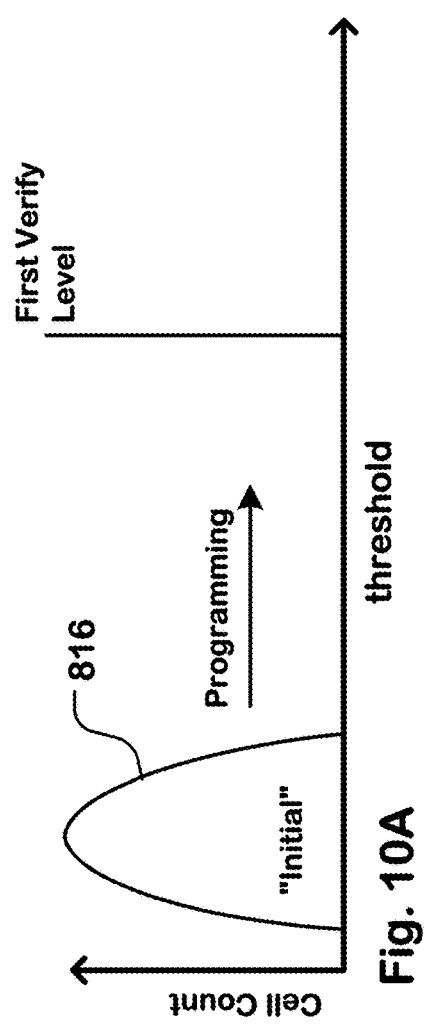
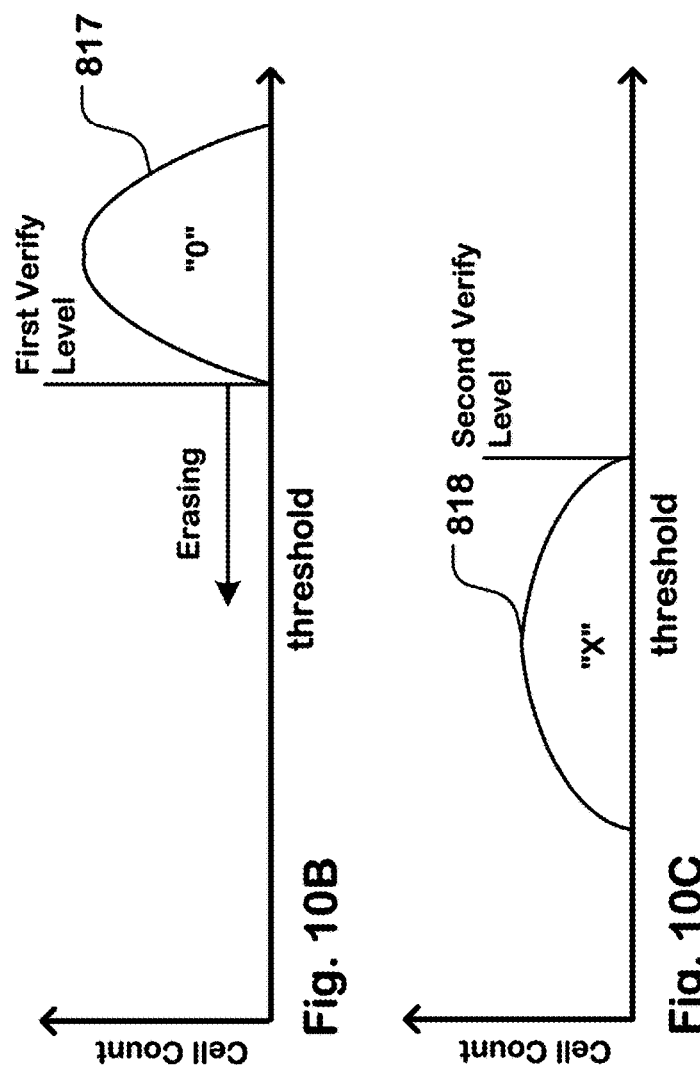

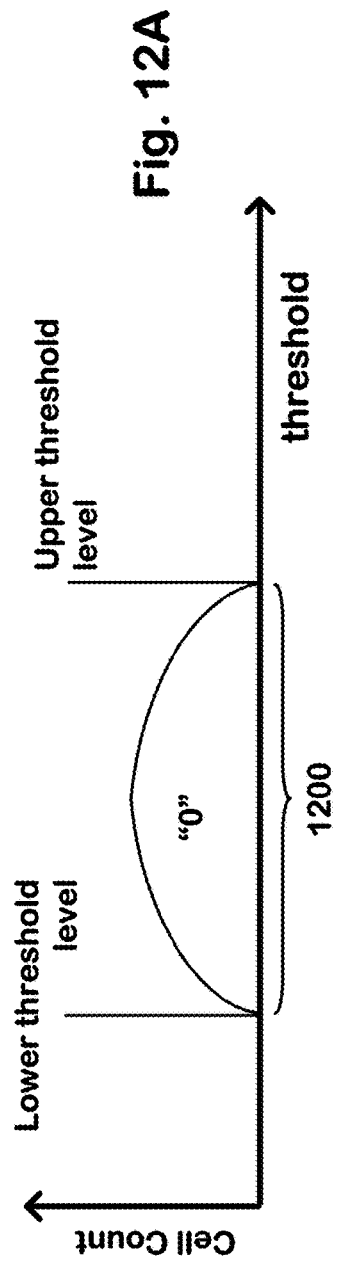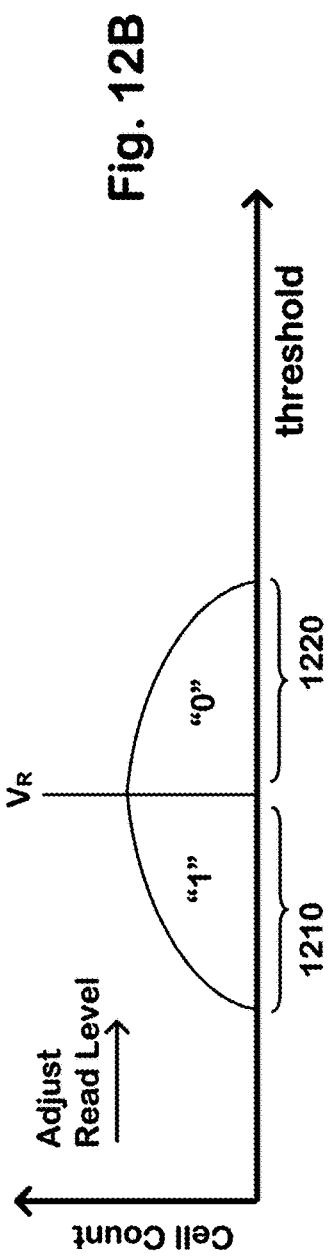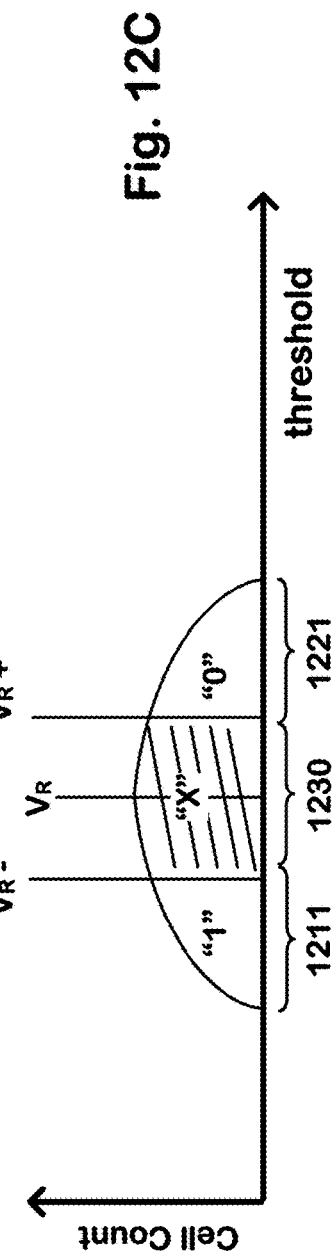

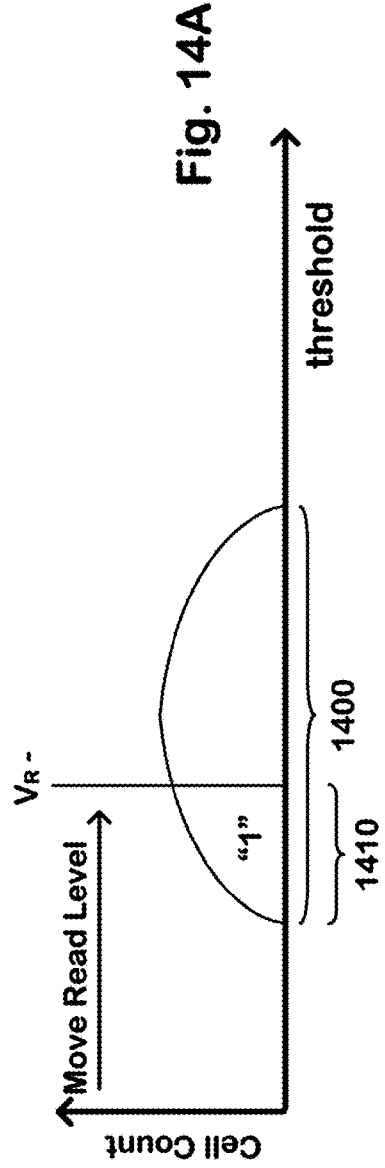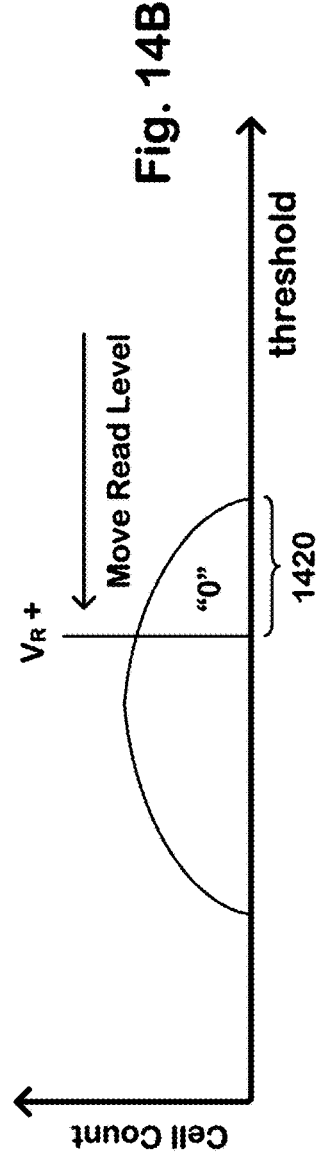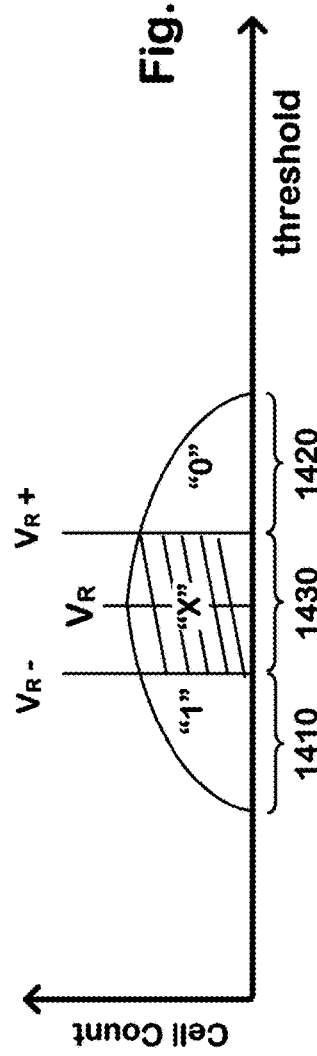

Security ID generator block

| 1 | 2 | 3 | 4 | 5 | ← Address |
|---|---|---|---|---|---|
| 0 | x | x | 0 | 1 | ← Code Information |
| 6 | 7 | 8 | 9 | 10 | ← Address |
| x | x | 0 | 1 | 0 | ← Code Information |

Mapping table

| 1 | 2 | 3 | 4 | 5 | ← Address |
|---|---|---|---|---|---|
| 1 | 0 | 0 | 1 | 1 | ← Flag |
| 6 | 7 | 8 | 9 | 10 | ← Address |
| 0 | 0 | 1 | 1 | 1 | ← Flag |

Flag "1" : valid area
Flag "0" : invalid area

FIG. 20

NON-VOLATILE MEMORY WITH PHYSICAL UNCLONABLE FUNCTION AND RANDOM NUMBER GENERATOR

PRIORITY APPLICATIONS

Benefit of U.S. Provisional Application No. 62/528,460, filed 4 Jul. 2017, entitled Permanent and Unchangeable NVM-PUF, is claimed;

Benefit of U.S. Provisional Application No. 62/509,204, filed 22 May 2017, entitled NVM PUF with RNG, is claimed; and The present application is a continuation-in-part of U.S. patent application Ser. No. 15/601,582 filed 22 May 2017 (now U.S. Pat. No. 10,715,340), entitled NON-VOLATILE MEMORY WITH SECURITY KEY STORAGE, and in which benefit of U.S. provisional applications is claimed, including:

U.S. Provisional Application No. 62/435,337, filed 16 Dec. 2016, entitled Non-volatile Memory Based Physical Unclonable Function;

U.S. Provisional Application No. 62/435,092, filed 16 Dec. 2016, entitled Stable Physically Unclonable Function;

U.S. Provisional Application No. 62/431,835, filed 9 Dec. 2016, entitled Flash-based Physically Unclonable Function;

U.S. Provisional Application No. 62/430,196, filed 5 Dec. 2016, entitled Non-volatile Memory Based Physical Unclonable Function;

U.S. Provisional Application No. 62/423,753, filed 17 Nov. 2016, entitled NVM-based Physically Unclonable Function; and U.S. Provisional Application No. 62/370,736, filed 4 Aug. 2016, entitled NVM-based Physically Unclonable Function.

BACKGROUND

Field

The present invention relates to integrated circuits which include flash memory or other non-volatile memory, with security features that utilize a unique key or unique identification code.

Description of Related Art

Integrated circuit memory devices comprising non-volatile memory, such as flash memory, are being developed with very high capacities. Some technologies are considered likely to enable terabit-scale arrays on integrated circuits. Also, memory devices are being deployed in so called "internet of things IoT" devices, interconnected by networks that operate with, for example, internet protocol communications technologies. A concern for IoT devices, and other devices that store data, is data security. Thus, security protocols requiring encryption with unique keys, authentication with unique IDs and challenge/response technologies are being deployed.

Security protocols require key management technologies to generate, update, store and protect the unique keys and IDs utilized.

A physical unclonable function (PUF—also called a "physically unclonable function") is a process usable to create a unique, random key for a physical entity such as an integrated circuit. Use of a PUF is a solution for generating keys used for chip IDs supporting a hardware intrinsic security (HIS) technology. A circuit that generates a PUF is, or includes, a physical entity embodied in a physical structure which produces a code that is easy to evaluate but hard to predict.

PUFs have been used for key creation in applications with high security requirements, such as mobile and embedded devices. An example PUF is a ring-oscillator PUF, that uses the manufacturing variability intrinsic to circuit propagation delay of gates. Another example PUF is an SRAM PUF, where threshold voltage differences in the transistors result in the SRAM powering up in either a logic "0" or logic "1". See "Physical Unclonable Functions and Applications: A Tutorial" by Charles Herder et al., Pages 1126-1141, Proceedings of the IEEE | Vol. 102, No. 8, August 2014.

A PUF that uses the physical property of resistive random access memory has been proposed. See "A ReRAM-based Physically Unclonable Function with Bit Error Rate<0.5% after 10 years at 125° C. for 40 nm embedded application" by Yoshimoto et al., Pages 198-199, 2016 Symposium on VLSI Technology Digest of Technical Papers. The application presented in the paper proposes an improvement on the conventional ID-generating method of ReRAM-PUF which increases bit error rates due to aging degradation. However, in this ReRAM-based PUF, the data created can still be corrupted by drift in the resistance of the memory cells, which can make a bit error rate unacceptable when accessing or using the stored key. Such resistance drift can be more pronounced at high temperature encountered in some applications of integrated circuits, such as in automotive applications.

When using data sets generated using PUF circuits, prior art technologies have relied upon error correcting codes to improve reliability because of the problems with high bit error rates. See, for example, Lee et al., U.S. Patent Application Publication No. 2016/0156476, "Physically Unclonable Function Circuits and Methods of Performing Key Enrollment in Physically Unclonable Function Circuits," published 2 Jun. 2016.

It is desirable to provide technology for integrated circuits including non-volatile memory that supports the use of PUF generated keys and other unique keys. Further, it is desirable that devices deploying the technology be easy to make but produce codes that are practically impossible to duplicate or predict, even knowing the exact manufacturing process that produced it.

SUMMARY

Devices and systems are described which can improve the flexibility and reliability of security circuitry that utilizes physical unclonable functions, and random number generators to produce enhanced keys. Technology is described here to increase entropy of security keys using a combination of pseudo-random number generators and PUF circuits.

The devices and systems described herein are suitable for use in internet-of-things devices, and can be implemented in a wide variety of environments.

A device is described, which can be implemented on a single packaged integrated circuit or a multichip module that comprises a random number generator to generate a random number and circuits to execute a PUF to produce a PUF key. The device can comprise logic to produce an enhanced key by logically combining the PUF key and the random number. The PUF can include using a first set of non-volatile memory cells, and the enhanced key can be stored in a second set of non-volatile memory cells on the device. In embodiments described herein, the logic to produce an enhanced key can include an XOR function that performs bit-wise or byte-wise XOR of the PUF key and the random number, to produce an enhanced key. In another approach, the logical combination can include a hash function mapping the PUF key and the random number to hash values as the enhanced key. In embodiments described herein, the physical unclonable function can use entropy derived from non-volatile memory cells in the plurality of non-volatile memory cells to produce the PUF key. The random number generator can comprise a pseudo-random number generator or determinative random number generator that generates a random number that is a function of a changing seed value.

A device is described, for example, which can be implemented in a single packaged integrated circuit or multichip module that comprises a non-volatile memory array including a plurality of blocks of memory cells with a key stored in a particular block of the plurality of blocks. A port for external communication of data from the array is included. Security logic is coupled to the memory array which utilizes the enhanced key in a protocol to enable access to data, or to decrypt or encrypt data, stored in the blocks in the plurality of blocks. Access control circuits are coupled to the array and include logic to enable read-only access to the particular block storing the enhanced key by the security logic for use in the protocol, and to prevent access to the particular block by external communication networks or devices via the port. The access control circuits can have a first state in which access to the particular block via the port to write the key is enabled, and a second state in which access to the particular block is disabled for read or write via the port, but access to the particular block is enabled for read by the security logic during execution of the security protocol with the host or other external device. The packaged integrated circuit or multichip module can include logic to execute a function, including a physical unclonable function such as, for example, functions described herein that rely on charge-trapping non-volatile memory cells as the physical circuits, using a set of memory cells in the memory array to produce the initial PUF key, and a random number generator to produce a random number to be combined by combinatorial logic to produce an enhanced key. In embodiments described herein, a plurality of keys and enhanced keys can be stored on the integrated circuit in the particular block, or in different blocks. Also, the security logic can be configured to use a particular key in the plurality of keys one time, or a limited number of times, to enable access to data stored in blocks in the plurality of blocks. In some embodiments, the key stored in the particular block can be a large key, including for example thousands or millions of bits.

A method is provided for generating a data set usable as a unique identifier or key, on an integrated circuit using entropy derived from charge trapping non-volatile memory cells including floating gate and dielectric charge trapping technologies, and in some embodiments using other types of non-volatile memory cells, combined with entropy derived from a random number generator. The method can include a physical unclonable function which results in establishing variant thresholds, such as threshold voltages, within memory cells in the set. The method can be used to produce stable, PUF-based data sets, usable with zero or very low bit error rates.

An apparatus as described comprises a set of charge trapping memory cells, such as flash memory cells. Circuitry, which is on the integrated circuit, on a processor system having access to the integrated circuit, or includes parts on both, is included, having access to the set of charge trapping memory cells used to provide a data set using the set of charge trapping memory cells. The data set is combined with a random number to provide an enhanced key having greater entropy than the data set, and greater entropy than the random number.

In one embodiment, the enhanced key is produced using a PUF key and a random number generator in a manner that increases entropy of the output of the random number generator, by providing the PUF key as a seed to the random number generator that is virtually impossible to predict.

A method for generating a data set on an integrated circuit including programmable memory cells, such as flash memory cells, is described. The method includes exposing a set of programmable memory cells having addresses on the integrated circuit to a common process inducing variant thresholds and members of the set within a starting distribution of thresholds. The method includes finding a first subset of the set of programmable memory cells having thresholds in a first part of the distribution, and a second subset of the set of programmable memory cells having thresholds in a second part of the starting distribution. The method includes generating a data set using addresses of at least one of the first and second subsets, and a random number generator.

In one embodiment, the data set is generated using the addresses to select memory cells in one of the first and second subsets, and apply a biasing operation to the selected memory cells to establish a sensing margin between the first and second subsets of memory cells. The sensing margin can be established, in one embodiment, by addressing the memory cells in a selected one of the subsets, and applying a biasing operation to the addressed memory cells which changes their threshold to a threshold distribution outside of the starting distribution. The data set can be generated thereafter, by reading memory cells in the set of programmable memory cells using a read voltage that is within the sensing margin.

In another embodiment, the data set is generated by combining the addresses of memory cells in at least one of the first and second subsets as a function of membership in the subsets, and as a function of their addresses. One technique for combining the addresses can comprise concatenating the addresses of one of, or each of, the subsets in order. The data set comprising the combined addresses can be stored in a memory on the integrated circuit which is different from the set of programmable memory cells.

In another technique described herein, the data set is generated by finding a first dividing line and a second dividing line different than the first dividing line, in the starting distribution; identifying a first subset of the set of the programmable memory cells having thresholds below the first dividing line in a first part of the starting distribution, and a second subset of the set of the programmable memory cells having thresholds above the second dividing line in a second part of the starting distribution; and generating a data set using addresses of at least one of the first and second subsets.

One approach for finding the dividing lines includes determining a threshold voltage in the starting distribution at which a ratio of a count of memory cells having thresholds below the threshold voltage to a count of the memory cells having thresholds above the threshold voltage is within a target range of ratios, and setting the first dividing line by subtracting a first constant from the threshold voltage, and setting the second dividing line by adding a second constant to the threshold voltage. Another approach for finding the dividing lines includes iteratively reading the data values in the set of programmable memory cells using a moving first read voltage, and counting memory cells in the set having thresholds below the first read voltage, and setting the dividing line using the first read voltage at which the count is within a first target range of counts; and iteratively reading the data values in the set of programmable memory cells using a moving second read voltage, and counting memory cells in the set having thresholds above the second read voltage, and setting the second dividing line using the second read voltage at which the count is within a second target range of counts.

A method for operating a circuit including a plurality of non-volatile memory cells and a random number generator is described. The method includes executing a physical unclonable function to generate an initial key; storing the initial key in a set of non-volatile memory cells; executing a random number generator to generate a random number; logically combining the initial key and the random number to produce an enhanced key; storing the enhanced key in a second set of non-volatile memory cells in the plurality of non-volatile memory cells; and after storing the initial key, disabling changes to data stored in the set of non-volatile memory cells. A method of manufacturing an integrated circuit in accordance with the method for generating a data set provided herein is also described.

An apparatus is described that comprises a set of programmable memory cells on an integrated circuit, and logic to generate a data set by processes described herein.

Other aspects and advantages of the present invention can be seen on review of the drawings, the detailed description and the claims, which follow.

BRIEF DESCRIPTION OF THE DRAWINGS

FIG. 2 illustrates another example of an apparatus comprising a plurality of programmable memory cells, and a controller for executing a PUF to provide a data set using the plurality of programmable memory cells.

FIG. 3 illustrates blocks of programmable memory cells in a flash memory on an integrated circuit, including a PUF block.

FIGS. 4A-4E illustrate an example of generating a data set by finding first and second subsets of a set of programmable memory cells and establishing a stable data set based on the identified first and second subsets.

FIGS. 5A-5E illustrate another instance of generating a data set as discussed with reference to FIGS. 4A-4E, showing variations in the data set even though the same process is applied.

FIGS. 7A-7E illustrate an example of generating a data set by finding first, second and third subsets of a set of programmable memory cells and building an address map for the data set.

FIGS. 10A-10C illustrate setting thresholds of the programmable memory cells in the set to the starting distribution.

FIGS. 10D-10F illustrate example flash memory cell technologies usable for generating data sets as described herein.

FIGS. 12A-12C illustrate a process which can be used for generating a data set in reliance on the variance in threshold voltages in charge trapping memory cells.

FIGS. 14A-14C illustrate an alternative process which can be used for generating a data set in reliance on the variance in threshold voltages in charge trapping memory cells.

FIG. 20 illustrates a data structure usable to store a security ID and an address map which are produced according to some embodiments of physical unclonable functions as described herein, and can be stored in a system such as that of FIG. 17.

DETAILED DESCRIPTION

Figure 1:
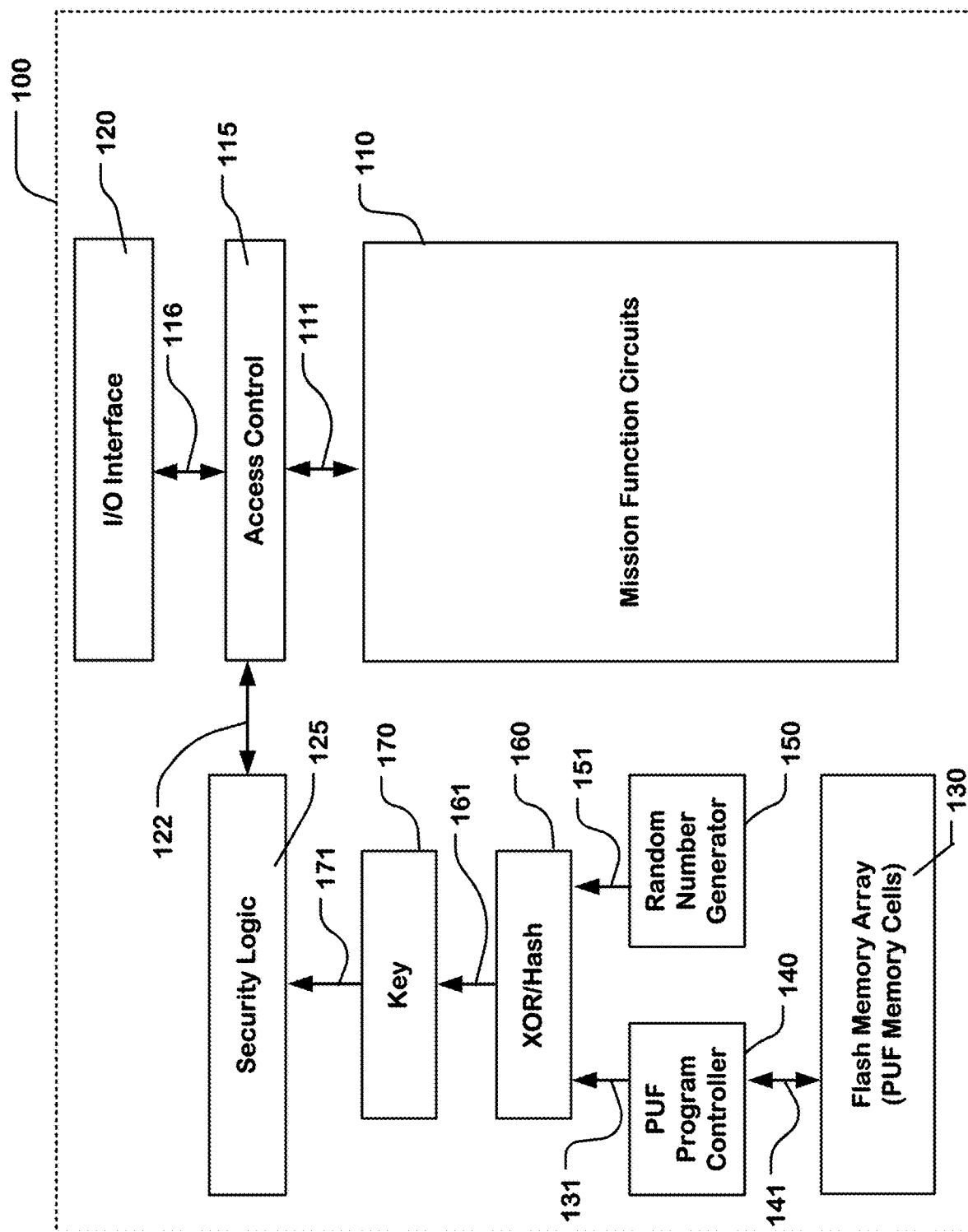
FIG. 1 is a simplified block diagram of an apparatus comprising a plurality of flash memory cells, and a controller for executing a PUF and a random number generator to provide a data set using the plurality of flash memory cells.

A detailed description of embodiments of the present technology is provided with reference to the Figures. It is to be understood that there is no intention to limit the technology to the specifically disclosed structural embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows. Like reference numerals commonly refer to like elements in various embodiments.

FIG. 1 is a simplified block diagram of an apparatus comprising a plurality of programmable memory cells, and a controller for executing a PUF and a random number generator to provide a data set using the plurality of programmable memory cells. In this example, the apparatus comprises an integrated circuit 100 having a memory formed using programmable memory cells. A flash memory array 130 can be used by a PUF to provide a unique data set. Another embodiment, in which the mission function circuits 110 are a flash memory array comprising a plurality of blocks of memory cells, is described below with reference to FIG. 17. Other embodiments are described herein as well.

The integrated circuit 100 includes mission function circuits 110, which can comprise special purpose logic sometimes referred to as application-specific integrated circuit logic, data processor resources such as used in microprocessors and digital signal processors, large-scale memory such as flash memory, SRAM memory, DRAM memory, programmable resistance memory and combinations of various types of circuits known as system-on-a-chip SOC configurations or application-specific integrated circuits ASICs. The integrated circuit 100 includes an input/output interface 120, which can comprise wireless or wired ports providing access to other devices or networks. In this simplified illustration, an access control block 115 is disposed between the input/output interface 120, and the mission function circuits 110. The access control block 115 is coupled by bus 116 to the input/output interface 120, and by bus 111 to the mission function circuits 110. An access control protocol is executed by the access control block 115 to enable or disable communications between the mission function circuits 110 and the input/output interface 120, to provide encryption or decryption of data traversing the input/output interface 120, and to provide other services in support of the security logic or to provide combinations of the same.

In support of the access control block 115, security logic 125 is disposed on the chip in this example. Security logic 125 is coupled to a set of flash memory cells which can be part of flash memory array 130. A PUF stored in the set of flash memory cells then provides or is used to provide a unique data set as an initial key. Security logic 125 is also coupled to a random number generator 150 that generates a random number on a bus 151. Logic circuitry 160 can combine the initial key and the random number to produce an enhanced key 170 via a bus 161. In embodiments, logic circuitry 160 can include an XOR function using the initial key and the random number as inputs and producing an output as the enhanced key, and a hash function mapping the initial key and the random number to hash values as the enhanced key. In some examples, the initial PUF key on line 131 can have N bits, the random number on line 151 can have M bits and the enhanced key on line 161 can have X bits, where X is smaller than N+M, or in other embodiments, X is smaller than at least one of M and N. The enhanced key 170 is accessible on a bus 171 by the security logic 125, and utilized by the security logic in communications across line 122 with the access control block 115.

In this example of the apparatus, the PUF program controller 140, implemented for example as a state machine on the integrated circuit with the flash memory array 130, provides signals to control the application of bias arrangement supply voltages to carry out the procedures to generate the data set, and other operations involved in accessing the array 130 and for reading the data set provided using the memory array 130. Circuitry, which is on the integrated circuit, such as bit lines, word lines, drivers for the same and so on, provides access to the set of charge trapping memory cells used to provide a data set using the set of charge trapping memory cells.

A PUF program controller 140 on the integrated circuit includes logic to perform some or all of the operations used to generate the data set. In one embodiment, the PUF program controller 140 on the integrated circuit includes the logic necessary to perform the biasing operations, and can execute the logic in response to a set-up command from an external source, without control from an off-chip system.

In some embodiments, the PUF program controller 140 includes the logic inhibiting to program or erase biasing operations on the PUF memory cells in response to an indicator.

The controller can be implemented using special-purpose logic circuitry including a state machine as known in the art. In alternative embodiments, the controller comprises a general-purpose processor, which can be implemented on the same integrated circuit, which executes a computer program to control the operations of the device. In yet other embodiments, a combination of special-purpose logic circuitry and a general-purpose processor can be utilized for implementation of the controller.

In some embodiments, an external processor system can include circuitry for providing access to the integrated circuit and logic used for generation of the data set. The external processor system can include circuitry such as wafer probe circuits, control buses, voltage sources, and the like, used to provide the data set in combination with the circuitry on the integrated circuit. Logic circuits and biasing circuitry having access to the set of memory cells used to control the procedures can include parts on both the external processor system and the integrated circuit.

The examples described herein utilize charge trapping memory cells such as utilized in some kinds of flash memory. The charge storage structures in charge trapping memory cells can include polysilicon or other conductive or semi-conductive floating gate structures, and can include multilayer dielectric charge trapping structures known from flash memory technologies as ONO (oxide-nitride-oxide), ONONO (oxide-nitride-oxide-nitride-oxide), SONOS (silicon-oxide-nitride-oxide-silicon), BE-SONOS (bandgap engineered silicon-oxide-nitride-oxide-silicon), TANOS (tantalum nitride, aluminum oxide, silicon nitride, silicon oxide, silicon), and MA BE-SONOS (metal-high-k bandgap-engineered silicon-oxide-nitride-oxide-silicon).

In other embodiments, the programmable memory cells used in the PUF memory cells to provide the data set can include programmable resistance memory cells or other types of memory cells. The programmable resistance memory cells used to provide the data set can include a programmable element having a programmable resistance readable with reference to threshold resistances. The programmable resistance element can comprise, for example, a metal oxide or a phase change material.

FIG. 2 illustrates another example of an apparatus comprising a set of programmable memory cells on an integrated circuit, and logic to generate a data set using the set of programmable memory cells. In this example, the apparatus comprises a processor system 410 used for executing or causing execution of a process to generate a data set as discussed herein, on an integrated circuit 440. The integrated circuit 440 is connected to the processor system 410 during manufacturing before packaging, such as in wafer form in some embodiments. In other embodiments, the system 410 is connected to the integrated circuit in a packaged form.

An example system used for executing a process to generate a PUF-based data set on an integrated circuit can include a programmed process executed in a manufacturing line using equipment used for testing, or using equipment like that used for testing, which includes circuitry for accessing the integrated circuit such as wafer probe circuits, voltage sources, and the like. For example, a manufacturing line may have multiple device testers, multiple device probers, multiple device handlers, and multiple interface test adapters configured to connect to the integrated circuits which can be configured to control execution of the procedures described herein. In an alternative, a system may be configured to interact with packaged integrated circuits, and may be deployed away from the manufacturing line for the integrated circuit, such as at an assembly installation for an original equipment manufacturer utilizing the integrated circuits.

As shown in FIG. 2, an example system 410 includes PUF logic and driver 420, and a device handler/prober 430. An integrated circuit 440 to be subjected to the PUF logic and driver 420 is coupled to the device handler/prober 430. The integrated circuit 440 includes a security circuit 450. A large-scale flash memory array 460 in the security circuit 450 in this example is utilized for generation of the data set using the PUF.

An example integrated circuit in the system 410 may be an integrated circuit 100, as described with reference to FIG. 1. During manufacturing of the integrated circuit 100, the system 410 performs the actions identified herein to produce the data set including an enhanced key, and can save a copy of the data set, or data derived from the data set, as a shared secret between the integrated circuit and a processor system (e.g. 410) in the factory. In alternative embodiments, in the field, after manufacturing of an integrated circuit, a user can generate a data set in the memory array 460 on the integrated circuit, for example using the processor system 410, so the data set can be saved as a shared secret between the integrated circuit and a processor system (e.g. 410) in the field, rather than in the factory.

FIG. 3 illustrates a large-scale flash memory array 470 which can be the mission function circuits or part of the mission function circuits on an integrated circuit, with which the security circuit as described herein is utilized. A flash memory array 470 can include blocks of flash programmable memory cells (e.g. Memory Blocks 0, 1, . . . N), a PUF block (471), a boot block 472 and a parameter block 473. In addition, a flash memory array can include protection logic 474 for controlling access to the various memory blocks in the array, which includes memory for protection bits. The PUF block 471 can be a particular block in the memory array reserved for, and in some embodiments, specially configured for, the purpose of storing keys.

In embodiments in which the integrated circuit includes a flash memory array as shown in FIG. 3, the flash memory array 460 in the security circuit 450 of the integrated circuit can comprise a block, such as the PUF block 471, in the large-scale flash memory array 470. In other embodiments, the flash memory array 460 in the security circuit 450 is separate from the flash memory array 470, and may comprise memory cells having a different structure and an array having a different architecture than the large-scale memory array 460. Another embodiment including a large scale flash memory is described with reference to FIG. 17 below.

The flash memory array 470 can comprise NOR flash, NAND flash, or other types of flash architectures. As a PUF algorithm, as described herein, is executed over a set of memory cells, the PUF block 471 can comprise enough memory cells to encompass one set, or many sets of suitable size for use by the security circuit 450 for the creation of a PUF data set or many PUF data sets. The read, program and erase logic in the peripheral circuitry 475 associated with the flash memory array 470 can be utilized by the PUF logic and driver 420, or by a state machine on the integrated circuit as discussed above, or by a combination of the driver 420 and a state machine on the integrated circuit, to apply biasing arrangements to change the threshold voltages of memory cells in the PUF block 471 according to the PUF procedures described herein.

The PUF block can be supported by the protection logic 474 to prevent accidental or unauthorized access to the PUF-based data set or to the memory cells storing the data set. The boot block can include a write lock-out feature to guarantee data integrity for the integrated circuit including the memory array. The boot block can store the code necessary to initialize the integrated circuit and invoke a recovery routine if the code is lost. The boot block can store the code necessary to program and erase the flash memory array in the integrated circuit. The parameter block can store parameter data. The protection logic 474 is coupled to the memory blocks and the PUF block 471 for their protection from accidental or unauthorized modification. One example of protection of blocks of memory from modification including using protection codes is shown in Hung et al., U.S. Patent Application Publication No. US 2015-0242158, entitled "*Nonvolatile Memory Data Protection Using Nonvolatile Protection Codes and Volatile Protection Codes,*" published 27 Aug. 2015, which is incorporated by reference as if fully set forth herein.

In some embodiments, the protection logic 474 is configured to inhibit the program and/or erase procedures in response to an indicator which is in an inhibit state, such that changes made to the PUF data set(s) are prohibited. So, the peripheral circuitry 475 associated with the flash memory array 470 utilized by the PUF logic and driver 420 will not apply program and erase pulses to the PUF block 471 if the indicator is set. The indicator can be a fuse, a one-time-programming (OPT) cell, and a register.

In some embodiments, the protection logic 474 can be implemented to perform an authentication process before executing the operations to generate and store a key in PUF block 471. The authentication process can be implemented using a passcode, fingerprint and hardware key for example.

Reference to FIGS. 4A-4E is made to illustrate a process which can be used for generating a data set in reliance on the variance in threshold voltages in charge trapping memory cells which have been subject to a common process, such as a manufacturing sequence, or a common biasing arrangement, which results in charge tunneling into or out of charge storage structures in the memory cells changing the amounts of charge stored in the charge storage structures. The common process which results in establishing a starting distribution can be "unclonable" in the sense that the threshold voltages that result from this common process differ from one set of charge trapping memory cells to another, and from one integrated circuit to another based on variations in process, voltage, and temperature in the individual charge trapping cells in the sets. For this reason, even knowing the common process, one cannot predict the variations in threshold voltage, and therefore cannot predict a resulting data set generated as a function of those variations.

FIG. 4A is a graph of threshold voltage versus cell count, illustrating a starting threshold distribution 500 for memory cells in a set of programmable memory cells, which is established at the beginning of the PUF process. For the purposes of example, points are indicated within the distribution that represent the threshold voltages of memory cells at addresses Addr=0, 1, 2, 3, 4 and 5. As can be seen, the threshold voltages of particular cells are not related to the addresses of the memory cells.

The term "address" is used here to represent a logical signal that can be used to select a memory cell according to a physical order of the memory cells. In memory technologies, addresses are decoded to generate logical signals to control biasing circuitry used to access the memory cells. In some implementations, the "address" may be a logical signal that does not require decoding. In some implementations, the "address" of a cell may be a bit in a mask or mapping table, such as shown in FIG. 20 below. The addresses can be combined by forming a mask, and the combined addresses can be stored in the form of a mask in which each entry in the mask enables or blocks a memory cell at the corresponding address.

The starting distribution 500 can occur due to charge trapping naturally on completion of manufacturing as a result of etching or deposition processes, such as processes involving exposure of the integrated circuit to plasma or ions, for formation of patterned metal layers above the memory cells used in manufacturing. In alternative embodiments, the starting distribution 500 can be established using, for example, a biasing operation controlled by a controller on the integrated circuit, such as an erase operation or the like as described below. In one example, the starting distribution is established for all members of the set of the programmable memory cells using a page erase operation or a block erase operation, where a block includes multiple pages of programmable memory cells. See U.S. Patent Application Publication No. 2016/0284413 A1 titled "*Page Erase in Flash Memory*," published 29 Sep. 2016. The processes that result in establishing the starting distribution are performed without distinguishing among the memory cells in the set by addresses. The processes that result in establishing the starting distribution can be a physical unclonable function, such that the starting distribution is unique, for each set of programmable memory cells subjected to the processes.

In this illustration, the starting distribution 500 has an upper threshold level as indicated in the figure, indicating a threshold level at which the probability of a memory cell in the set having a higher threshold is very low. This upper threshold level might be set, for example, in an algorithm used to establish the starting distribution 500 as an erase verify level, for example.

FIG. 4B illustrates a next stage in the PUF, in which memory cells having thresholds below a dividing line are identified as members of a subset of memory cells having threshold voltages in a first part 510 of the starting distribution. Also, memory cells having thresholds above the dividing line are identified as members of a subset of memory cells having threshold voltages in a second part 520 of the starting distribution. Thus, the set of programmable memory cells has a first subset having thresholds in the first part of the starting distribution (e.g. Addr=0, 3 and 4), and a second subset having thresholds in the second part of the starting distribution (e.g. Addr=1, 2 and 5).

The addresses of memory cells in the first and second subsets can be built by applying a scanning operation on the programmable memory cells using a read voltage on the dividing line, and recording the addresses of memory cells which return a first logical state as the first subset, and the addresses of the memory cells which return a second logical state as the second subset. Recording the addresses can preserve information about the location of the memory cells in each of the subsets used to provide the data set.

In some embodiments, the dividing line can be determined using a finding operation that generates a count of the programmable memory cells in the first subset (having thresholds below the dividing line) and a count of the programmable memory cells in the second subset (having thresholds above the dividing line). The counts can be compared to produce a ratio. The ratio can be set at a value which ensures that the numbers of zeros and ones in the data set are sufficient to maintain a secure data set. For example, it may be desirable that the ratio of zeros to ones be close to 1. For a practical embodiment, a target ratio range can be for example between 2/3 and 3/2, in which case each subset has about 40% to 60% of the memory cells in the whole set. The target ratio range can be adjusted according to design specifications of particular integrated circuits that use the technology as described herein.

The threshold voltages of individual charge trapping cells in the set can drift over time, so that starting distribution 500 represents a distribution that is stable only for a short time. Thus, relying on the starting distribution for the purposes of producing a stable data set is impractical for some types of memory cells where this drift can cause threshold voltages in some cells having thresholds on one side of the dividing line at one point in time to drift to the other side of the dividing line. Thus, techniques are applied to translate the starting distribution into a stable data set which is not sensitive to this drift in threshold voltages.

One technique for translating the starting distribution into a stable data set involves the use of the addresses of memory cells in the first and second subsets. In this technique, the data set based on these variant thresholds can comprise a concatenation of the addresses of one or both of the subsets, or a mask including entries blocking or enabling cells at the addresses. In the example of FIG. 4A, the concatenation of addresses of the first subset and the second subset can be 0, 3, 4, . . . , 1, 2, 5 . . . expressed in binary form in the figure, or variations of this sequence. Of course, in a particular embodiment, there can be hundreds, thousands or millions of addresses in the concatenation of addresses. The concatenated addresses can be stored on the integrated circuit in a memory, such as a protected block of memory different from the set as represented by FIG. 4D. This protected block of memory can be a non-volatile, stable memory providing the ability to deliver the data set with very low bit error rates, and without using error correcting codes in some examples. In alternative embodiments, the addresses of cells in the first and second subsets can be indicated by a mask, such as described below with reference to FIG. 20.

As indicated in the diagram, according to another technique, a stable data set based on the threshold voltages can be created using the same set of non-volatile memory cells. In order to accomplish this embodiment, a programming operation can be executed on memory cells in the second subset to move their threshold voltages above a first verify level such as in a distribution 525 shown in FIG. 4C, which in this example can be higher than this upper threshold level of the starting distribution 500. In other embodiments, the first verify level may be less than the upper threshold level of the starting distribution 500, so long as a sufficient read margin can be produced as discussed below.

After executing the program operation using the first verify level, a changed distribution like that shown in FIG. 4C results. The program operation changes the threshold voltages of the memory cells in the second subset in order to establish a sensing margin 530 between the first and second subsets. The sensing margin 530 can be designed to be wide enough to ensure reliability of an operation reading the data set to determine whether a particular memory cell is a member of the first subset or the second subset. After the changed distribution shown in FIG. 4C is established, the set of memory cells can be read using a read voltage $V_R$ that is within the sensing margin 530 for the read. The sensing margin 530 can be substantial, so that the likelihood of an error in the reading operation is very low.

FIG. 4E is a table representing the data set stored in the same set of memory cells, showing sequential addresses of the memory cells in the set in the first column and a data value (or key) in the second column, which represents a data set generated by the PUF process. In this table, reading memory cells at addresses 0 through 5 yields data values 1 0 0 1 1 0. In practical embodiments, the data set can be hundreds, thousands or millions of bits long.

FIGS. 5A-5E are a sequence of drawings just like FIGS. 4A-4E, representing another instance of executing the same PUF process on a set of charge trapping memory cells. In this instance, the resulting data set is different, even though the PUF process is the same.

FIG. 5A illustrates a starting threshold distribution 600 of a set of programmable memory cells, including memory cells at addresses Addr=0, 1, 2, 3, 4 and 5. The starting distribution has an upper threshold level.

FIG. 5B illustrates a first part 610 and a second part 620 of the starting distribution. The set of programmable memory cells has a first subset having thresholds in the first part of the starting distribution (e.g. Addr=1, 2, 3 and 4), and a second subset having thresholds in the second part of the starting distribution (e.g. Addr=0 and 5). The data set based on these variant thresholds can comprise a concatenation of the addresses of some or all of the cells in one or both of the subsets. In the example of FIG. 5A, the concatenation of addresses of some or all of the cells in the first subset and some or all of the cells in the second subset can be (1, 2, 3, 4, . . . ); (0, 5 . . . ) expressed in digital form, or variations of this sequence. As mentioned above, the concatenated addresses can be stored on the integrated circuit in a memory, such as a protected block of memory different from the set as represented by FIG. 5D, where the addresses are shown in binary form. This protected block of memory can be a non-volatile, stable memory providing the ability to deliver the data set with very low bit error rates, and without using error correcting codes in some examples.

FIG. 5C illustrates the result after a biasing operation (e.g. programming) is applied to the second subset of programmable memory cells to establish a sensing margin 630 between the first and second subsets. For example, the second subset can include the programmable memory cells having thresholds above the dividing line when the ratio is within the target ratio range. The biasing operation changes the thresholds of the programmable memory cells in the second subset to a threshold distribution 625. The threshold distribution 625 can be above the first verify level.

FIG. 5D shows a data set based on these variant thresholds comprising a concatenation of the addresses of one or both of the subsets, or on a mask including entries for the cells at the addresses. In the example of FIG. 5B, the concatenation of addresses of the first subset and the second subset can be (1, 2, 3, 4, . . . ); (0, 5 . . . ) expressed in binary form in the figure, or variations of this sequence. Of course, in a particular embodiment, there can be many addresses in the concatenation of addresses. The concatenated addresses can be stored on the integrated circuit in a memory, such as a protected block of memory different from the set as represented by FIG. 5C. This protected block of memory can be a non-volatile, stable memory providing the ability to deliver the data set with very low bit error rates, and without using error correcting codes in some examples.

FIG. 5E is a table showing sequential addresses of memory cells in the set in the first column and a data value (or key) in the second column, which represents a data set generated by the PUF process. In this table, reading memory cells at addresses 0 through 5 yields data values 0 1 1 1 1 0, which is different than that generated in the instance represented by FIGS. 4A-4E.

Thus, the data set is a function of variant threshold voltages of different members of the set of charge trapping memory cells as a result of a common process that induces charge trapping in the set. This result can be achieved using different sets of programmable memory cells for each instance of the PUF process. For some types of memory cells, a plurality of data sets can be generated using the same set of programmable memory cells by creating new starting distributions for each new data set. Also, for a data set stored in the same memory cells as the set used for establishing the variant distribution, an old data set can be replaced by a new data set.

Figure 6:
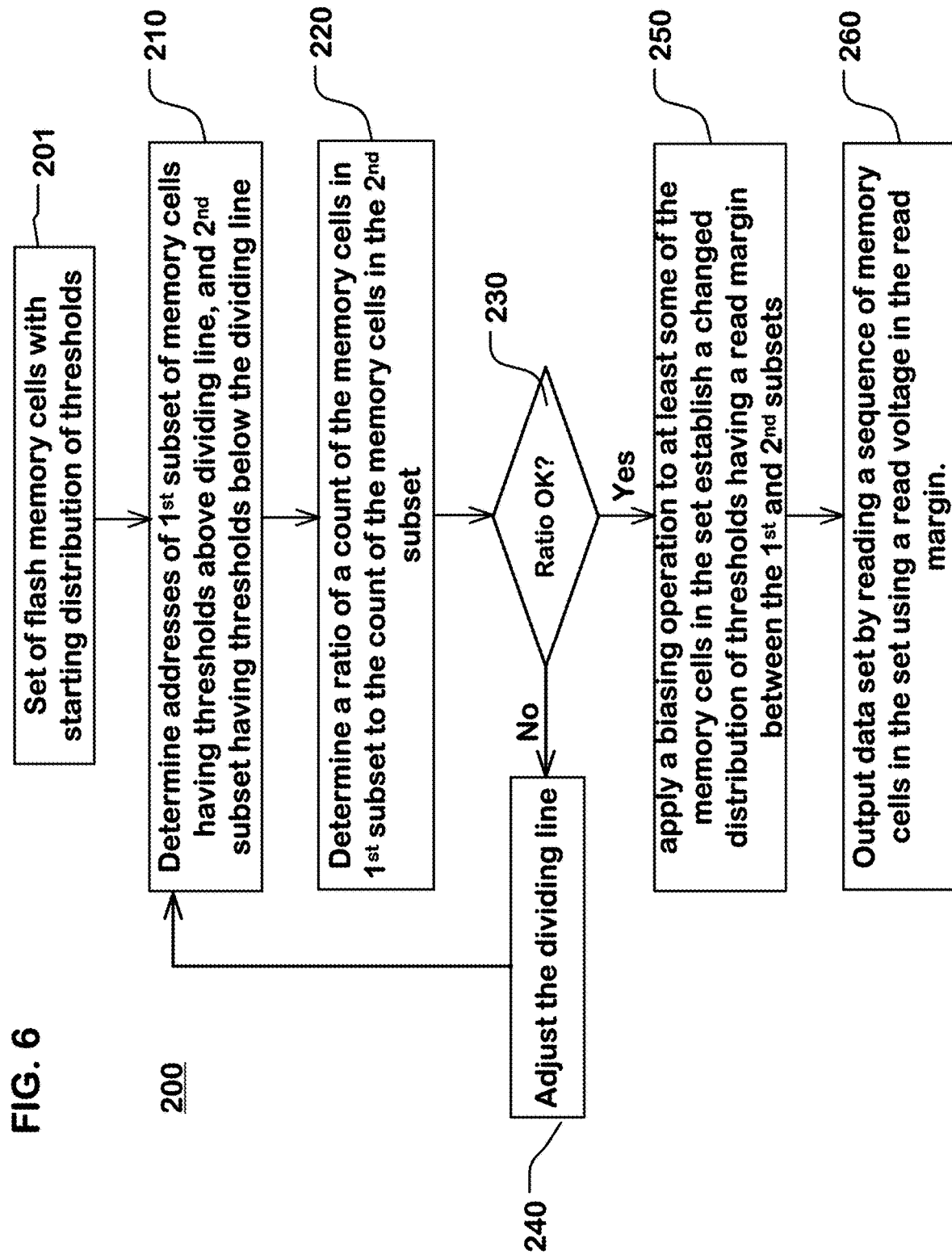
FIG. 6 shows an example flowchart for generating a stable data set on an integrated circuit including programmable memory cells, as described with reference to FIGS. 4A-4E and 5A-5E.

FIG. 6 is a flowchart 200 for generating a stable data set on an integrated circuit including programmable, charge trapping memory cells in the manner explained with reference to FIGS. 4A-4E and 5A-5E. In this example, the process begins with a set of flash memory cells having a starting distribution of thresholds (Step 201), having been established by a common PUF process which results in variant threshold voltages as discussed above. In this example, the process includes finding memory cells, such as by determining the addresses, within the set of memory cells of a first subset having thresholds above a dividing line, and a second subset having thresholds below a dividing line (Step 210). The dividing line can be chosen empirically, and stored as a parameter in the system controlling execution of the PUF. Alternatively, as illustrated in this example, the dividing line can be adjusted according to the characteristics of the starting distribution and the desired characteristics of the data set. In this alternative, the process determines a ratio of a count of memory cells in the first subset to the count of memory cells in the second subset (Step 220). This ratio can be a number such as 1/1, or fall in an acceptable range 3/2 through 2/3 for example, chosen according to the intended uses of the data set.

If the ratio is not acceptable (Step 230), then the process adjusts the dividing line (Step 240) and returns to Step 210 to identify the first and second subsets. If the ratio is acceptable (Step 230), then the process moves to a step of establishing a stable data set based on the identified first and second subsets of the memory cells. As mentioned above, in one alternative, the process can store the addresses in the first subset in sequence, and the addresses in the second subset in sequence, and use the concatenated addresses as the stable data set.

In the alternative illustrated in FIG. 6, the process to establish a stable data set includes applying a biasing operation to the memory cells in the second subset to establish a changed distribution in the set of memory cells, having a sensing margin between the memory cells in the first subset and the memory cells in the second subset (Step 250). For charge trapping memory cells, this biasing operation can comprise a program operation such as incremental step pulsed programming ISPP using a verify level sufficiently above the dividing line of the threshold voltages to establish the sensing margin. The biasing operation can be applied only to the memory cells having addresses in the second subset. In this way, the identification of the memory cells in the first subset and of the memory cells in the second subset can be determined by a read operation using a read voltage located within the sensing margin. The process of FIG. 6 includes therefore a step of outputting the data set by reading a sequence of memory cells in the set using a read voltage in the read margin (260). The output data set can be provided to an external system, such as the system controlling execution of the PUF for use as a shared secret in a security protocol. The data set can be stably stored in the set of memory cells because the sensing margin establishes a very low likelihood that memory cells initially identified as members of the second subset would have their threshold voltages drift into the range identified with the first subset.

FIGS. 7A-7E illustrate another technique useable to generate a stable data set based on a starting distribution of thresholds.

FIG. 7A illustrates a starting threshold distribution 700 of a set of programmable memory cells, including memory cells at addresses Addr=0, 1, 2, 3, 4, 5 and 6.

FIG. 7B illustrates a first part 710, a second part 720, and a third part 730 of the starting distribution. The first part of the starting distribution includes thresholds less than the upper threshold level and below a first dividing line, the second part of the starting distribution includes thresholds less than the upper threshold level and above a second dividing line that is greater than the first dividing line, and the third part of the starting distribution includes thresholds between the first and second dividing lines. A process can be included for finding one or both of the first and second dividing lines based on desired characteristics of the data set.

The set of programmable memory cells has a subset having thresholds in the first part of the starting distribution (e.g. Addr=0 and 3), a subset having thresholds in the second part of the starting distribution (e.g. Addr=2 and 5), and a subset having thresholds in the third part of the starting distribution between the first read level and the second read level.

The threshold voltages of individual charge trapping cells in the set can drift over time, so that starting distribution 700 represents a distribution that is stable only for a short time. Thus, relying on the starting distribution for the purposes of producing a stable data set is impractical for some types of memory cells where this drift can cause threshold voltages in some cells having thresholds on one side of a dividing line at one point in time to drift to the other side of the dividing line. Thus, techniques are applied to translate the starting distribution into a stable data set which is not sensitive to this drift in threshold voltages.

As indicated in the diagram, one technique for establishing a stable data set based on the threshold voltages can use the same set of non-volatile memory cells. In order to accomplish this embodiment, a programming operation can be executed on memory cells in the subset having thresholds between the first and second dividing lines to move their threshold voltages above a first verify level, which in this example is higher than the upper threshold level of the starting distribution 500. In other embodiments, the first verify level might be less than the upper threshold level of the starting distribution 500, so long as a sufficient read margin can be produced as discussed below.

After executing the program operation using the first verify level, a changed distribution like that shown in FIG. 7C results. The program operation changes the threshold voltages of the memory cells in order to establish a sensing margin 740 between the first and second subsets. The sensing margin 740 can be designed to be wide enough to ensure reliability of an operation reading the data set using a read voltage in the sensing margin to determine whether a particular memory cell is a member of the first subset or the second subset. After the changed distribution shown in FIG. 7C is established, the set of memory cells can be read using a read voltage $V_R$ that is within the sensing margin 740. The sensing margin 740 can be substantial, so that the likelihood of an error in the reading operation is very low.

FIG. 7D is a table representing the data set stored in the same set of memory cells, showing sequential addresses of the memory cells in the set in the first column and a data value (or key) in the second column, which represents a data set generated by the PUF process. In this table, reading memory cells at addresses 0 through 6 yields data values 1 X 0 1 X 0 X, where "X" is a don't care because it corresponds to the result of sensing a memory cell in the subset that was subjected to the biasing operation to establish the sensing margin. In practical embodiments, the data set can be hundreds or thousands of bits long.

In this example, first and second subsets of the set of the programmable memory cells are used to provide a data set (e.g. "Key Data"). For example, a data set of 1010 is provided using programmable memory cells in the first and second subsets, at addresses Addr=0, 2, 3 and 5, where data "1" is provided using programmable memory cells in the first subset at addresses Addr=0 and 3, and data "0" is provided using programmable memory cells in the second subset at addresses Addr=2 and 5. The data set does not include the data in a subset of the set of the programmable memory cells used to establish the sensing margin, e.g., at addresses Addr=1, 4 and 6, which have thresholds in the threshold distribution 735 outside the starting distribution. The "X" shown indicates the memory cells not used for the data set in this example.

The biasing operation in this example can also establish in some embodiments a second sensing margin 750 between the others of the subset, which is wide enough to ensure reliability of sensing distinctions in threshold voltage between the second and third subsets of the programmable memory cells even under conditions in which PVT (process, voltage, temperature) variations are relatively large. Such information could be used in the generation of the data set.

The address map can be built by applying a scanning operation on the programmable memory cells in the set of programmable memory cells to record addresses of programmable memory cells in the first, second and third subsets that are used to provide the data set. For example, the addresses of programmable memory cells in the third subset can be marked with a skip flag, so the programmable memory cells in the third subset will not be read for providing a data set that can be used as a key for an authentication or encryption protocol, or other type of secret or unique data value. Alternatively, mask logic can be used as discussed with reference to FIG. 20 below.

In response to a challenge, PUF ID security logic (e.g. 125, FIG. 1; 450, FIG. 2) can provide a key using a data set provided using the programmable memory cells having addresses recorded in the address map, according to the addresses of the first and second subsets of the set of the programmable memory cells recorded in the address map, thereby skipping or not using the programmable memory cells having addresses in the third subset of the set of the programmable memory cells.

As discussed above, in alternative processes, the data set based on these variant thresholds can comprise a combination, such as a concatenation, of the addresses of some or all of the cells in one or both of the subsets. FIG. 7E shows a data set based on these variant thresholds comprising a concatenation of the addresses of one or more of the subsets. In the example of FIG. 7E, the concatenation of addresses of a first subset including the memory cells found between the dividing lines, and a second subset including memory cells found below the first dividing line can be (1, 4, 6, . . . ); (0, 3, . . . ) expressed in binary form in the figure, or variations of this sequence. Of course, in a particular embodiment, there can be hundreds or thousands of addresses in the concatenation of addresses. The concatenated addresses can be stored on the integrated circuit in a memory, such as a protected block of memory different from the set of memory cells having the starting distribution. This protected block of memory can be a non-volatile, stable memory providing the ability to deliver the data set with very low bit error rates, and without using error correcting codes in some examples.

In the examples of FIGS. 4D, 5D and 7E, the data set is a concatenation of addresses of one or more of the subsets, such as some or all of the cells in a first subset, some or all of the cells in a second subset, and some or all of the cells in a third subset, or variations of this sequence. In some embodiments, the addresses of only the memory cells in one of the subsets, for example the third subset, can be used as the data set. The addresses can be combined using logical functions other than or in addition to concatenation, such as a hash function or formation of a mask, to form a data set including the combination of addresses.

Figure 8:
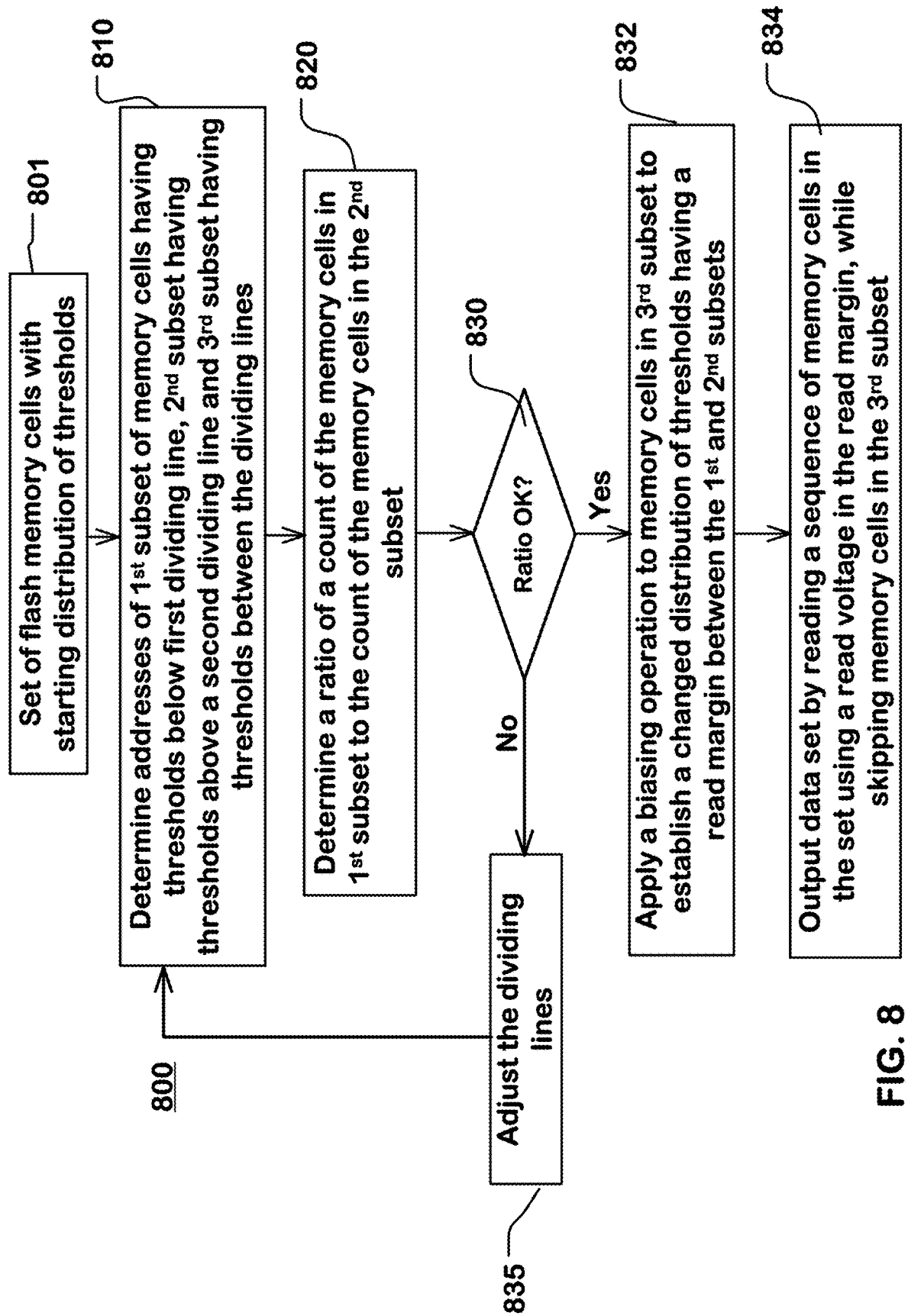
FIG. 8 shows an example flowchart for generating a data set on an integrated circuit including programmable memory cells, as described with reference to FIGS. 7A-7E.

FIG. 8 is a flowchart 800 for generating a stable data set on an integrated circuit including programmable, charge trapping memory cells in a manner explained with reference to FIGS. 7A-7E. In this example, the process begins with a set of flash memory cells having a starting distribution of thresholds (Step 801), having been established by a common process which results in variant threshold voltages as discussed above. In this example, the process includes determining addresses within the set of memory cells, the set including a first subset of cells having thresholds below a first dividing line, a second subset of cells having thresholds above a second dividing line, and a third subset of cells having thresholds between the dividing lines (Step 810). The dividing lines can be chosen empirically, or otherwise, and stored as a parameter in the system controlling execution of the PUF. Alternatively, as illustrated in this example, the dividing lines can be adjusted according to the characteristics of the starting distribution, and the desired characteristics of the data set. In this alternative, the process determines a ratio of a count of memory cells in the first subset to the count of memory cells in the second subset (Step 820). Then, the algorithm determines whether the ratio matches an expected range (Step 830). If at Step 830, it is determined that the ratio is not okay, then the dividing lines are adjusted (Step 835), and the process returns to Step 810 until an appropriate ratio is achieved. If at Step 830, the ratio is okay, then the algorithm proceeds to establish a stable data set representing the distribution that can be used as a unique key. As mentioned above, in one alternative, the addresses of the memory cells in the various subsets can be combined to form a unique data set, and stored in a protected memory. In the embodiment illustrated in FIG. 8, the process proceeds to apply a biasing operation to memory cells in the third subset to establish a changed distribution of thresholds having a read margin between the first and second subsets (Step 832), and to record the addresses of the memory cells in the third subset. In this manner, the stable data set can be represented by the addresses of the third subset, and the data values read from the first and second subsets sensed using a read voltage within the read margin while skipping the memory cells in the third subset (834). Other combinations of information can be used to establish the stable data set as discussed in various alternatives above. Also, in some embodiments, the biasing Step 832 may be omitted.

Figure 9:
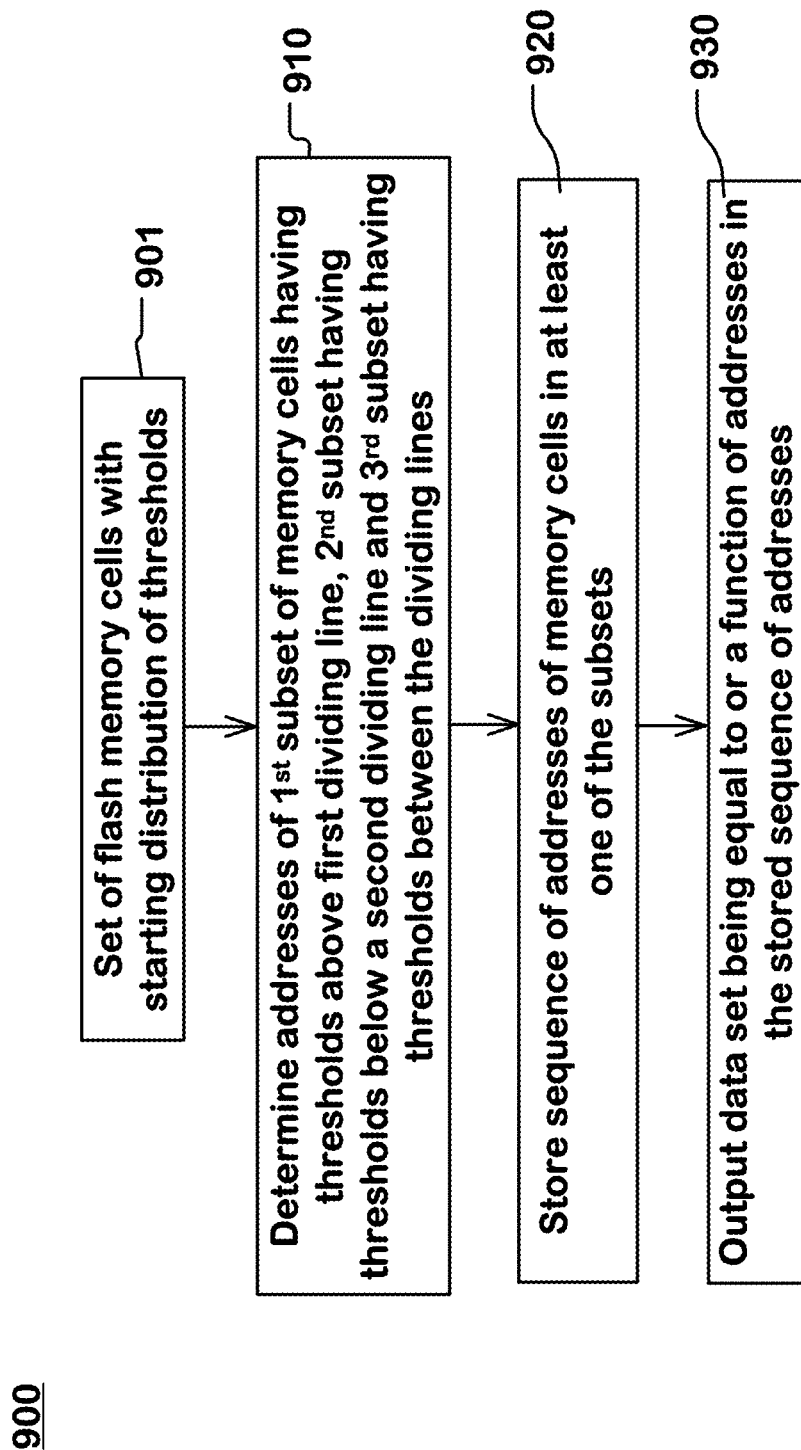
FIG. 9 shows another example flowchart for generating a data set on an integrated circuit including programmable memory cells, as described with reference to FIGS. 7A-7E.

FIG. 9 is a flowchart 900 for establishing a stable data set using a starting distribution of thresholds in a set of flash memory cells. The process begins with a set of flash memory cells having a starting distribution of thresholds (Step 901). Next, the process determines the addresses of a first subset of memory cells having thresholds above the first dividing line, a second subset of memory cells having thresholds below a second dividing line, and a third subset of memory cells having thresholds between the dividing lines (Step 910). A sequence of addresses of memory cells in at least one of the subsets is stored in memory separate from the set of memory cells (Step 920). The data set can be output as a function of or equal to the addresses stored in the sequence of addresses (Step 930). As discussed herein, the data set can be combined with a random number to produce an enhanced key.

FIGS. 10A-10C illustrate one process that can be used for setting thresholds of the charge trapping memory cells in a set of memory cells to a starting distribution with variant threshold voltages. FIG. 10A illustrates an initial threshold distribution 816 of a set of programmable memory cells. In this example, the initial threshold distribution is before a programming operation that induces tunneling of electrons or negative charge into the charge storage structure, increasing the threshold voltage of the cells, or an erasing operation that induces tunneling of electrons out of the charge storage, or of positive charge into the charge storage structure, to decrease the threshold voltage of the cell. In this example, the memory cells in the set can have any initial threshold distribution. In this example, the initial threshold distribution includes a relatively low threshold range below a first verify level.

FIG. 10B illustrates the result of programming all members of the set of the programmable memory cells to a threshold range 817 greater than the first verify level. This is like a pre-program operation used in flash memory.

FIG. 10C illustrates the result of erasing all members of the set of the programmable memory cells to establish thresholds in the starting distribution 818, where the starting distribution includes thresholds below a second verify level. The distribution in Step 830 can be utilized as a starting distribution for the processes described above. Other techniques can be applied as well, including using the threshold range 817 of FIG. 10B as a starting distribution.

The technique for establishing a starting distribution described herein, including the techniques described with reference to FIGS. 10A-10C, can be applied to charge trapping memory cells. Examples of charge trapping memory cells are illustrated in FIGS. 10D, 10E and 10F.

FIG. 10D is a simplified diagram of a planar floating gate memory cell, formed on a substrate 840. A source region 841 and a drain region 842 are disposed on opposing sides of the charge trapping structure. A control gate 843 overlies the charge trapping structure, and can be a portion of a word line for example. The charge trapping structure includes a tunneling layer 844 typically formed of silicon oxide, a floating gate layer 845 typically formed of polysilicon, a blocking dielectric structure including a multilayer ONO structure having an oxide layer 846, a nitride layer 847, and an oxide layer 848. The physical function of programming and erasing floating gate memory cells like that of FIG. 10D induces charge tunneling that changes the charge trapped in the floating gate layer 845. The amount of charge trapped varies according to physical characteristics of each cell, including process variations, temperature variations, voltage variations and the like. Thus, an operation to establish a starting threshold like that described above results in threshold voltages in a relatively broad distribution across a large number of memory cells on a single device.

FIG. 10E is a simplified diagram of a planar dielectric charge trapping memory cell, formed on the substrate 850. A source region 851 and a drain region 852 are disposed on opposing sides of the charge trapping structure. A control gate 853 overlies the charge trapping structure, and can be a portion of a word line for example. The charge trapping structure includes a tunneling layer 856 typically formed of an oxide, or of multiple thin layers of dielectric. Above the tunneling layer 856, a charge trapping layer 857 is disposed, typically comprising silicon nitride or other dielectric materials. Above the charge trapping layer 857 is a blocking layer 858, typically formed of another dielectric oxide such as silicon oxide. As with the floating gate memory cell, the physical function of programming and erasing of memory cells like that of FIG. 10E induces charge tunneling that changes the charge trapped in the charge trapping layer 857. The amount of charge trapped varies according to the physical characteristics of each cell, including process variations, temperature variations, voltage variations and the like. Thus, an operation to establish a starting threshold like that described above results in threshold voltages in a relatively broad distribution across a large number of memory cells on a single device.

Figure 10F:
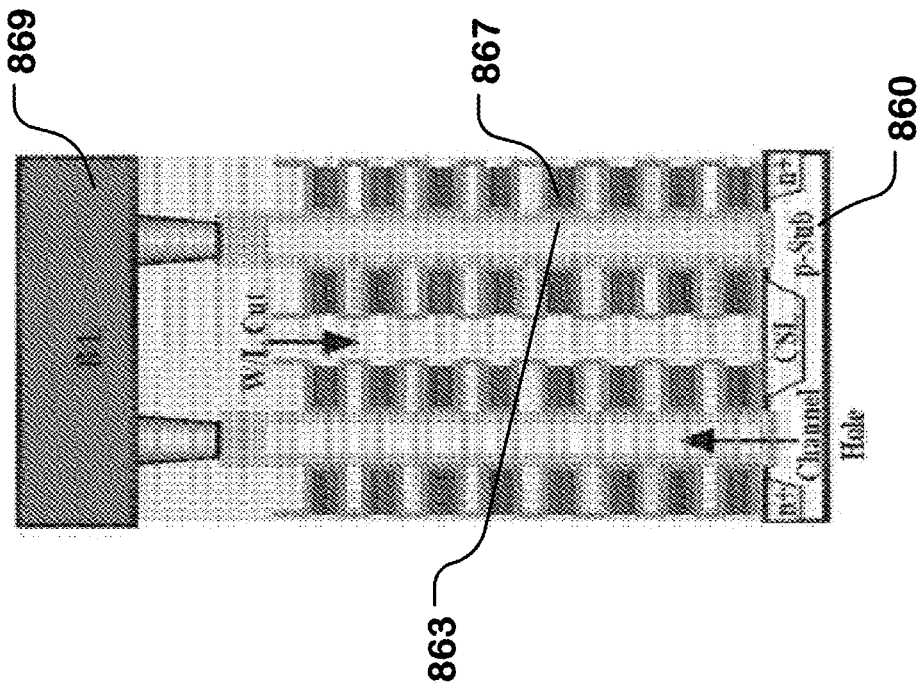

FIG. 10F is a simplified diagram of a 3D vertical NAND flash memory structure, formed on a substrate 860. A vertical channel structure (e.g. 863) is disposed between stacks of word lines (e.g. 867). A charge storage structure, such as a dielectric charge trapping structure or a floating gate structure, is disposed between the word lines and the vertical channel structure 863. The vertical channel structure 863 is coupled to a bit line 869. In the substrate, a common source conductor is disposed, establishing a current path for the NAND string between the bit line 869 and the substrate 860, through the vertical channel structure 863. The flash memory structure shown in 10F can also be used to establish a relatively broad distribution of threshold voltages across a large number of memory cells on the device, using a program or erase operation.

Other types of flash memory cell structures, including other 3D memory technologies can be deployed as well for the purposes of the PUF procedures described herein.

Figure 11:
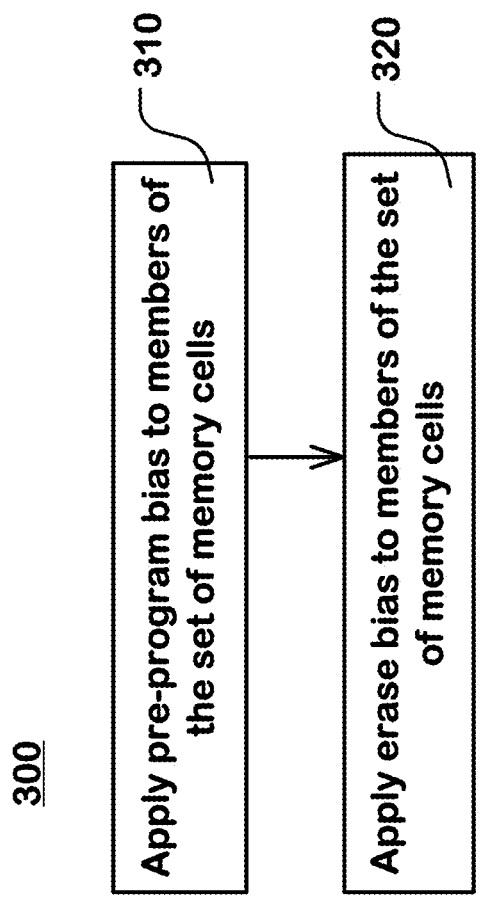
FIG. 11 shows an example flowchart for applying an initializing biasing operation setting thresholds of the programmable memory cells in the set to the starting distribution.

FIG. 11 shows an example flowchart 300 for applying an initializing biasing operation setting thresholds of the programmable memory cells in the set to the starting distribution which can be applied to charge storage memory cells, including memory cells like those discussed above. At Step 310, all members of the set of the programmable memory cells are programmed to a threshold range greater than a first verify level. In one example, all members of the set of the programmable memory cells can be programmed using a programming algorithm known as incremental step pulsed programming sequence (ISPP), with increasing pulse height and program verify steps being executed until desired threshold levels are satisfied. At Step 320, all members of the set of the programmable memory cells are erased to establish thresholds in the starting distribution, the starting distribution including thresholds below a second verify level.

The verify levels used for the program or erase operations according to this process to establish a starting distribution can be the same as used for the program and erase operations applied to a large-scale memory on the same integrated circuit. Alternatively, the verify levels used to establish the starting distribution can be adjusted as suits a particular implementation, so that the starting distribution has desired characteristics for use in creating a data set as described herein. Although an "erase" process, where net positive charge is added to the charge trapping structure reducing the threshold of the cells, is used in this example to produce the starting distribution, "program" processes, where net negative charge is added to the charge trapping structure increasing the threshold of the cells can also be used. Also, as mentioned above, the starting distribution can be the "initial" distribution of thresholds that results from the manufacturing processes or other processes to which the set of memory cells is exposed. The "initial" distribution and distributions resulting from erase or program operations can all be considered physical unclonable functions.

Also, for non-volatile memory based on programmable resistance memory cells, a "set" process, where net reduction in resistance is caused reducing the threshold voltage for a read current of the cells, can be used to produce the starting distribution. Alternatively, "reset" processes, where net increase in resistance is caused, increasing the threshold voltage for a read current of the cells, can also be used. Also, as mentioned above, the starting distribution can be the "initial" distribution of thresholds that results from the manufacturing processes or other processes to which the set of programmable resistance memory cells is exposed. The "initial" distribution and distributions resulting from set or reset operations can all be considered physical unclonable functions.

FIGS. 12A-12C illustrate another technique for generating a data set using a PUF function for charge trapping memory cells, of the type described with reference to FIG. 9. In FIG. 12A, a starting threshold distribution 1200 is illustrated such as might be produced using a PUF, like an erase operation that moves the thresholds of memory cells in a set of memory cells below an upper threshold level using an erase verify function. The starting distribution can be characterized as having an upper threshold level and a lower threshold level as indicated in the figure, and memory cells having thresholds within the distribution 1200 can be characterized for the purposes of this description, as representing the data value "0" for a standard read operation configured for a memory array.

FIG. 12B illustrates a next step in establishing the data set. In this example, the memory cells in the set are read using a moving read voltage level $V_R$ starting from one side of the distribution 1200. Assuming that the moving read voltage starts from a lower threshold level, the set of memory cells is read using a read voltage, and a count of the number of memory cells having thresholds above and below that threshold is determined. This read voltage is moved until the numbers of memory cells above and below the read voltage match a desired parameter, such as being about equal, or having a ratio of about one. At this stage, memory cells having thresholds below the read voltage $V_R$ within the sub-distribution 1210 can be characterized as representing the data value "1", and the memory cells having thresholds above the read voltage $V_R$ within the sub-distribution 1220 can be characterized as having a data value "0". For example, the reading operation can continue until a ratio of a count of the programmable memory cells having threshold levels below the read level to a count of the programmable memory cells having threshold levels above the read level is within a target range of ratios. For example, a ratio within the target range of ratios can be substantially equal to 1, when the count of the programmable memory cells having threshold levels below the read level corresponds to about 50% of the memory cells in the set. A read level at which the ratio is within the target range of ratios, such as 40% to 60% for example, can be established as a read voltage $V_R$ for reading memory cells in the set of programmable memory cells to generate the stable data set.

FIG. 12C illustrates a next step in establishing the data set. According to this technique, an upper read voltage $V_R+$ and a lower read voltage $V_R-$ are chosen in order to define sub-distributions of the starting threshold distribution 1200 in which the memory cells strongly store the data values. Once the read voltage $V_R$ is determined as described in connection to FIG. 12B, first and second dividing lines can be established in the distribution by establishing a sensing margin around the read voltage $V_R$, so that the sensing margin 1230, corresponding to the difference 1240 between $V_R-$ and $V_R+$, is between the first and second dividing lines, and the read voltage $V_R$ is within the sensing margin. For instance, the first dividing line can be at a threshold level corresponding to the read level minus 300 mV for one particular type of flash memory cell, while the second dividing line can be at a threshold level corresponding to the read level plus 300 mV. In another example, the first dividing line can be at a threshold level $V_R-$ corresponding to the read level $V_R$ minus 30% of the read level, while the second dividing line can be at a threshold level $V_R+$ corresponding to the read level $V_R$ plus 30% of the read level.

The data set can be generated using the memory cells within the sub-distribution 1211 and the sub-distribution 1221 which "strongly" store the data values "1" and "0". The addresses of such memory cells are recorded in memory on the integrated circuit, such as in a stable flash memory block, a different type of non-volatile memory, or in volatile memory such as SRAM or DRAM for use by the integrated circuit in security protocols such as encryption and authentication, and the like. A read operation can be executed using the central read voltage value $V_R$, along with the recorded addresses which provide a strong read margin. In this manner, only memory cells that strongly store data values relative to the read voltage are utilized, making the probability of an error in reading the data that might occur due to threshold drifts very low.

Figure 13:
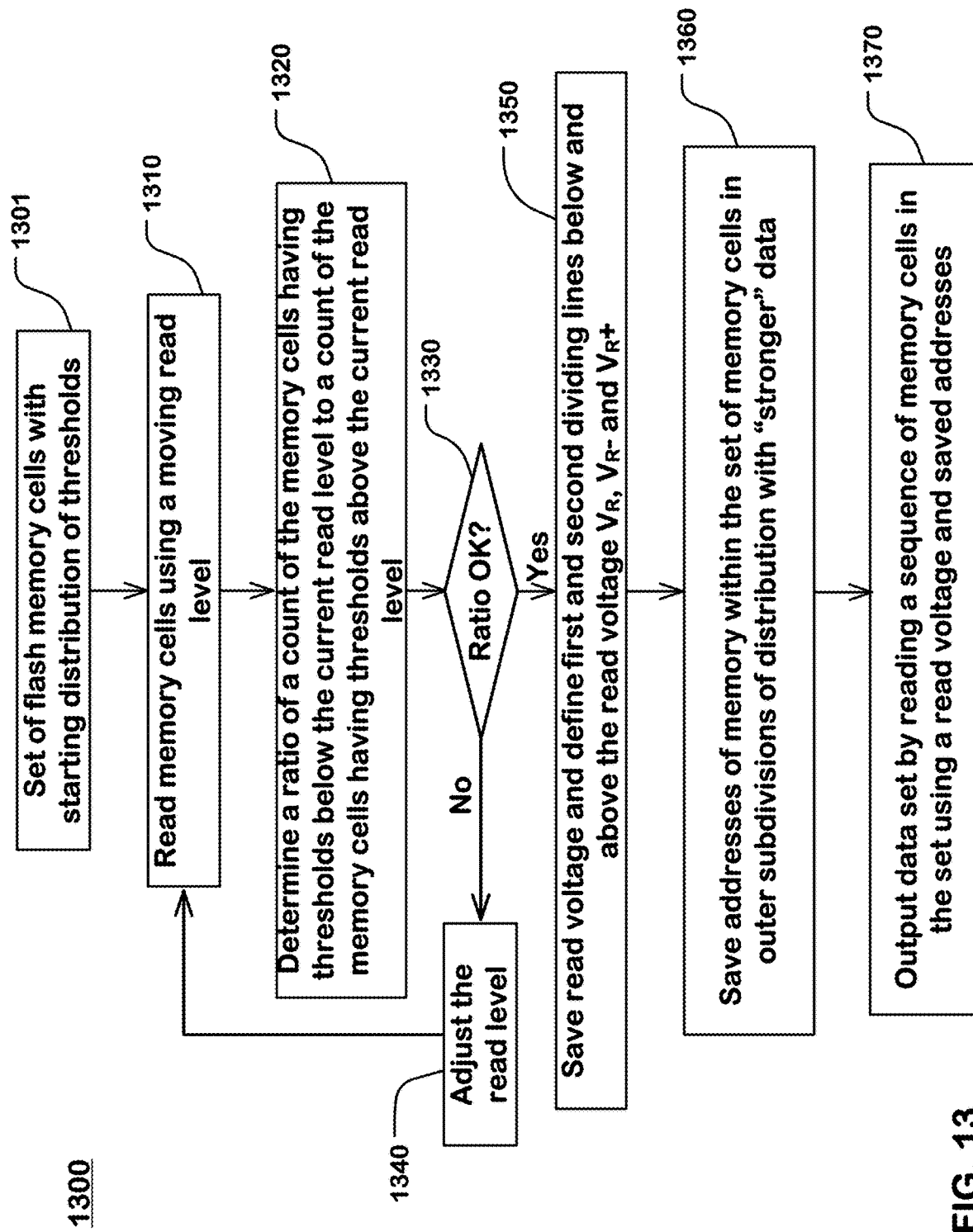
FIG. 13 is an example flowchart for generating a stable data set on an integrated circuit including programmable, charge trapping memory cells in a manner explained with reference to FIGS. 12A-12C.

FIG. 13 is an example flowchart 1300 for generating a stable data set on an integrated circuit including programmable, charge trapping memory cells in a manner explained with reference to FIGS. 12A-12C. In this example, the process begins with a set of flash memory cells having a starting distribution of thresholds (Step 1301), having been established by a common process which results in variant threshold voltages as discussed above. In this alternative, a reading operation using a moving read level (voltage $V_R$) is executed on memory cells in the set (Step 1310). The process determines a ratio of a count of the programmable memory cells having threshold levels below a current read level to a count of the programmable memory cells having threshold levels above the current read level (Step 1320). Then, the process determines whether the ratio is within a target range of ratios (Step 1330). For instance, a ratio within a target range of ratios can be substantially equal to 1, when the count of the programmable memory cells having threshold levels below the current read level corresponds to about 130% of the memory cells in the set. If the ratio is not within the target range of ratios (Step 1330, No), the read level can be adjusted (Step 1340), for example by incrementing the read level, where for a first iteration of Step 1310, the read level can start from a threshold level at or below a minimum threshold level of the distribution. The reading operation then returns to Step 1310 and continues until the ratio is within the target range of ratios (Step 1330, Yes). A read level at which the ratio is within the target range of ratios is established as a read voltage $V_R$ (FIG. 12B) for reading memory cells in the set of programmable memory cells to generate the stable data set (Step 1350).

If at Step 1330, the ratio is within a target range of ratios, then the process proceeds to establish one or both of first and second dividing lines in the distribution based on desired characteristics of the data set (Step 1340). For instance, the process can establish a sensing margin around the read voltage $V_R$ in the starting distribution (FIG. 4B), so that the sensing margin (e.g. 530, FIG. 4C) is between the first and second dividing lines, and the read voltage $V_R$ is within the sensing margin. For instance, the first dividing line can be at a threshold level $V_R-$ corresponding to the read level minus 300 mV, while the second dividing line can be at a threshold level $V_R+$ corresponding to the read level plus 300 mV. For instance, the first dividing line can be at a threshold level corresponding to the read level minus 30% of the read level, while the second dividing line can be at a threshold level corresponding to the read level plus 30% of the read level.

The process of FIG. 13 includes Step 1360 of determining addresses within the set of memory cells having a first subset defined by a first dividing line, a second subset defined by a second dividing line, and a third subset having thresholds between the first and second dividing lines, and establishing a stable data set representing the distribution that can be used as a unique key using the determined addresses.

The process of FIG. 13 includes Step 1370 of outputting the data set by reading a sequence of memory cells in the set using a read voltage $V_R$ in the sensing margin 530 (FIG. 4). The output data set can be provided to an external system, such as the system controlling execution of the PUF for use as a shared secret in a security protocol. The data set can be stably stored in the set of memory cells because the sensing margin establishes a very low likelihood that memory cells initially identified as members of the second subset would have their threshold voltages drift into the range identified with the first subset.

Using this technique, the data set depends on the number of memory cells which are determined to strongly store data values. This number can vary from one starting distribution to the next. Thus, in the generation of the data set, the sequence of memory cells can be truncated if the number of cells is larger than the desired size of the data set, or padded if the number of cells is smaller than the desired size of the data set.

FIGS. 14A-14C illustrate yet another example for generating a data set using a PUF function for charge trapping memory cells of the type described with reference to FIG. 9. In FIG. 14A, a starting distribution 1400 is illustrated such as might be produced using a PUF as described above. The starting distribution 1400 can be roughly Gaussian having relatively symmetric drop-offs as the threshold levels extend away from a central peak. However, the distribution is unlikely to be actually symmetric. As mentioned above, this lack of symmetry can result in different numbers of memory cells "strongly" storing data in the process described with reference to FIG. 13. According to the technique of FIGS. 14A-14C, tighter control over the number of memory cells strongly storing data can be achieved.

As illustrated in FIG. 14A, a sub-distribution 1410 of memory cells that can be characterized as strongly storing the data value "1" can be found by using a first reading operation that applies a moving read level, starting at a threshold at or near the lower boundary of the distribution 1400, and executing a process for iteratively reading the memory cells in the set of memory cells using a current read voltage, and counting the number of memory cells that have thresholds below the current read level. When the count reaches a specified threshold, then the current read level is stored as the first, lower dividing line voltage $V_R-$.

As illustrated in FIG. 14B, a second sub-distribution 1420 of memory cells that can be characterized as strongly storing the data value "0" can be found by using a second reading operation that applies a moving read level, starting at a threshold at or near the upper boundary of the distribution 1400, and executing a process for iteratively reading the memory cells in the set of memory cells using a current read voltage, and counting the number of memory cells that have thresholds above the current read level. When the count reaches a specified threshold, then the current read level is stored as the second, upper dividing line voltage $V_R+$.

As illustrated in FIG. 14C, a third sub-distribution 1430 includes memory cells having thresholds between the first dividing line voltage $V_R-$ and the second dividing line voltage $V_R+$. Using addresses of the memory cells that fall within the first sub-distribution 1410 "strongly" storing the data value "1", and within the second sub-distribution 1420 "strongly storing the data value "0," a data set can be generated by reading the memory cells using a read voltage $V_R$ between the first and second dividing lines. This read voltage can be produced by averaging the first dividing line voltage $V_R-$ and the second dividing line voltage $V_R+$ where the starting distribution can be characterized as roughly Gaussian. In embodiments where the starting distribution may be skewed toward higher or lower thresholds, then the read voltage can be produced using a formula that takes into account the skew in the distribution.

Figure 15:
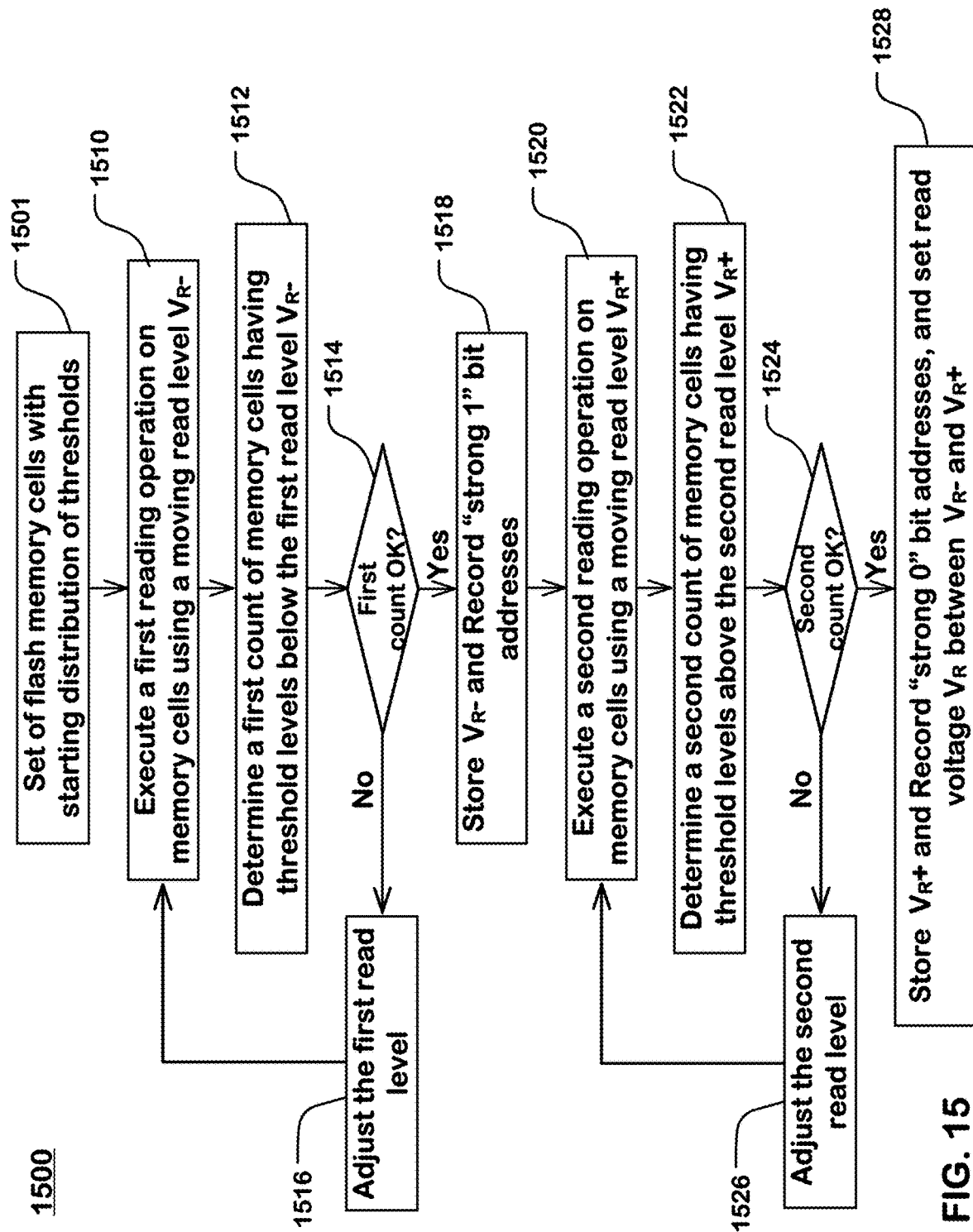
FIG. 15 is an example flowchart 1500 for generating a stable data set on an integrated circuit including programmable, charge trapping memory cells in a manner explained with reference to FIGS. 14A-14C.

FIG. 15 is an example flowchart 1500 for generating a stable data set on an integrated circuit including programmable, charge trapping memory cells in a manner explained with reference to FIGS. 14A-14C. In this example, the process begins with a set of flash memory cells having a starting distribution of thresholds (Step 1501), having been established by a common process which results in variant threshold voltages as discussed above. In this example, the process includes determining addresses within the set of memory cells having a first subset of thresholds below a first dividing line and a second subset having thresholds above a second dividing line. The dividing lines are determined in a manner that provides a predetermined number of memory cells that strongly store the data value "0" and a predetermined number of memory cells that strongly store the data value "1". The dividing lines can be stored as a parameter in the system controlling execution of the PUF.

In this alternative, a first reading operation using a first moving read level is executed on memory cells in the set (Step 1510). The process determines a first count of the programmable memory cells having threshold levels below the first read level $V_R-$ (Step 1512). Then, the process determines whether the first count matches a predetermined number T1, or falls within a range of numbers (Step 1514).

If the first count is not accepted (Step 1514, No), the first read level can be adjusted (Step 1516), for example by incrementing the first read level, where for a first iteration of Step 1510, the first read level can start from a threshold level at or below a lower threshold level of the distribution. The first reading operation then returns to Step 1510 and continues until the first count is accepted (Step 1514, Yes).

The process of FIG. 15 includes establishing a first dividing line voltage $V_R-$ in the starting distribution as a first read level at which the first count is at or close to a predetermined number T1 (Step 1518). Addresses of memory cells having threshold levels below the first dividing line $V_R-$ can be determined and stored for establishing a stable data set representing the distribution that can be used as a unique key, at this step or at a later step when a second dividing line is established.

The process of FIG. 15 includes Step 1520 of a second reading operation using a second moving read level $V_R+$ on memory cells in the set (Step 1520). The process determines a second count of the programmable memory cells having threshold levels above the second read level (Step 1522). Then, the process determines whether the second count is acceptable, for example if it matches a predetermined number T2, or falls within a range of numbers (Step 1524). The number can be accepted in some embodiments if the sum of the count from the first reading operation and the count from the second reading operation is equal to or within a range of a target number of bits for the data set, or a target number of addresses for the data set.

If the second count is not accepted (Step 1524, No), the second read level can be adjusted (Step 1526), for example by decrementing the second read level, where for a first iteration of Step 1520, the second read level can start from a threshold level at or above an upper threshold level of the distribution. The second reading operation then returns to Step 1520 and continues until the second count is accepted (Step 1524, Yes).

The process of FIG. 15 includes establishing a second dividing line in the starting distribution as a second read level $V_R+$ at which the second count is accepted, and establishing a read voltage $V_R$ using the first and second dividing lines, such as by averaging according to an equation: $V_R=(V_R-V_R+)/2$ (Step 1528).

Although as shown in FIG. 15, iterations including Steps 1510, 1512, 1514 and 1516 to establish the first dividing line are executed before iterations including Steps 1520, 1522, 1524 and 1526 to establish the second dividing line are executed, in other embodiments, iterations including Steps 1520, 1522, 1524 and 1526 to establish the second dividing line can be executed before iterations including Steps 1510, 1512, 1514 and 1516 to establish the first dividing line.

The process of FIG. 15 can continue with a step like Step 1360 of the process of FIG. 13, determining addresses within the set of memory cells of a first subset of memory cells defined by the first dividing line strongly storing the data value "1" and a second subset defined by the second dividing line strongly storing the data value "0". Addresses of the third subset of memory cells that do not strongly store data values, having thresholds between the first and second dividing lines, can also be used in establishment of the data set in some embodiments.

The process of FIG. 15 can continue with a step like Step 1340 of the process of FIG. 13, outputting the data set by reading a sequence of memory cells in the set using a read voltage $V_R$ in the sensing margin. The output data set can be provided to an external system, such as the system controlling execution of the PUF for use as a shared secret in a security protocol. The data set can be stably stored in the set of memory cells because the sensing margin between $V_R-$ and $V_R+$ establishes a very low likelihood that memory cells initially identified as members of the first and second subsets would have their threshold voltages drift into the range identified with the other subset.

In one embodiment, a predetermined length T in the number of cells to be used for a completed data set can be set by specifying the first and second predetermined numbers T1 and T2 to the first and second subsets of the set of the programmable memory cells, respectively, where T=T1+T2, indicating a number of bits in the data set. For instance, the first and second target ranges of counts can include the first and second predetermined lengths T1 and T0, so that the first and second dividing lines in the starting distribution can be established as first and second read levels at which the first and second counts match the first and second predetermined lengths T1 and T0, respectively. When the sum of the numbers do not match a specified length if the data set is so restricted, because the granularity of the moving read operations can be greater than one cell, the excess cell can be removed from the data set, or the data set can be padded with data to form the corrected length.

Figure 16:
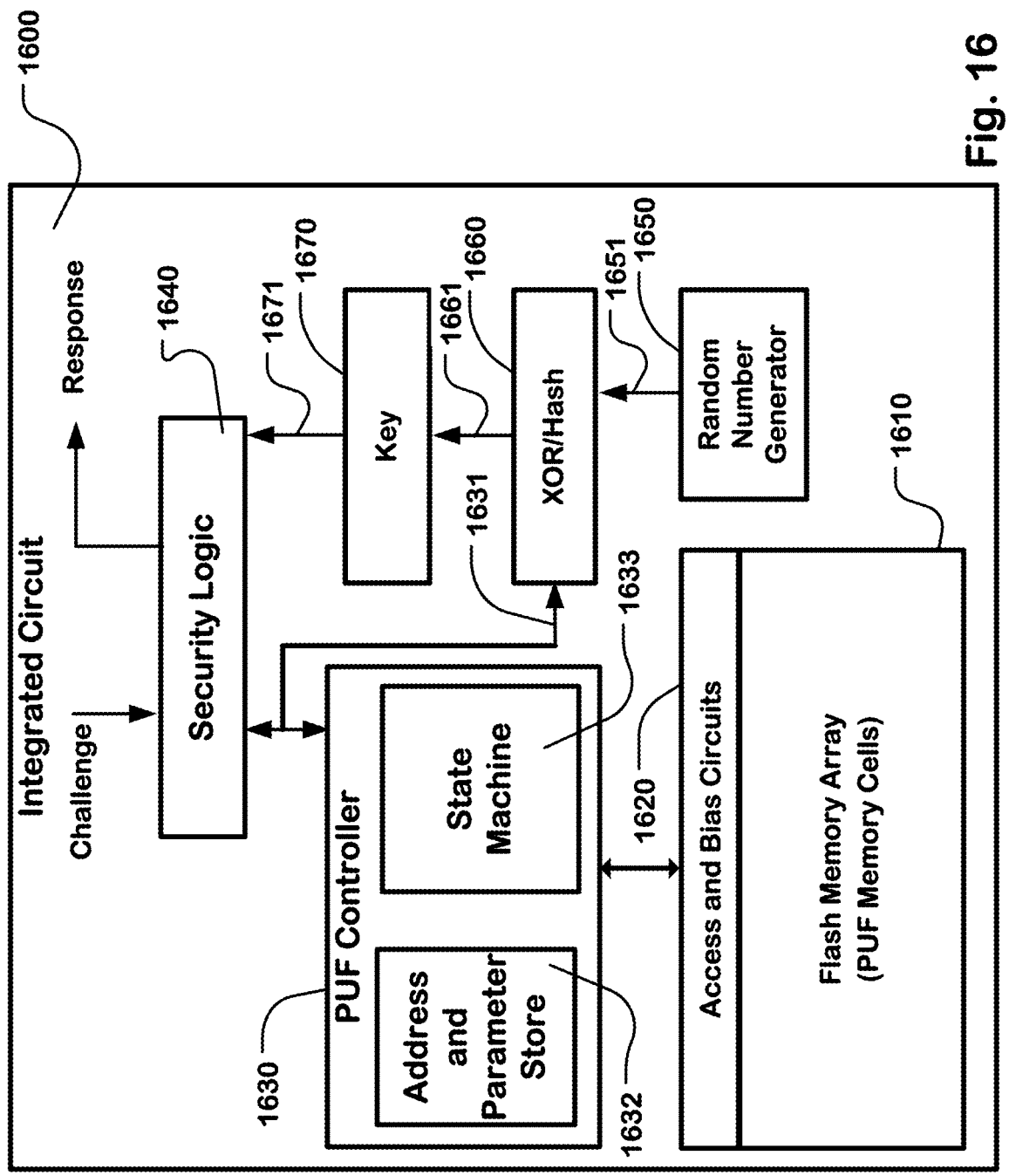
FIG. 16 is a simplified block diagram of an integrated circuit including a flash memory array and a controller for utilizing the memory array and a random number generator to provide a data set.

FIG. 16 illustrates an integrated circuit 1600 that includes a flash memory array 1610 comprising a set of PUF memory cells, which can be subjected to a PUF to establish a distribution of thresholds as discussed above. The integrated circuit 1600 includes a PUF controller 1630 and security logic 1640 as mentioned above in connection with FIG. 1. The PUF controller 1630 provides an initial key on a bus 1631. The integrated circuit 1600 includes a random number generator 1650 that generates a random number on a bus 1651. The integrated circuit 1600 includes logic circuitry 1660 that combines the initial key on the bus 1631 and the random number on the bus 1651 to produce an enhanced key 1670 via a bus 1661 which is coupled to the security logic 1640 via line 1671. In embodiments, logic circuitry 1660 can include an XOR function using the initial key and the random number as inputs and producing an output as the enhanced key, and a hash function mapping the initial key and the random number to hash values as the enhanced key. Also, access and bias circuits 1620 are provided that enable use of the flash memory array 1610, including word line drivers, sense amplifiers, bit line drivers, voltage sources and other circuits peripheral to the flash memory array. The PUF controller 1630 in this example is connected to the access and bias circuits 1620 of the flash memory array 1610 and includes logic and memory resources used to carry out the processes described herein, including for example some or all of the processes of FIGS. 6, 8, 9, 11 13 and 15.

In the illustrated embodiment, a state machine 1633 and an address and parameter store 1632 are included in the PUF controller 1630. The state machine 1633 can include logic used to generate a data set based on the PUF applied to the set of memory cells in the array 1610. In embodiments of the technology described herein, the logic can perform the steps of finding the subsets or sub-distributions of memory cells read in the generation of the data set, recording the parameters in the store 1632 such as thresholds used for the dividing lines discussed above, thresholds used for reading the data values from the identified subsets, and recording in the store 1632 the addresses of the memory cells identified for use in generating the data set. The logic can also perform the steps of applying the read voltages and the addresses stored in the store 1632 to produce sequences of data values from the flash memory array 1610.

The state machine can also include logic to cause scanning of programmable memory cells in a set of programmable memory cells, and apply the processes described herein to produce a stable data set based on a physical unclonable function.

The security logic 1640 can include logic for handling a challenge input and providing a response output using the data set read from the array 1610 or from the store 1632 or from the initial key on the bus 1631. The security logic 1640 can include encryption and decryption resources using the data set, and can include logic to control an authentication protocol using the data set. The response may be a pass/fail signal in some embodiments applied on the integrated circuit to enable mission function circuits for example. In other embodiments, the response may be applied to circuitry off of the integrated circuit 1600 for which the data set is used in a security protocol. In some embodiments, the security logic includes a state machine implemented using dedicated logic, a general purpose processor with suitable programming, a programmable gate array with suitable programming or a combination of these types of logic circuits. Also, the security logic 1640 can share the logic used to implement the state machine 1633 in some implementations.

The store 1632 can be implemented using non-volatile memory, such as flash memory, programmable resistance memory, one-time-programmable memory and the like. Also, the store can be implemented using other types of memory, including volatile memory such as SRAM, with backup copies of the addresses and parameters stored in the array 1610 or in other memory accessible to the integrated circuit.

The state machine 1633 can be implemented using dedicated logic, a general purpose processor with suitable programming, a programmable gate array with suitable programming or a combination of these types of logic circuits. The random number generator 1650 can be a determinative random number generator or a pseudo-random number generator, implemented using dedicated logic, a general purpose processor with suitable programming, a programmable gate array with suitable programming or a combination of these types of logic circuits. The random number generator 1650 can be part of the state machine 1633 in some embodiments.

Thus, FIG. 16 illustrates an example of an integrated circuit, comprising a set of programmable memory cells on an integrated circuit having a distribution of thresholds; memory storing addresses of memory cells in the set of programmable memory cells that have thresholds in a first sub-distribution of the distribution of thresholds; and logic to generate a data set using the stored addresses.

The distribution can be characterized by having been made using a physical unclonable function.

In some embodiments, the first sub-distribution is separated from a second sub-distribution by a sensing margin, and the logic to generate the data set includes logic to read the memory cells in the set of programmable memory cells in address order to generate data values that vary according to membership or not in the first sub-distribution.

In some embodiments, the memory stores, in addition, addresses of memory cells in the set of memory cells that have thresholds in a second sub-distribution of a distribution of thresholds of memory cells in the set; and the logic to generate the data set includes using the stored addresses for the first sub-distribution and the second sub-distribution.

In some embodiments, the memory stores, in addition, a first dividing line and a second dividing line different than the first dividing line, for distribution of thresholds; and the memory cells in the first sub-distribution include a first subset of the set of the memory cells having thresholds below the first dividing line, and the memory cells in the second sub-distribution include a second subset of the set of the memory cells having thresholds above the second dividing line.

In some embodiments, the logic to generate the data set uses the addresses to select memory cells in one of the first and second subsets; and reads memory cells in the set of programmable memory cells using a read voltage between the first and second dividing lines.

In some embodiments, the programmable memory cells in the set are charge trapping memory cells, and the thresholds are threshold voltages.

In some embodiments, the integrated circuit can include logic to apply biasing operations using biasing circuits on the integrated circuit that induce changes in the charge storage structures of the programmable memory cells in the set to establish the distribution.

In some embodiments, the logic comprises a state machine on the integrated circuit.

In some embodiments, the integrated circuit includes logic that responds to a challenge input to generate a response output using the data set.

Figure 17:
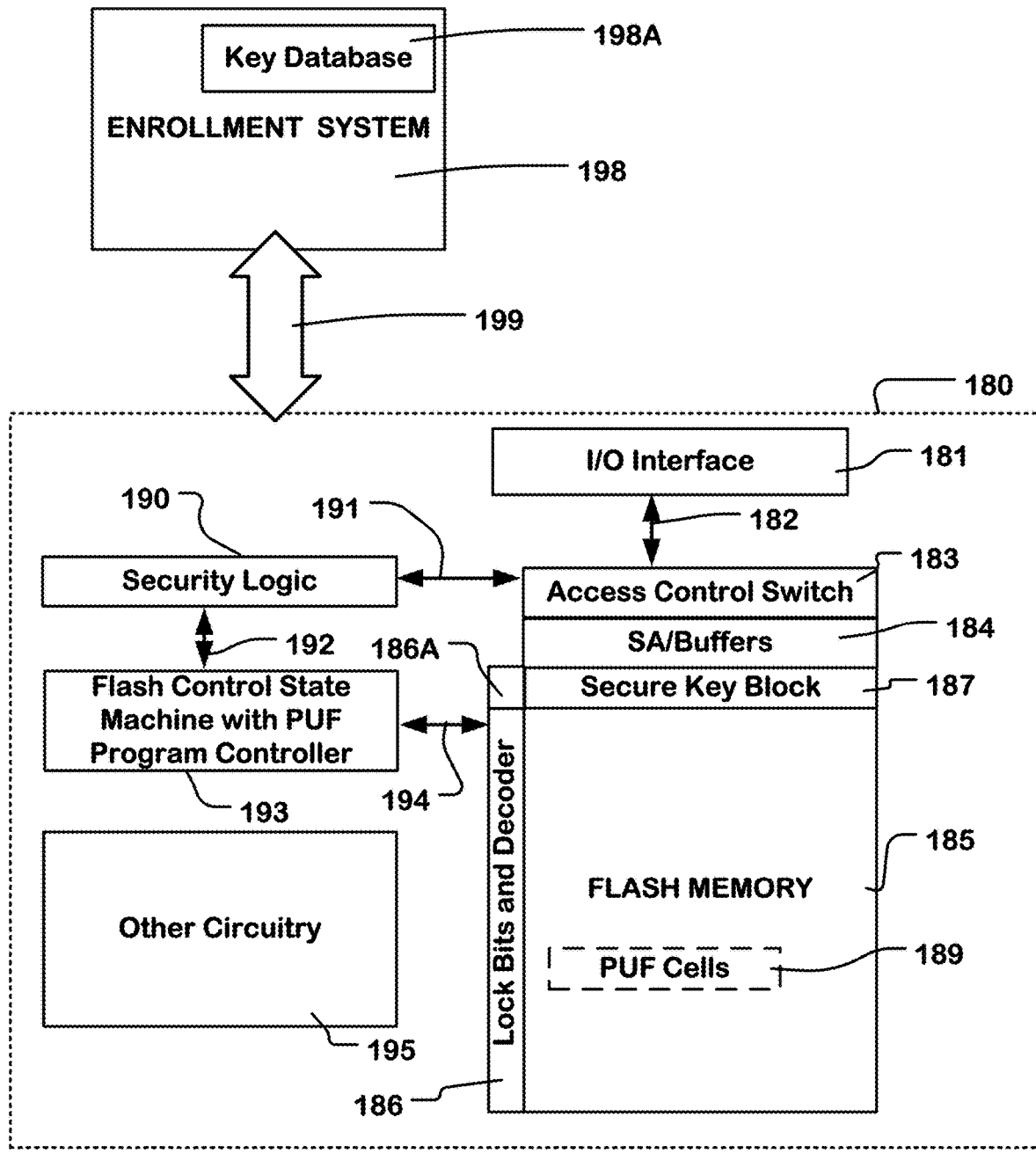
FIG. 17 is a system diagram showing a packaged integrated circuit or multichip module including physical unclonable function circuitry and non-volatile memory, coupled with an enrollment system.

FIG. 17 illustrates a system including a packaged integrated circuit or multichip module 180 that includes an input/output interface 181 and a non-volatile flash memory array 185. The input/output interface 181 provides a port for external communication of data between external devices or communication networks and the non-volatile memory array 185. The memory array 185 includes a plurality of blocks of memory cells (see, e.g., FIG. 3 above) with a key stored in a particular block 187 of the plurality of blocks. Security logic 190 is coupled to the non-volatile memory array 185, which utilizes the key in a protocol to enable access to data stored in blocks in the plurality of blocks. The system shown in FIGS. 17 and 17A can also include a random number generator (e.g. 1650, FIG. 16) that generates a random number, and logic circuitry (e.g. 1660, FIG. 16) that combines an initial key provided by a PUF program controller (e.g. 1630, FIG. 16; 193, FIG. 17) and the random number to produce an enhanced key 1670. The security logic 190 can use the initial key or the enhanced key. Description about the random number generator 1650, the logic circuitry 1660, and the enhanced key 1670 in reference to FIG. 16 is applicable to FIGS. 17 and 17A, and not repeated here. Access control circuits including the access control switch 183 are coupled to the array, and include logic to enable read-only access to the particular block by the security logic for use in the protocol, and to prevent access to the particular block via the port by external devices or communication networks. Other combinations of access rules can be used in various embodiments, allowing the security logic greater flexibility in the utilization of the particular block.

In this example, the non-volatile memory array 185 comprises flash memory. The particular block 187 storing the key can be physically located anywhere in the array, but as illustrated can be located physically in a top block having the lowest physical address, or adjacent a boot block having a lowest physical address, for a couple of examples.

The non-volatile memory array 185 is coupled to sense amplifiers/buffers 184 which provide for flow of data into and out of the flash memory array, including the particular block 187 storing the key. The access control switch 183 is disposed in this example between the sense amplifiers/buffers 184 and the input/output interface 181. The data read from the array 185 can be routed on line 182 to the input/output interface 181, or can be routed on line 191 to the security logic 190.

In the illustrated embodiment, an address decoder 186 is coupled to the array 185, along with block lock bits which are used for controlling permission to read and write data in corresponding blocks in the array. In this example, the particular block 187, in which the set of non-volatile memory cells storing the secure key is disposed, is coupled with corresponding lock bit or bits 186A. The lock bit or bits 186A coupled with the particular block 187 can comprise a different logical or physical structure than the structure used for the lock bits of other blocks in the array, and can perform logically a different function. Examples of physical structures used to store the block lock bits include a fuse, a one-time-programming (OPT) cell, and a register or other memory element usable to store status indicators like block lock bits. The block lock bit or bits for the particular block can be coupled to the buffers in the sense amplifiers/buffers 184 to inhibit writes to the set of memory cells in which the key is stored, thereby freezing the key stored in the particular block after it is written there and optionally tested and verified. The flash control state machine 193 or other control logic on the device executes procedures like that described below in connection with FIGS. 29 and 30 to freeze the key by setting the block lock bit for the particular block, or for the set of cells in the block storing the key.

Also, the block lock bit or bits 186A associated with the particular block 187 that stores the key can control logic coupled to the access control switch 183 that prevents data flow from the particular block 187 through the sense amplifiers/buffers on line 182 to the input/output interface 181, while allowing the data flow from the particular block 187 on line 191 to the security logic 190, when an address used to access the array corresponds to the address of the particular block 187.

Also, in the illustrated embodiment, a flash control state machine 193 with a physical unclonable function program controller is coupled to the memory array 185 on line 194, and to the security logic 190 on line 192. The physical unclonable function can perform procedures as described herein, using memory cells in a particular set of memory cells 189 in the array 185 for the purposes of producing a data set to be used as the key. In this example of the apparatus, flash control state machine 193 provides signals to control the application of bias arrangement supply voltages to carry out the procedures to generate the data set, and other operations involved in accessing the array 185. In some embodiments, a random number generator is included on the device, coupled with the PUF Program Controller of flash control state machine 193, the output of which is logically combined with the PUF key.

Circuitry, which is on the integrated circuit such as bit lines, word lines, drivers for the same, and so on, provides access to the set of flash memory cells used to provide a data set used to produce the key.

As illustrated, packaged integrated circuit or multichip module 180 can also include other circuitry 195, such as can be encountered in a system-on-a-chip system or other combinations of circuitry with memory.

The packaged integrated circuit or multichip module 180 is coupled in the example shown to an enrollment system 198 by interconnect 199. The enrollment system 198 can maintain a key database 198A in which information needed to perform the security protocol relying on the key stored in the particular block 187 can be maintained. In some embodiments, the information needed to perform the security protocol includes a copy of the key.

In one example operating method, during manufacture or packaging, the physical unclonable function can be executed by the flash control state machine 193, in cooperation with the enrollment system 198 as discussed above with reference to FIG. 2. The physical unclonable function can utilize the set of memory cells 189 to produce a data set that can be used to form the key. The data set, upon completion of the execution of the physical unclonable function, can then be copied from the set of memory cells 189 to the particular block 187 reserved or configured for storing the key. The system can produce one or many keys for storage in the particular block 187 reserved for this purpose. At this stage, the key can also be copied into the enrollment system 198 and maintained with the key database 198A. After the execution of the physical unclonable function, combination of the PUF key with a random number, and the copying of the enhanced key into the particular block 187 and any necessary information into the enrollment system, the lock bits 186A associated with the particular block 187 can be set using a fuse or other type of write-once memory element, to prevent access to the key by external circuits or communication networks. Also, the particular set of memory cells 189 used in the physical unclonable function can be erased or otherwise overwritten to eliminate evidence of the key that may be stored in the memory array 185.

Figure 17A:
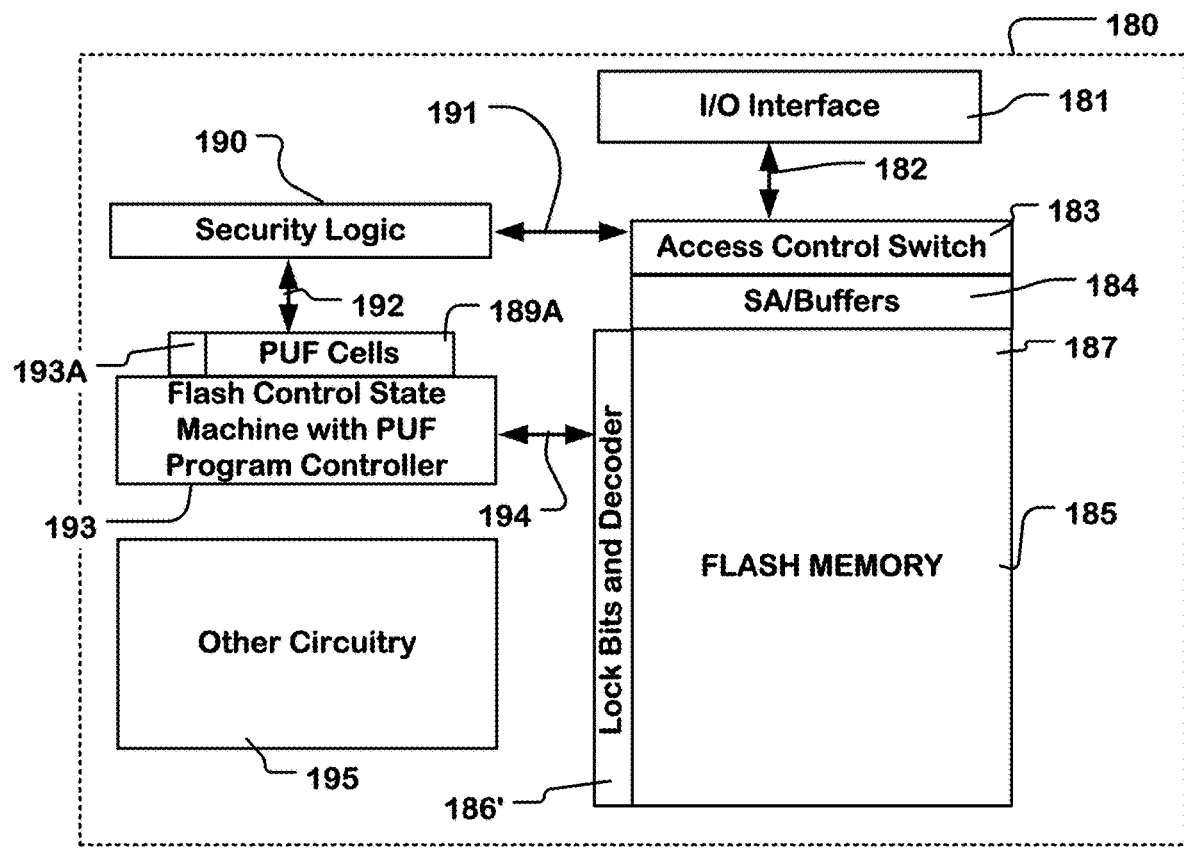
FIG. 17A is a system diagram showing a packaged integrated circuit or multichip module including alternative physical unclonable function circuitry and non-volatile memory which can be coupled with an enrollment system like that in FIG. 17.

FIG. 17A illustrates an alternative embodiment of a circuit embodied in a packaged integrated circuit or multichip module, in which reference numbers used for elements that are like those in FIG. 17 are used again, and not described again. In FIG. 17A, a plurality of non-volatile memory cells including PUF cells 189A are implemented in the circuit apart from the array 185, and coupled to the control circuit that executes the PUF using the PUF cells 189A, where the control circuit in this example is part of the flash control state machine 193. The lock bits and decoder structure 186' is coupled to all the blocks in the array in this example. The PUF cells 189A in this embodiment are part of a block of cells implemented outside the array, having separate peripheral circuits allowing read-only access to the block by or through the security logic 190 for example. In other embodiments, the PUF cells 189A can be implemented in layout as part of the array, but have access circuits that do not support program or erase operations that are not part of the PUF. In this embodiment, the peripheral circuits for the array 185 are not connected to, or not usable to access, the PUF cells 189A. Rather, the PUF cells 189A are read, programmed and erased under separate control in coordination with the PUF function in the control circuits. An indicator cell 193A is coupled with the PUF cells 189A or with the control circuits, used to freeze the key stored in a set of non-volatile memory cells in the PUF cells 189A by enabling or disabling the PUF function, or enabling or disabling program or erase of memory cells in the PUF cells 189A. Examples of physical structures used as the indicator cell 193A include a fuse, a one-time-programming (OPT) cell, and a register or other memory element usable to store status indicators like block lock bits.

The flash control state machine 193 or other control logic on the device can execute procedures like that described below in connection with FIG. 31 and FIG. 32, for example, to set the indicator in the indicator cell 193A to enable or disable the PUF function in the control circuits, and thereby freeze the key. In some embodiments, a random number generator is included on the device, coupled with the PUF Program Controller of flash control state machine 193, the output of which is logically combined with the PUF key.

Figure 19:
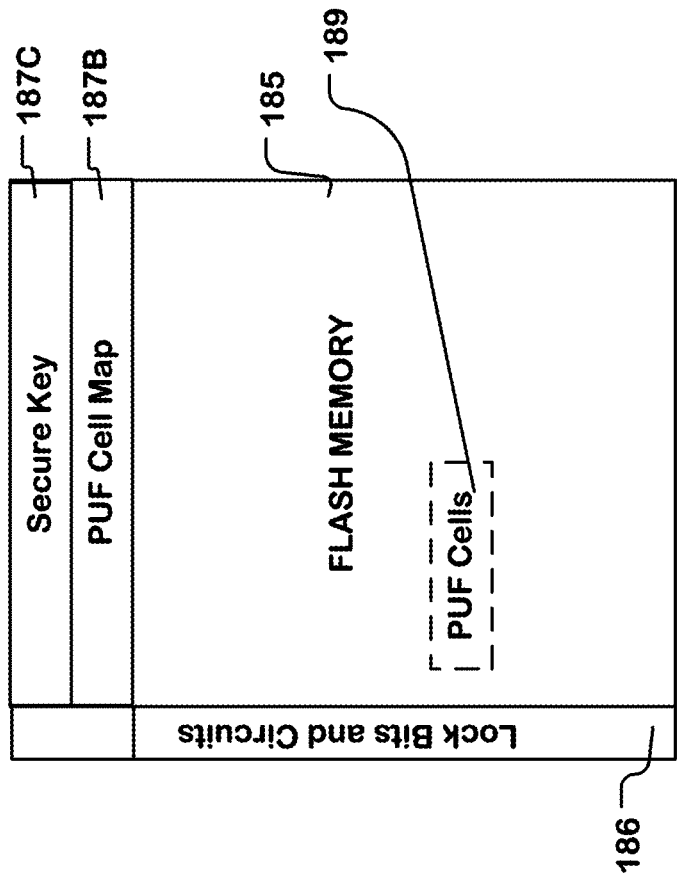
FIG. 19 illustrates another alternative configuration of non-volatile memory usable in a system like that of FIG. 17.
Figure 18:
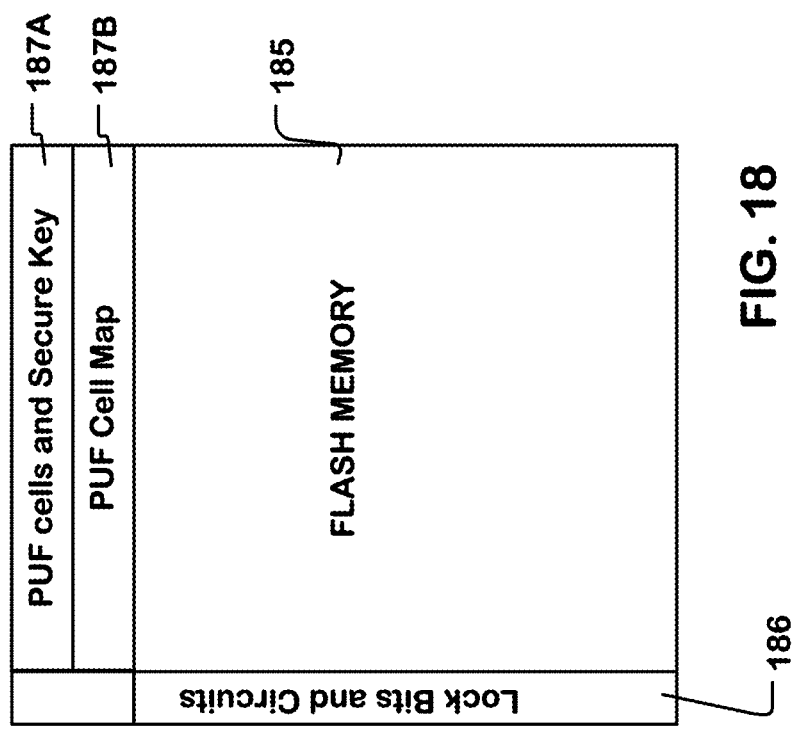
FIG. 18 illustrates an alternative configuration of non-volatile memory usable in a system like that of FIG. 17.

FIGS. 18 and 19 illustrate different examples for the configuration of the non-volatile memory array for different embodiments. In FIG. 18, the particular block of memory cells in which the key is stored comprises a first sub-block 187A and a second sub-block 187B. In the first sub-block 187A, the set of memory cells used by the physical unclonable function to produce the security is located. Also, the key can be kept in the set of memory cells used to produce the data set, or moved to another set of memory cells in the first sub-block 187A. The second sub-block 187B maintains a cell map or multiple cell maps generated during execution of the physical unclonable function according to a process such as those described with reference to FIGS. 7A-7E, 8, 12A-12C and 13, for example.

FIG. 19 is an alternative in which the set of memory cells 189 used by the physical unclonable function is in the flash memory array 185, and outside of the particular block 187 used for storage of the key. In this example, the particular block used for storage of the key includes a first sub-block 187C in which the key or multiple keys are maintained in the memory. The second sub-block 187B maintains the cell map or multiple cell maps generated during the physical unclonable function.

FIG. 20 illustrates a data structure which can be utilized for storage of a key and cell map in embodiments like those shown FIGS. 17-19. The set of memory cells used to produce the key (security ID in this example) is represented by the security ID generator block. This block has a "block" address which identifies the starting location, and bit addresses 1 through 10 in the figure. In a preferred system, the security ID generator block may have thousands of bits. Also, associated with each bit address is a data value providing "code information," which indicates a data value sensed using the procedure of FIG. 8 for example or FIG. 19 for example. In embodiments utilizing a mapping table or cell map as shown in FIG. 20 to address the data set, the data values in some of the cells are not used in the key, and so are considered "don't care" cells. The mapping table identifies the addresses of the "don't care" cells and the cells used for the key. Thus, the mapping table in this example has a starting address, and address bits 1 through 10 which correspond to the bit addresses 1 through 10 of the cells in the security ID generator block. Flags are set in memory cells corresponding to each of the address bits, indicating a valid cell (used in the key) or an invalid cell (not used in the key) in the security ID generator block. The key data can be generated by a logical AND of the mapping table and the code information, where the mapping table is used as a mask. As mentioned above, the security ID generator block is a set of memory cells that can be located anywhere in the non-volatile memory array, or located in the particular block used for storage of the security ID. The data in the security ID generator block can then be copied to the particular block used for storage of the security ID in embodiments in which the set of memory cells is located outside of the particular block.

Figure 21:
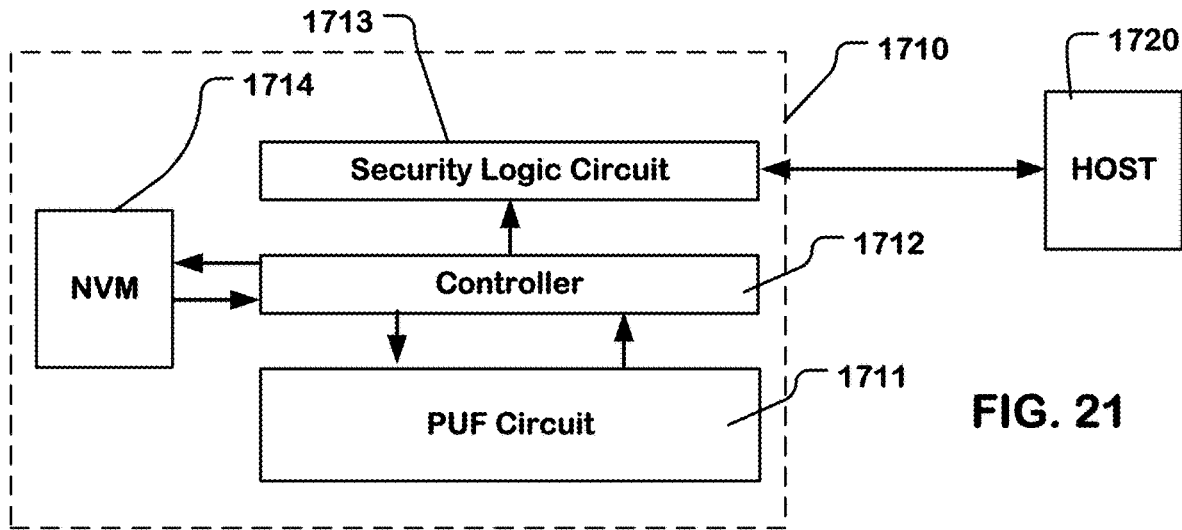
FIG. 21 is a simplified system diagram including a packaged integrated circuit or multichip module and host utilizing a physical unclonable function circuit with non-volatile memory.

FIG. 21 illustrates a high level configuration of a system utilizing a physical unclonable function for the generation of a key, and storage of that key in a non-volatile memory. The system includes a host 1720 which is coupled to an integrated circuit or multichip module 1710. The integrated circuit or multichip module 1710 includes a physical unclonable function (PUF) circuit 1711, controller 1712, and security logic 1713. The controller 1712 is coupled to the physical unclonable function circuit 1711 and to a non-volatile memory 1714.

Figure 22:
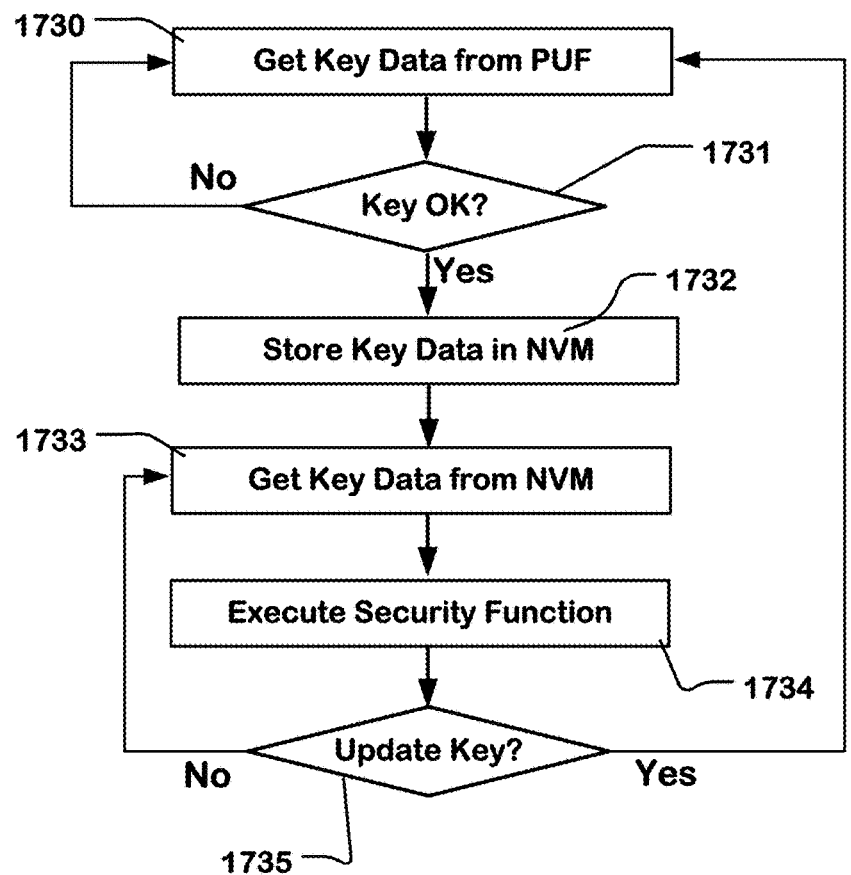
FIGS. 22-24 are simplified flowcharts illustrating operation of a system like that of FIG. 21 in various embodiments.

Operation of the system of FIG. 21 can be understood for some embodiments with reference to FIG. 22. Thus, in order to produce a key that can be used, key data is generated from the physical unclonable function circuit 1711 (Step 1730). The key is analyzed to determine whether it meets security specifications, such as having sufficient randomness (Step 1731). If the key meets the specifications, then it is stored into the non-volatile memory 1714 via the controller 1712 (Step 1732). If it does not meet the specifications, then the process loops to Step 1730 to retry the PUF to produce a key. The physical unclonable function can use a set of non-volatile memory cells as described above to produce a key of any length and to retry the key production process based on the PUF. As illustrated, the PUF circuit 1711 and controller 1712 will cooperate to generate another key, looping back to Step 1730 until a satisfactory key is produced. Otherwise, key generation is completed, the key or keys are stored and ready to be utilized by the security logic. To use the key, the process includes getting the key data from the non-volatile memory (1733), and executing the security function in a protocol involving the host 1720 and the key data for one or more keys in the non-volatile memory (1734). The host 1720 can be provided data needed to execute a security protocol that relies on the key by an enrollment system, or can be the system used during set up of the key. The security function can be configured in cooperation with an enrollment system or communications server, to utilize a plurality of keys. In some embodiments, the keys generated and stored are utilized only one time, or a limited number of times, to maintain high security and immunity from snooping. Also in some embodiments, a single large key can be utilized in a manner that relies upon subsets of the large key for each communication session. Other security protocols can be implemented as needed for a particular environment of use. In the process of FIG. 22, during utilization of the key by the security process, a key update protocol can be executed which signals that the key should be updated. This can include replacing the key after a period of time, or after a fixed number of uses. Also, the key can be replaced if a number of log-in attempts are used that fail or other events are detected, suggesting an attempt to guess the key. Thus, the process of FIG. 22 includes the step of determining whether to update the key (Step 1735). If the key needs to be updated, then the process loops to Step 1730, and the PUF is executed to update the key or keys. If the key does not need to be updated at 1735, then the process loops to continue use of the key in support of execution of the security function.

When using the PUF to create new keys in the cycling represented by Steps 1731 and 1735 of FIG. 22, for example, the parameters used in the PUF can be shifted in some embodiments to increase the chance of producing keys that are substantially different in each cycle. Of course in some embodiments using flash memory cells, the same PUF parameters applied to the same cells can produce sufficiently different keys. In other examples, bias voltages used to produce the initial distribution, can be changed for each new PUF cycle. Also, the number of pulses applied in an Incremental Step Pulse Programming ISPP algorithm can be changed for producing distributions as part of the PUF. In yet other examples, the memory cells utilized in producing the pulse can be changed from a set in one area of the array to a different set in another area of the array.

Figure 23:
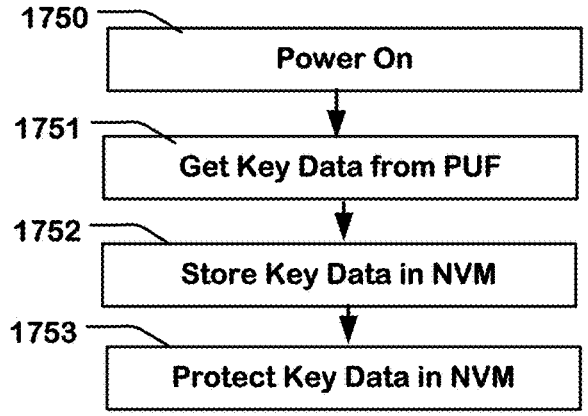
Figure 24:
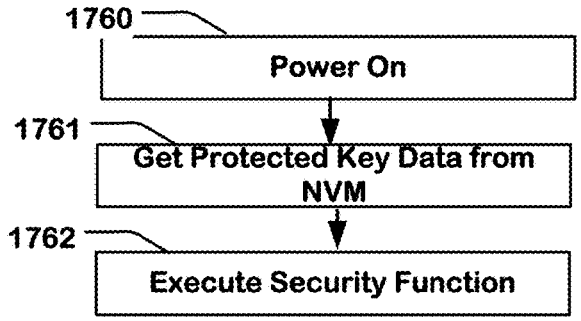

The high-level function can be considered in two parts in some embodiments such as shown in FIGS. 23 and 24. FIG. 23 illustrates a function that can be executed during manufacture, or before shipment to the customer, or otherwise before a key has been used by the system. In FIG. 23, the procedure begins with a power-on event (Step 1750). The physical unclonable function is executed and the key data including one or more keys is retrieved and provided to an enrollment system or other external system that will need the key data (Step 1751). The key data is stored in a non-volatile memory as discussed above (Step 1752). The key data is protected after it has been stored in the non-volatile memory, from access by external communication networks or devices (Step 1753). In the field, the procedure flows generally as shown in FIG. 24, beginning with a power-on event (Step 1760). The procedure includes getting the protected key data from the non-volatile memory (Step 1761), and executing a security function including a communication protocol, such as a challenge-response exchange, with an external device using the key (Step 1762).

Figure 25:
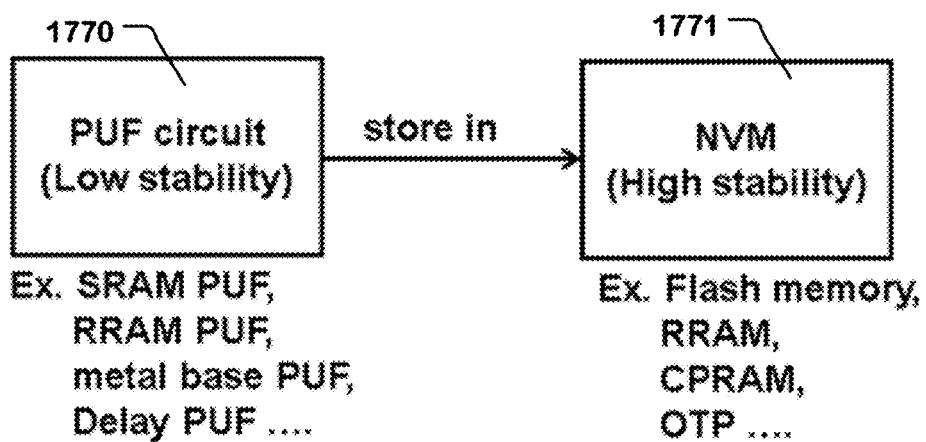
FIGS. 25-27 provide simplified illustrations of various alternative configurations of physical unclonable circuitry combined with non-volatile memory as described herein.
Figure 26:
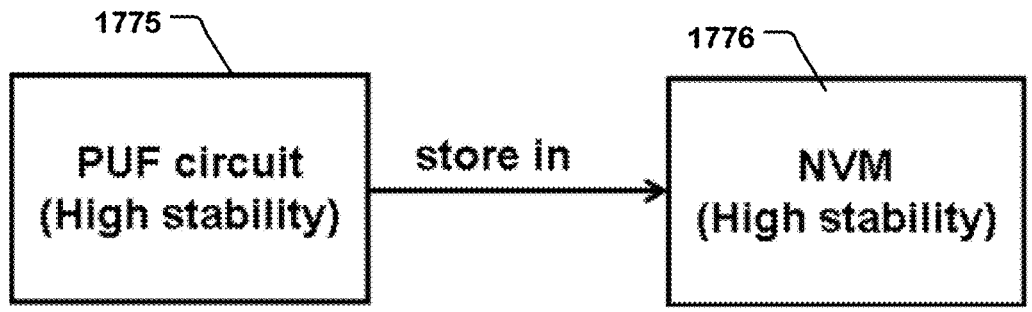

As illustrated in FIG. 25, the physical unclonable function can use physical circuits 1770 such as SRAM circuits, programmable resistance memory cell circuits RRAM, metal-based circuits, delay based circuits, oscillator based circuits and the like. Typically, the circuits used in physical unclonable functions have relatively low stability, requiring special logic or error correction in order to reliably use the keys. The non-volatile memory 1771 used for storage of the key can comprise non-volatile memory that is highly stable, such as flash memory, programmable resistance memory RRAM, phase change memory PCRAM, one time programmable memory and the like. In other embodiments, the circuits 1775 used by the physical unclonable function can have relatively high stability. However, the keys can also be stored in non-volatile memory 1776 which also has high stability, but can also provide better access control and other functions that may not be typically associated with the physical unclonable function circuits 1775.

Figure 27:
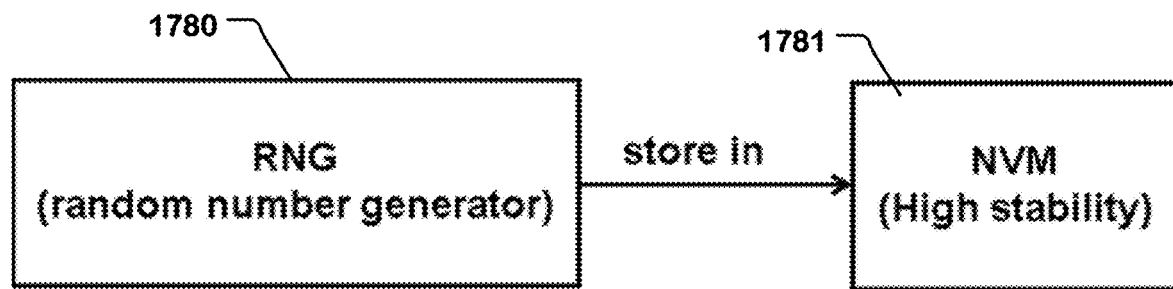

In some embodiments, as represented by FIG. 27, a random number generator 1780 can be utilized to produce a key, which can then be stored in non-volatile memory 1781 and used in systems such as those described herein.

Figure 28:
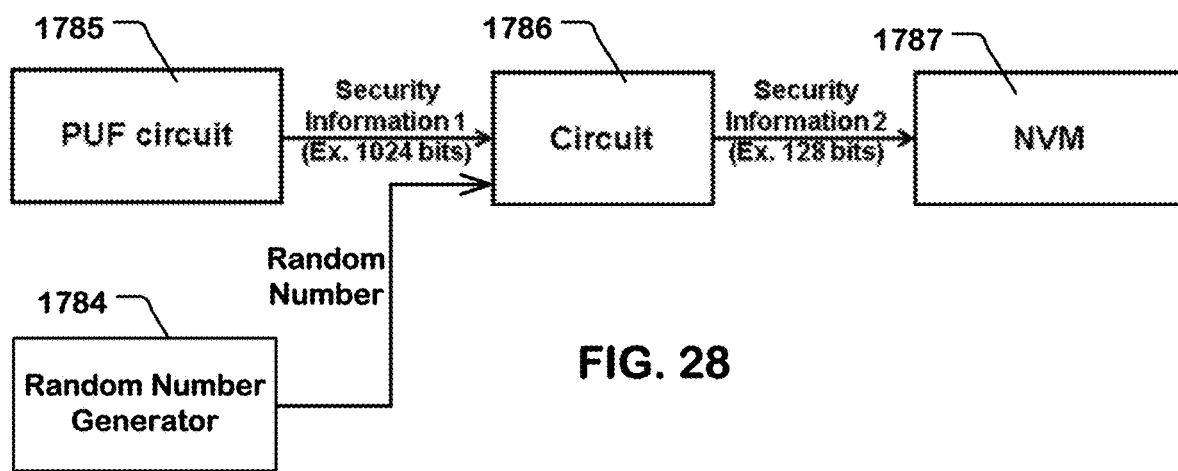
FIG. 28 illustrates a configuration including a PUF circuit and a random number generator.

In some embodiments, as represented by FIG. 28, a physical unclonable function circuit 1785 can produce security information as an initial key at a first level having, for example, 1024 bits. A random number generator 1784 can generate a random number. The initial key at the first level and the random number can be provided to a logic circuit 1786 which transforms the first level data represented by the initial key and the random number using, for example, a hash function, into second level information as an enhanced key having, for example, 128 bits, or other combination of bits that is generated as a function of the security information at the first level. The second level information in the enhanced key can then be stored into the non-volatile memory 1787. The procedure starts with power-on (Step 2900). This can occur for example when the device is mounted in a test jig or enrollment system such as described above. Also, the procedure can start with other events that signal initialization of a PUF circuit to produce an initial key. After Step 2900, the circuitry used to perform the physical unclonable function is enabled (Step 2901). Then, the PUF is executed to produce an initial key (Step 2902). The initial key is then stored in a set of non-volatile memory cells, such as cells in a particular block of cells in a non-volatile memory array (Step 2903). As discussed in examples above, the set of non-volatile memory cells may be the same set that is used by the PUF, or may be a set of non-volatile memory cells to which the initial key is written after execution of the PUF.

Figure 29:
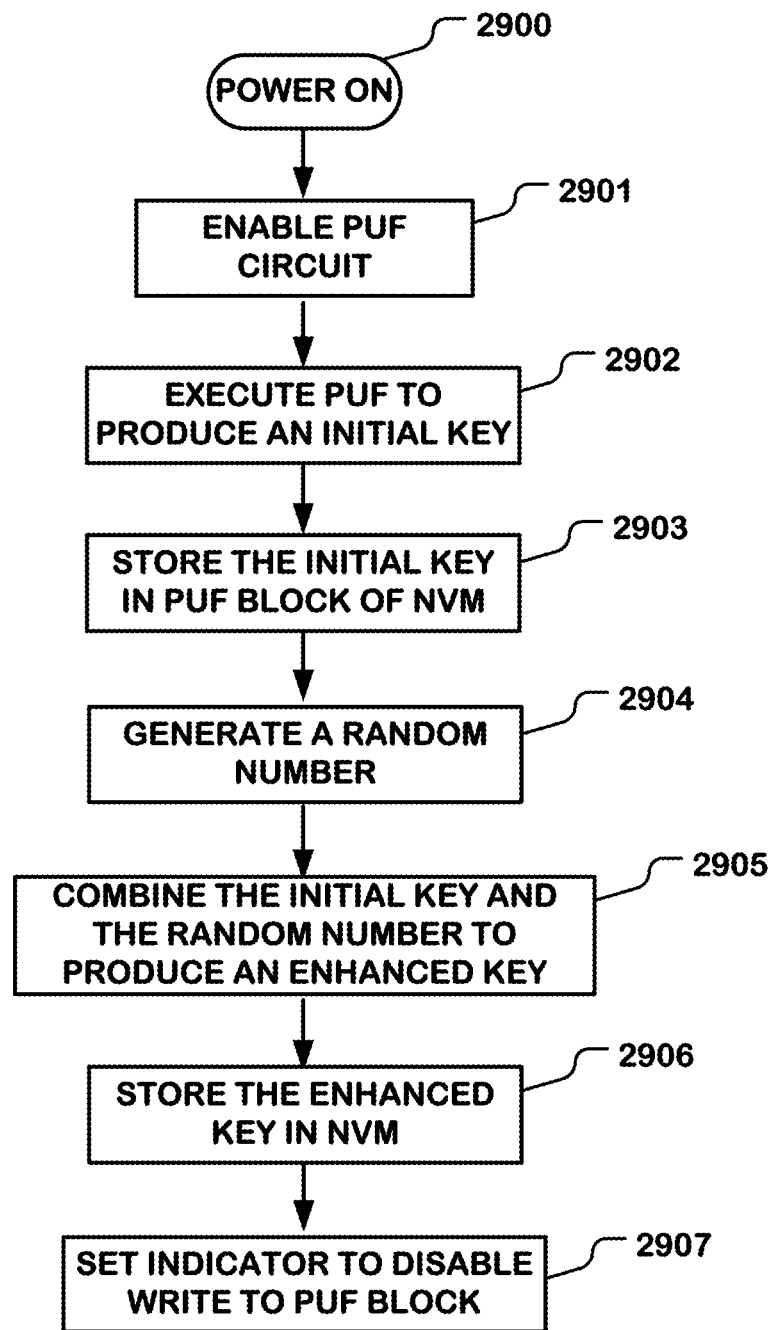
FIG. 29 is a simplified flowchart of a procedure executed by a controller on an integrated circuit for executing a physical unclonable function and a random number generator, and freezing a key produced.

FIG. 29 is a simplified flowchart of a procedure executed by a controller in a device such as that shown in FIG. 17 or FIG. 17A in order to freeze an initial key produced using a PUF. In the flowchart, the procedure starts with power-on (Step 2900). This can occur, for example, when the device is mounted in a test jig or enrollment system such as described above. Also, the procedure can start with other events that signal initialization of a PUF circuit to produce an initial key. After Step 2900, the circuitry used to perform the physical unclonable function is enabled (Step 2901). Then, the PUF is executed to produce an initial key (Step 2902). The initial key is then stored in a set of non-volatile memory cells, such as cells in a particular block of cells in a non-volatile memory array (Step 2903). As discussed in examples above, the set of non-volatile memory cells may be the same set that is used by the PUF, or may be a set of non-volatile memory cells to which the initial key is written after execution of the PUF. A random number generator is executed to generate a random number (Step 2904). Logic circuitry is executed to combine the initial key and the random number to produce an enhanced key (Step 2905). The enhanced key is then stored in a second set of non-volatile memory cells in the plurality of non-volatile memory cells (Step 2906). In embodiments, logic circuitry can include an XOR function using the initial key and the random number as inputs and producing an output as the enhanced key, and a hash function mapping the initial key and the random number to hash values as the enhanced key. After the initial key is stored in the set of non-volatile memory cells, then an indicator is set to disable changes to the initial key, such as by inhibiting program and erase operations in the particular block (Step 2907).

Figure 30:
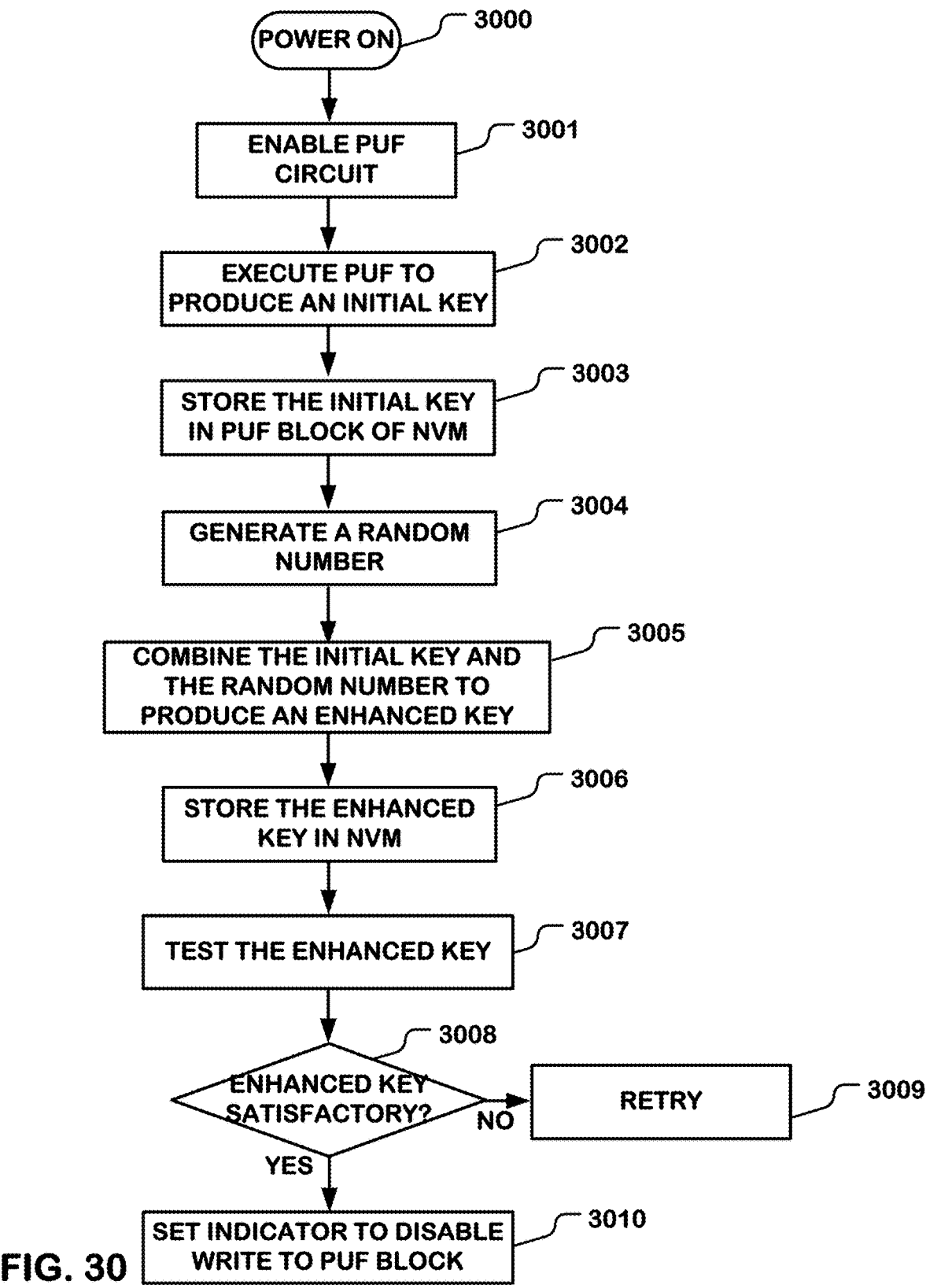
FIG. 30 is a simplified flowchart of an alternative procedure executed by a controller on an integrated circuit for executing a physical unclonable function combined with a random number generator, and freezing a key produced.

FIG. 30 is a simplified flowchart of an alternative procedure which can be executed by a controller in a device such as that shown in FIG. 17 or FIG. 17A in order to freeze an initial key produced using a PUF. In the flowchart, the procedure starts with power-on (Step 3000). This can occur, for example, when the device is mounted in a test jig or enrollment system such as described above. Also, the procedure can start with other events that signal initialization of a PUF circuit to produce an initial key. After Step 3000, the circuitry used to perform the physical unclonable function is enabled (Step 3001). Then, the PUF is executed to produce an initial key (Step 3002). The initial key is then stored in a set of non-volatile memory cells, such as cells in a particular block of cells in a non-volatile memory array (Step 3003). As discussed in examples above, the set of non-volatile memory cells may be the same set that is used by the PUF, or may be a set of non-volatile memory cells to which the initial key is written after execution of the PUF. A random number generator is executed to generate a random number (Step 3004). Logic circuitry is executed to combine the initial key and the random number to produce an enhanced key (Step 3005). The enhanced key is then stored in a second set of non-volatile memory cells in the plurality of non-volatile memory cells (Step 3006). In embodiments, logic circuitry can include an XOR function using the initial key and the random number as inputs and producing an output as the enhanced key, and a hash function mapping the initial key and the random number to hash values as the enhanced key. In this procedure, the suitability of the enhanced key produced using the PUF and the random number is then evaluated, such as by determining whether the enhanced key has sufficient randomness (Step 3007). The algorithm then determines whether the enhanced key is satisfactory (Step 3008). If the test of the enhanced key is executed externally, then a signal from the external device can be provided via a port on the memory device to indicate success of the test. If it is not satisfactory, then a signal from the external device can be provided via a port on the memory device to indicate failure of the test, and the procedure for producing the enhanced key can be retried (Step 3009). If the enhanced key is satisfactory at Step 3008, then an indicator can be set to disable changes to data in the set of non-volatile memory cells storing the initial key, thereby freezing the initial key for use in the device (3010).

As mentioned above, another technique for freezing a key after it has been produced involves disabling the physical unclonable function, such as by disabling circuitry used to execute the function.

Figure 31:
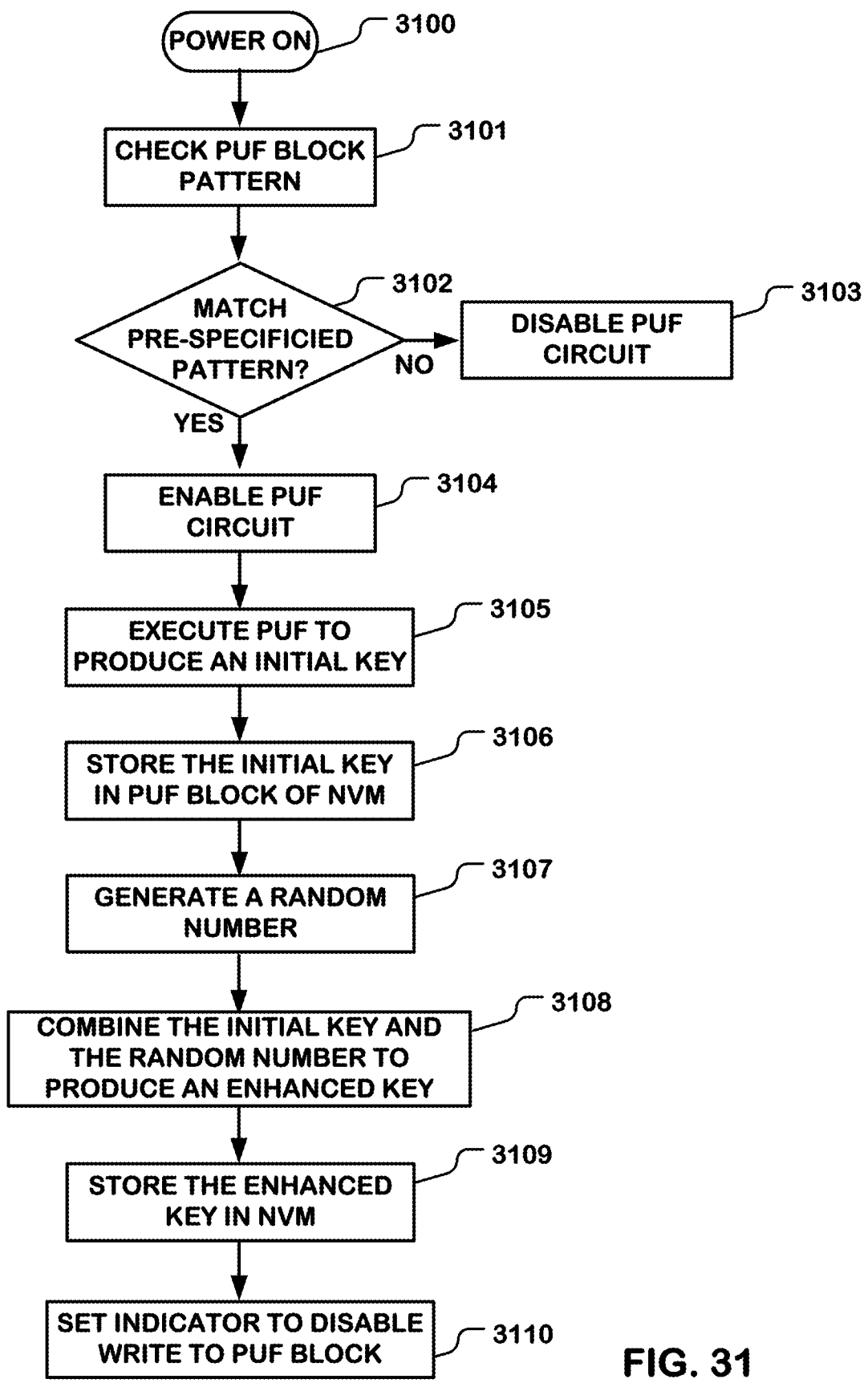
FIG. 31 is a simplified flowchart of another alternative procedure executed by a controller on an integrated circuit for executing a physical unclonable function combined with a random number generator, and freezing a key produced.

FIG. 31 is a flowchart of a procedure that can be executed by a controller such as in a device like that of FIG. 17 or FIG. 17A. In this example, the procedure begins with a power-on event (Step 3100). As mentioned above, the procedure can begin at other initialization events. Upon initialization of the procedure, logic first determines whether a key has already been stored in the set of non-volatile memory cells used to store the key. Thus, the set of non-volatile memory cells can be compared with a predetermined PUF block pattern (Step 3101). A pattern that indicates that no key has been written can be for example a pattern of all 0's or a pattern of all 1's. After checking the pattern, it is determined whether a match to the prespecified pattern is found (Step 3102). If a match is not found, then the logic disables the PUF by, for example, disabling a circuit used to execute the PUF, or by preventing a state machine controlling the circuit from advancing to a state in which the PUF is executed (Step 3103). If a match is found, then the logic enables the PUF by, for example, enabling a circuit used to execute the PUF, or by causing the state machine to advance to a state in which the PUF is executed (Step 3104). After the PUF is enabled, then it is executed to produce an initial key (Step 3105). The initial key is then stored in a set of non-volatile memory cells, such as in a particular PUF block in the array, or in a separate set of memory cells depending on the particular embodiment (Step 3106). A random number generator is executed to generate a random number (Step 3107). Logic circuitry is executed to combine the initial key and the random number to produce an enhanced key (Step 3108). The enhanced key is then stored in a second set of non-volatile memory cells in the plurality of non-volatile memory cells (Step 3109). In embodiments, logic circuitry can include an XOR function using the initial key and the random number as inputs and producing an output as the enhanced key, and a hash function mapping the initial key and the random number to hash values as the enhanced key. After successfully creating the enhanced key, then optionally, an indicator can be set to disable changes to the set of memory cells storing the initial key (Step 3110). As mentioned above, in some embodiments, the set of memory cells storing the initial key may not have peripheral circuits that support program or erase operations apart from operations used in the PUF. In this case, setting an indicator to prevent program and erase may not be necessary.

Figure 32:
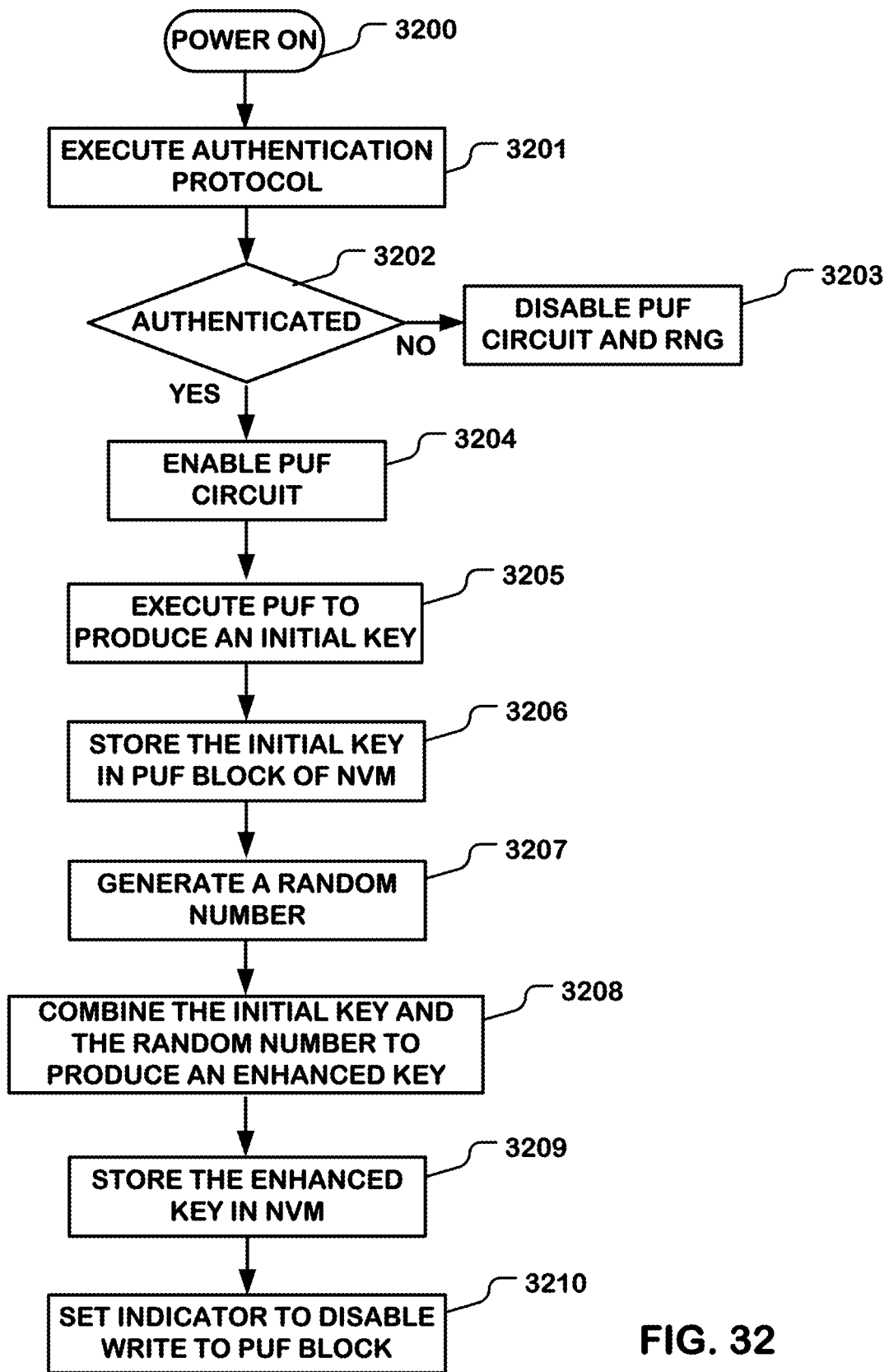
FIG. 32 is a simplified flowchart of yet another alternative procedure executed by a controller on an integrated circuit for executing a physical unclonable function combined with a random number generator, and freezing a key produced.

FIG. 32 is a flowchart of an alternative procedure that can be executed by a controller such as a controller in a device like that of FIG. 17 or FIG. 17A. In this example, the procedure begins with a power-on event (Step 3200). As mentioned above, the procedure can begin at other initialization events. Upon initialization of the procedure, logic can enter a state requiring execution of an authentication protocol before utilization of the PUF including communications with an external device that initiates the key generation procedure. When such an authentication protocol is initiated, the logic executes the protocol (Step 3201). If the initiator of the key generation cycle does not succeed with the authentication protocol (Step 3202), then the logic can disable the PUF circuit using techniques such as those discussed in connection with FIG. 31 and disable the RNG in some cases as well (Step 3203). If the initiator succeeds with the authentication protocol (Step 3202), then the logic enables the PUF circuit (Step 3204). The PUF can then be executed to produce an initial key (Step 3205). After producing the initial key, it can be stored in a set of non-volatile memory cells (Step 3206). A random number generator is executed to generate a random number (Step 3207). Logic circuitry is executed to combine the initial key and the random number to produce an enhanced key (Step 3208). The enhanced key is then stored in a second set of non-volatile memory cells in the plurality of non-volatile memory cells (Step 3209). In embodiments, logic circuitry can include an XOR function using the initial key and the random number as inputs and producing an output as the enhanced key, and a hash function mapping the initial key and the random number to hash values as the enhanced key. Optionally, after successfully storing the key, an indicator can be set to disable changes of data stored in that set of non-volatile memory cells (Step 3210).

In various embodiments, techniques described with reference to FIGS. 29-32 can be utilized in various combinations. For example, the procedure for checking the set of memory cells for the predetermined pattern can be combined with the requirement for successful execution of an authentication protocol in order to enable a PUF circuit. Also, the procedure for verifying or testing the PUF after it is been stored in the set of non-volatile memory cells can be combined with the procedure for checking the set of non-volatile memory cells for a predetermined pattern, or with the procedure requiring successful execution of an authentication protocol, or with both.

In one aspect of the technology, the computer program controlling execution of processes like those shown in FIGS. 6, 8, 9, 11 13, 15, 29-32, and other procedures described herein, can be stored as instructions on a computer readable memory or more than one memory, where the memory comprises a non-transitory computer readable data storage medium. Using the computer readable memory, a PUF machine (e.g. processor system 410, FIG. 2) can cause scanning of programmable memory cells in a set of programmable memory cells, and apply the processes described herein to produce a stable data set based on a physical unclonable function.

Also, as mentioned above, an integrated circuit including the set of programmable memory cells can include a state machine or other logic resources configured to execute these processes. In yet other alternatives, a combination of a computer program executed by a PUF machine, and logic implemented on the integrated circuit can be utilized.

In embodiments described herein, a set of memory cells having a starting distribution of threshold voltages is used to establish a stable data set. This set of memory cells can be part of a large scale memory array, such as shown in FIG. 3, FIG. 16, FIG. 17 and FIG. 17A. Alternatively, the set of memory cells can be a specially provided set of memory cells. In an embodiment in which the mission functions of the integrated circuit include a memory array, the set of memory cells used for this purpose can have the same structure as the memory cells in the array, or can have different structures. Also, the set of memory cells used can be disposed in any pattern on the integrated circuit, including a compact array pattern or a distributed pattern.

In embodiments, a set of memory cells used for establishing a starting distribution can be reused many times to produce multiple stable data sets having variant contents. Thus, logic can be provided in a system deploying such embodiments, to utilize the PUF process on memory cells on one integrated circuit to generate unique data sets that can be shared among other devices in communication with the one integrated circuit.

As mentioned above, the examples described herein are based on using charge trapping memory cells, such as flash memory. The technology in some embodiments, including in embodiments configured as shown in FIG. 3, FIG. 16, FIG. 17 and FIG. 17A, is extendable to other programmable memory cell technology, including programmable resistance cells based on metal oxides, programmable resistance cells based on phase change materials, magneto-resistive memory and other kinds of memory cell technologies characterized by an ability to be used to establish the starting distribution in which threshold voltages or threshold resistances vary randomly relative to the addresses of the memory cells as a result of being exposed to a common process.

The data set generated as described herein can have content unique to the particular integrated circuit. The data set can be used to form a response to a challenge, such as in the example of security protocols. The data set can be used as a key in an encryption protocol. The data set can be used as a unique identifier. The data set can be used as a random key.

Various aspects of the technology described herein include the following embodiments.

A method for generating a data set on an integrated circuit including a set of programmable memory cells is described in one embodiment. The method can comprise exposing the set of programmable memory cells having addresses on the integrated circuit to a common process inducing variant thresholds in the programmable memory cells in the set within a starting distribution of thresholds. The method also can comprise (1) finding a first subset of the set of programmable memory cells having thresholds in a first part of the starting distribution, and a second subset of the set of programmable memory cells having thresholds in a second part of the starting distribution; and (2) using the addresses of at least one of the first and second subsets to generate the data set.

The common process can comprise etching or deposition steps during manufacturing which induce charge trapping in charge storage structures of the programmable memory cells in the set. The common process also can comprise biasing operations using biasing circuits on the integrated circuit that induce changes in charge storage structures of the programmable memory cells in the set.

A method of manufacturing an integrated circuit is described in one embodiment. The method can comprise forming a plurality of programmable memory cells on the integrated circuit; connecting the integrated circuit to a system configured to exchange signals with the integrated circuit; and using the system to generate a data set in a set of programmable memory cells in the plurality of programmable memory cells having a starting distribution of thresholds by (1) finding a first subset of the set of programmable memory cells having thresholds in a first part of the starting distribution, and a second subset of the set of programmable memory cells having thresholds in a second part of the starting distribution; and (2) using addresses of at least one of the first and second subsets to generate the data set.

An apparatus is described in one embodiment. The apparatus can comprise a set of programmable memory cells on an integrated circuit; logic to generate a data set using the set of programmable memory cells, wherein the set of programmable memory cells has a starting distribution of thresholds, by (1) finding a first subset of the set of programmable memory cells having thresholds in a first part of the starting distribution, and a second subset of the set of programmable memory cells having thresholds in a second part of the starting distribution; and (2) using addresses of at least one of the first and second subsets to generate the data set.

A product is described in one embodiment. The product can comprise a computer readable non-transitory data storage medium storing computer instructions for a process to generate a data set on an integrated circuit including a set of programmable memory cells, executable by a system configured to connect to the integrated circuit. The process described can comprise (1) finding a first subset of the set of the programmable memory cells having thresholds in a first part of the starting distribution, and a second subset of the set of the programmable memory cells having thresholds in a second part of the starting distribution; and (2) using addresses of at least one of the first and second subsets to generate the data set.

The finding step described in the embodiments can include determining a dividing line between the first part of the starting distribution and the second part of the starting distribution, so that a ratio of a count of the programmable memory cells in the set having thresholds below the dividing line to a count of the programmable memory cells in the set having thresholds above the dividing line is within a target range of ratios.

The using addresses step described in the embodiments can include selecting the programmable memory cells using the addresses of the programmable memory cells in said at least one of the first and second subsets, applying a biasing operation to the selected programmable memory cells to establish a changed distribution of thresholds for the set of programmable memory cells, the changed distribution having a sensing margin between the first and second subsets; and reading the programmable memory cells in the set using a read voltage in said sensing margin to generate the data set. The using addresses step also can include combining the addresses of memory cells in said at least one of the first and second subsets as a function of membership in said at least one of the first and second subsets, and using the combined addresses as the data set.

A method for generating a data set on an integrated circuit is described in one embodiment. The integrated circuit includes a set of programmable memory cells, and the programmable memory cells have thresholds in a starting distribution. The method comprises finding a first subset of the set of the programmable memory cells having thresholds in a first part of the starting distribution, and a second subset of the set of the programmable memory cells having thresholds in a second part of the starting distribution. The method can comprise applying a biasing operation to establish a changed distribution of the thresholds for the programmable memory cells in the set, the changed distribution having a sensing margin between the first and second subsets; and providing the data set using the changed distribution.

A method for generating a data set on an integrated circuit is described in one embodiment. The integrated circuit includes a set of programmable memory cells, and the programmable memory cells have thresholds in a starting distribution. The method comprises finding a first subset of the set of the programmable memory cells having thresholds in a first part of the starting distribution, and a second subset of the set of the programmable memory cells having thresholds in a second part of the starting distribution. The method can comprise combining addresses of the programmable memory cells in at least one of the first and second subsets; and providing the data set using combined addresses.

An apparatus is described in one embodiment. The apparatus can include a set of charge trapping memory cells; and circuitry having access to the set of charge trapping memory cells to provide a data set using the set of charge trapping memory cells, the data set being a function of variant threshold voltages of different members of the set of charge trapping memory cells as a result of a common process that induces charge trapping in charge storage structures in the charge trapping memory cells in the set. The set of charge trapping memory cells as described has an order and the variant threshold voltages have a starting distribution, and the data set is a function of positions in the order of a subset of the set of charge trapping memory cells having threshold voltages in a part of the starting distribution A method for generating a data set on an integrated circuit including a set of programmable memory cells is described in one embodiment. The method comprises exposing the set of programmable memory cells having addresses on the integrated circuit to a common process inducing variant thresholds in members of the set within a starting distribution of thresholds. The method also comprises (1) finding a first dividing line and a second dividing line different than the first dividing line, in the starting distribution; (2) identifying a first subset of the set of programmable memory cells having thresholds below the first dividing line in a first part of the starting distribution, and a second subset of the set of programmable memory cells having thresholds above the second dividing line in a second part of the starting distribution; and (3) generating the data set using addresses of at least one of the first and second subsets.

A method of manufacturing an integrated circuit is described in one embodiment. The method can comprise forming a plurality of programmable memory cells on the integrated circuit; connecting the integrated circuit to a system configured to exchange signals with the integrated circuit; and using the system to generate a data set in a set of programmable memory cells in the plurality of programmable memory cells having a starting distribution of thresholds, by (1) finding a first dividing line and a second dividing line different than the first dividing line, in the starting distribution; (2) identifying a first subset of the set of the programmable memory cells having thresholds below the first dividing line in a first part of the starting distribution, and a second subset of the set of the programmable memory cells having thresholds above the second dividing line in a second part of the starting distribution; and (3) generating the data set using addresses of at least one of the first and second subsets.

An apparatus is described in one embodiment. The apparatus comprises a set of programmable memory cells on an integrated circuit; and logic to generate a data set using the set of programmable memory cells, wherein the set of memory cells has a starting distribution of thresholds, by: (1) finding a first dividing line and a second dividing line different than the first dividing line, in the starting distribution; (2) identifying a first subset of the set of the programmable memory cells having thresholds below the first dividing line in a first part of the starting distribution, and a second subset of the set of the programmable memory cells having thresholds above the second dividing line in a second part of the starting distribution; and (3) generating the data set using addresses of at least one of the first and second subsets.

A product is described in one embodiment. The product comprises a computer readable non-transitory data storage medium storing computer instructions for a process to generate a data set on an integrated circuit including programmable memory cells, executable by a system configured to connect to an integrated circuit. The process comprises (1) finding a first dividing line and a second dividing line different than the first dividing line, in the starting distribution; (2) identifying a first subset of the set of the programmable memory cells having thresholds below the first dividing line in a first part of the starting distribution, and a second subset of the set of the programmable memory cells having thresholds above the second dividing line in a second part of the starting distribution; and (3) generating the data set using addresses of at least one of the first and second subsets.

The step of finding the first and second dividing lines described in the embodiments can include determining a threshold voltage in the starting distribution at which a ratio of a count of memory cells having thresholds below the threshold voltage to a count of memory cells having thresholds above the threshold voltage is within a target range of ratios, and setting the first dividing line by subtracting a first constant from the threshold voltage, and setting the second dividing line by adding a second constant to the threshold voltage. The finding step also can include iteratively reading data values in the set of programmable memory cells using a moving first read voltage, and counting memory cells in the set having thresholds below the first read voltage, and setting the first dividing line using the first read voltage at which the count is within a first target range of counts. The finding step also can include iteratively reading data values in the set of programmable memory cells using a moving second read voltage, and counting memory cells in the set having thresholds above the second read voltage, and setting the second dividing line using the second read voltage at which the count is within a second target range of counts.

The step of generating the data set described in the embodiments can include using the addresses to select the programmable memory cells in one of the first and second subsets; and reading the programmable memory cells in the set of programmable memory cells using a read voltage between the first and second dividing lines. The generating step also can include combining the addresses of the programmable memory cells in said at least one of the first and second subsets as a function of membership in said at least one of the first and second subsets.

The common process described in the embodiments can comprise etching or deposition steps during manufacturing which induce charge trapping in charge storage structures of the programmable memory cells in the set. The common process also can comprise biasing operations using biasing circuits on the integrated circuit that induce changes in charge storage structures of the programmable memory cells in the set.

A method for generating a data set on an integrated circuit including programmable memory cells is described in one embodiment. The method comprises storing addresses of memory cells in a set of memory cells that have thresholds in a first sub-distribution of a distribution of thresholds of memory cells in the set; and generating the data set using the stored addresses.

An integrated circuit is described in one embodiment. The integrated circuit comprises a set of programmable memory cells on an integrated circuit having a distribution of thresholds; memory storing addresses of memory cells in the set of programmable memory cells that have thresholds in a first sub-distribution of the distribution of thresholds; and logic to generate a data set using the stored addresses.

The distribution is characterized by having been made using a physical unclonable function. The first sub-distribution is separated from a second sub-distribution by a sensing margin, and the logic is configured to generate the data set to read the memory cells in the set of programmable memory cells in address order to generate data values that vary according to membership or not in the first sub-distribution. The memory stores, in addition, addresses of memory cells in the set of memory cells that have thresholds in a second sub-distribution of a distribution of thresholds of memory cells in the set; and the logic configured to generate the data set includes using the stored addresses for the first sub-distribution and the second sub-distribution. The memory stores, in addition, a first dividing line and a second dividing line different than the first dividing line, for distribution of thresholds, wherein the memory cells in the first sub-distribution include a first subset of the set of the memory cells having thresholds below the first dividing line, and the memory cells in the second sub-distribution include a second subset of the set of the memory cells having thresholds above the second dividing line.

The logic as described in the embodiments is configured to generate the data set using the addresses to select memory cells in one of the first and second subsets; and reads memory cells in the set of programmable memory cells using a read voltage between the first and second dividing lines.

The logic as described can be configured to apply biasing operations using biasing circuits on the integrated circuit that induce changes in charge storage structures of the programmable memory cells in the set to establish the distribution, and respond to a challenge input to generate a response output using the data set. The logic can comprise a state machine on the integrated circuit.

In the embodiments described herein, the programmable memory cells in the set are charge trapping memory cells, and the thresholds are threshold voltages.

A memory circuit is described in one embodiment. The memory circuit comprises (1) a non-volatile memory array including a plurality of blocks of memory cells, and including a key stored in a particular block in the plurality of blocks; (2) a port for external communication of data from the array; (3) security logic coupled to the memory array, which utilizes the key in a protocol to enable access to data stored in blocks in the plurality of blocks; and (4) access control circuits coupled to the array which include logic to enable read-only access to the particular block by the security logic for use in the protocol, and to prevent access to the particular block via the port.

A device comprising a packaged integrated circuit or multichip module is described in one embodiment. The device comprises (1) a non-volatile memory array including a plurality of blocks of memory cells, and including a key stored in a particular block in the plurality of blocks; (2) a port for external communication of data from the array; (3) security logic coupled to the memory array, which utilizes the key in a protocol to enable access to data stored in blocks in the plurality of blocks; and (4) access control circuits coupled to the array which include logic to enable read-only access to the particular block by the security logic for use in the protocol, and to prevent access to the particular block via the port.

A method for operating a circuit including a non-volatile memory array is described in one embodiment. The method comprises (1) storing a key in a particular block in a plurality of blocks of the non-volatile memory array; (2) using a port by external devices or communication networks for accessing data from the array; (3) utilizing, a security logic circuit coupled to the non-volatile memory array, the key stored in the particular block in a protocol to enable access to data stored in blocks in the plurality of blocks; (4) enabling read-only access to the particular block by the security logic for use in the protocol, and preventing access to the particular block via the port.

The protocol described herein can include a challenge/response protocol including exchange of data via the port.

The access control circuits described herein have a first state in which access to the particular block via the port to write the key is enabled, a second state in which access to the particular block is disabled for read or write via the port, and access to the particular block is enabled for read by the security logic. The access control circuits described include block lock bits, which enable and disable access to corresponding blocks in the plurality of blocks.

In the embodiments, logic is included in the packaged integrated circuit or multichip module. The logic can store the key produced using the set of memory cells into the particular block, and can execute a function using a set of memory cells in the memory array to produce the key. The set of memory cells is in the particular block.

The key described comprises data values in a subset of the set of memory cells, and an address map identifying members of the subset for use by the security logic.

The memory array, the port, the security logic and the access control circuits can be disposed on a single integrated circuit.

A memory device is described, comprising a physical unclonable function (PUF) circuit; and a protection circuit configured to inhibit the program or erase procedures of memory cells in the PUF circuit. In embodiments, the protection circuit includes an indicator which indicates the accessibility to program or erase the PUF circuit, and the indicator is in a state inhibiting the program or erase procedure of the PUF circuit. In embodiments, the indicator is a fuse, a one-time-program (OTP) cell, or a register. In embodiments, the PUF circuit includes a selected set of cells in a non-volatile memory array, and the circuit includes a write bias generator, generating write bias arrangements to write memory cells in the array; and wherein the write bias generator is inhibited from connection to the selected set of memory cells of the PUF circuit. In embodiments, the write bias generator is disabled while the PUF circuit is enabled.

In embodiments, the protection circuit is configured to execute an authentication algorithm to determine the accessibility to program or erase the PUF circuit. The authentication algorithm can comprise a passcode authentication.

In embodiments, the authentication algorithm is interfaced with a fingerprint identification mechanism, or a hardware key.

A memory device is described, comprising a PUF circuit that provides an initial key, a random number generator that generates a random number, and logic circuitry that combines the initial key and the random number into an enhanced key; and a control circuit configured to check a specified pattern of the content of the enhanced key to permit or inhibit a write procedure of the PUF circuit. The specified pattern required to permit the write procedure can be all 1's or all 0's, for example.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A circuit, comprising:
   a plurality of non-volatile memory cells;
   logic to use a physical unclonable function using non-volatile memory cells in the plurality of non-volatile memory cells to produce a first key;
   a random number generator to produce a second key;
   logic to combine the first key and the second key to produce an enhanced key;
   logic to store the enhanced key in a set of non-volatile memory cells in the plurality of non-volatile memory cells; and
   logic to disable changes to data in the set of non-volatile memory cells after the enhanced key is stored in the set.

2. The circuit of claim 1, wherein the physical unclonable function utilizes entropy generated using non-volatile memory cells in the plurality of non-volatile memory cells to produce the first key.

3. The circuit of claim 1, wherein the logic to combine the first key and the second key executes an XOR function.

4. The circuit of claim 1, wherein the logic to combine includes a hash function.

5. The circuit of claim 1, wherein the random number generator comprises a logic circuit producing a pseudo-random number as the second key.

6. The circuit of claim 1, including authentication logic requiring a successful authentication protocol to enable the physical unclonable function to produce the first key.

7. The circuit of claim 1, including:
   a port for external communication of data from the plurality of non-volatile memory cells; and
   security logic coupled to the plurality of non-volatile memory cells, which utilizes the enhanced key in a protocol to enable access to data stored in the plurality of non-volatile memory cells.

8. The circuit of claim 7, wherein the protocol includes a challenge/response protocol including exchange of data via the port.

9. The circuit of claim 7, wherein the plurality of non-volatile memory cells, the port, the security logic and the random number generator are disposed on a single integrated circuit.

10. A method for operating a circuit including a plurality of non-volatile memory cells, comprising:

executing a physical unclonable function to generate an initial key;

storing the initial key in a first set of non-volatile memory cells in the plurality of non-volatile memory cells;

executing a random number generator to generate a random number;

logically combining the initial key and the random number to produce an enhanced key;

storing the enhanced key in a second set of non-volatile memory cells in the plurality of non-volatile memory cells; and after storing the initial key, disabling changes to data stored in the first set of non-volatile memory cells.

11. The method of claim 10, wherein the physical unclonable function utilizes entropy generated using non-volatile memory cells in the first set of non-volatile memory cells to produce the initial key.

12. The method of claim 10, wherein said logically combining includes executing an XOR function using the initial key and the random number as inputs and producing an output as the enhanced key.

13. The method of claim 10, wherein said logically combining includes executing a hash function mapping the initial key and the random number to hash values as the enhanced key.

14. The method of claim 10, wherein disabling changes to data stored in the first set of non-volatile memory cells disables use of the physical unclonable function.

15. The method of claim 13, wherein the plurality of non-volatile memory cells includes an array of non-volatile memory cells with peripheral circuits for access to the array, and a block of non-volatile memory cells having separate peripheral circuits allowing read-only access to the block, the block including the first set of non-volatile memory cells, and wherein the physical unclonable function utilizes entropy generated using non-volatile memory cells in the block of non-volatile memory cells to produce the initial key, and wherein disabling changes to data stored in the set of non-volatile memory cells disables the physical unclonable function.

16. The method of claim 13, wherein the plurality of non-volatile memory cells includes an array of non-volatile memory cells with peripheral circuits for access to the array, and wherein the peripheral circuits have a first state in which access to the first set of non-volatile memory cells to write the initial key is enabled, and a second state in which access to the first set of non-volatile memory cells to write is disabled while access to other non-volatile memory cells in the array to write is enabled, and wherein disabling changes to data stored in the first set of non-volatile memory cells includes storing an indicator to set the first state or the second state.

17. The method of claim 10, including requiring a successful authentication protocol to enable the physical unclonable function to produce the initial key.

18. The method of claim 10, wherein the physical unclonable function uses the first set of non-volatile memory cells to produce the initial key.

19. The method of claim 10, including utilizing the enhanced key in a protocol to enable access to data other than the initial key and the enhanced key, stored in the plurality of non-volatile memory cells.

* * * * *